United States Patent [19]
Okada et al.

[11] Patent Number: 5,834,761
[45] Date of Patent: Nov. 10, 1998

[54] IMAGE INPUT APPARATUS HAVING A SPATIAL FILTER CONTROLLER

[75] Inventors: Hideo Okada, Uda-gun; Masayuki Nishikawa, Higashiosaka; Tohru Okuda, Nara; Tetsuo Iwaki, Yamatokoriyama; Chiaki Yamawaki, Habikino; Yoshinori Kinai, Tenri, all of Japan

[73] Assignee: Sharp Kabushiki Kaisah, Osaka, Japan

[21] Appl. No.: 821,858

[22] Filed: Mar. 21, 1997

[30] Foreign Application Priority Data

Mar. 22, 1996 [JP] Japan ................................. 8-066836
Feb. 13, 1997 [JP] Japan ................................. 9-029142

[51] Int. Cl.⁶ .................................................. H01J 40/14
[52] U.S. Cl. ...................... 250/208.1; 250/226; 348/342; 348/344; 359/557
[58] Field of Search .............................. 250/208.1, 226; 348/342, 344, 335, 340; 359/554–557

[56] References Cited

U.S. PATENT DOCUMENTS 5,369,266  11/1994  Nohda et al. ......................... 250/208.1

FOREIGN PATENT DOCUMENTS 60-54576   3/1985   Japan .
63-284980  11/1988  Japan .
3226078    10/1991  Japan .
4236585    8/1992   Japan .

Primary Examiner—Que Le

[57] ABSTRACT

The Invention is an image input apparatus equipped with means of image shifting which is capable of inputting images of different resolutions, and enables the transmission band of the spatial filter to be switched in accordance with resolution in order to prevent moire. When a flat transparent refraction plate 22 is inclined relative to the optical axis 10 by which light from the object is introduced, the position where the image is formed on the imaging surface of the CCD 14 is shifted, thus making image shifting possible. High resolution images are obtained by shifting the image a distance shorter than the distance between the photosensitive parts of the CCD 14, and then combining the images. The transmission band of the spatial filter 12 for preventing moire can be switched by changing the relative angles of the double refraction plates 20, 21. The transmission band of the spatial filter 12 is switched to the high frequency side when inputting high resolution images by means of the image shift mechanism 13, thus obtaining images of good resolution.

17 Claims, 40 Drawing Sheets

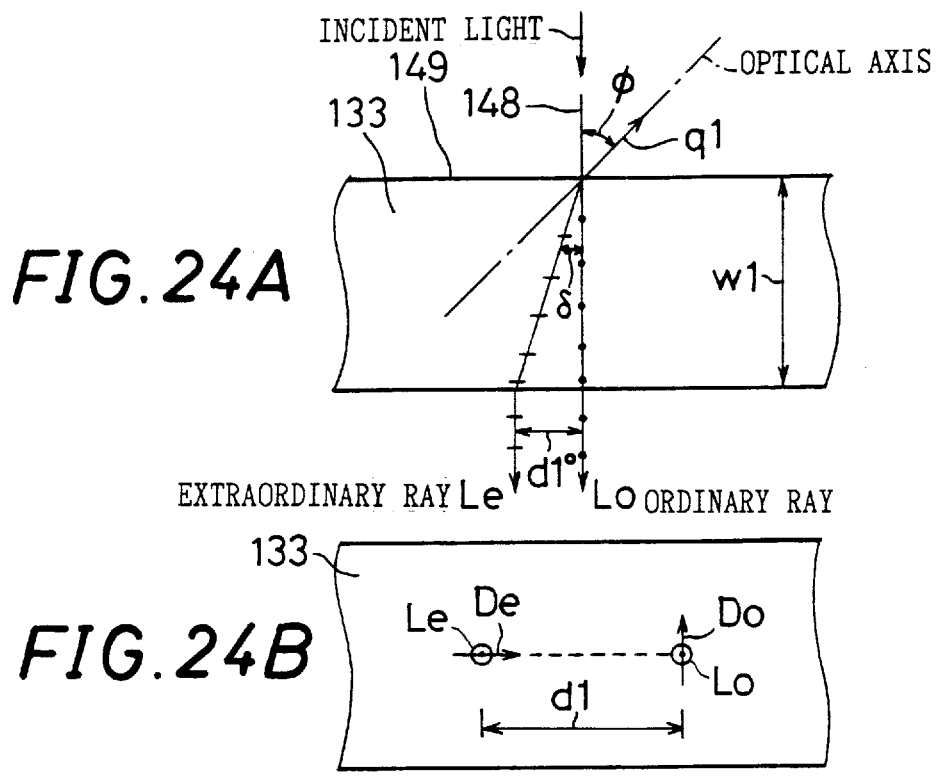
FIG.24A
FIG.24B
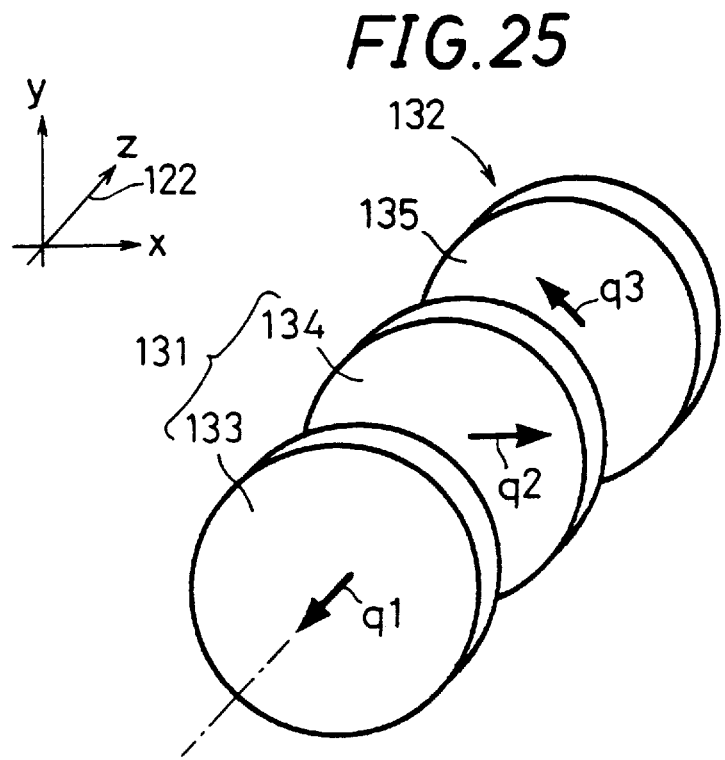
FIG.25

OPERATION MODE 1

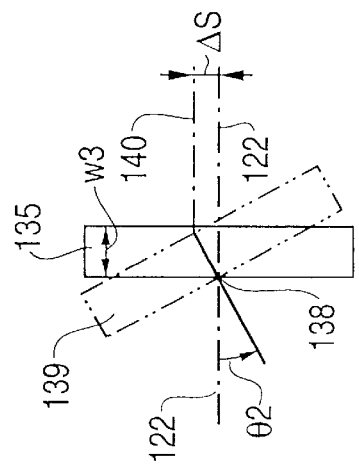

| a1,1 | ○ | a1,2 | ○ | a1,3 | ○ | a1,4 | ○ | • • • |
| ○ | b1,1 | ○ | b1,2 | ○ | b1,3 | ○ | b1,4 | |
| a2,1 | ○ | a2,2 | ○ | a2,3 | ○ | a2,4 | ○ | |
| ○ | b2,1 | ○ | b2,2 | ○ | b2,3 | ○ | b2,4 | |
| a3,1 | ○ | a3,2 | ○ | a3,3 | ○ | a3,4 | ○ | |
| ○ | b3,1 | ○ | b3,2 | ○ | b3,3 | ○ | b3,4 | |
| a4,1 | ○ | a4,2 | ○ | a4,3 | ○ | a4,4 | ○ | |
| ○ | b4,1 | ○ | b4,2 | ○ | b4,3 | ○ | b4,4 | |

•
•
•

OPERATION MODE 1

OPERATION MODE 2

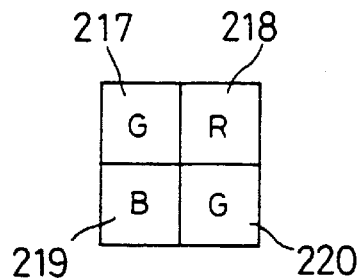
FIG.57A
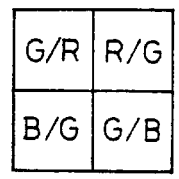
FIG.57B
FIG.58
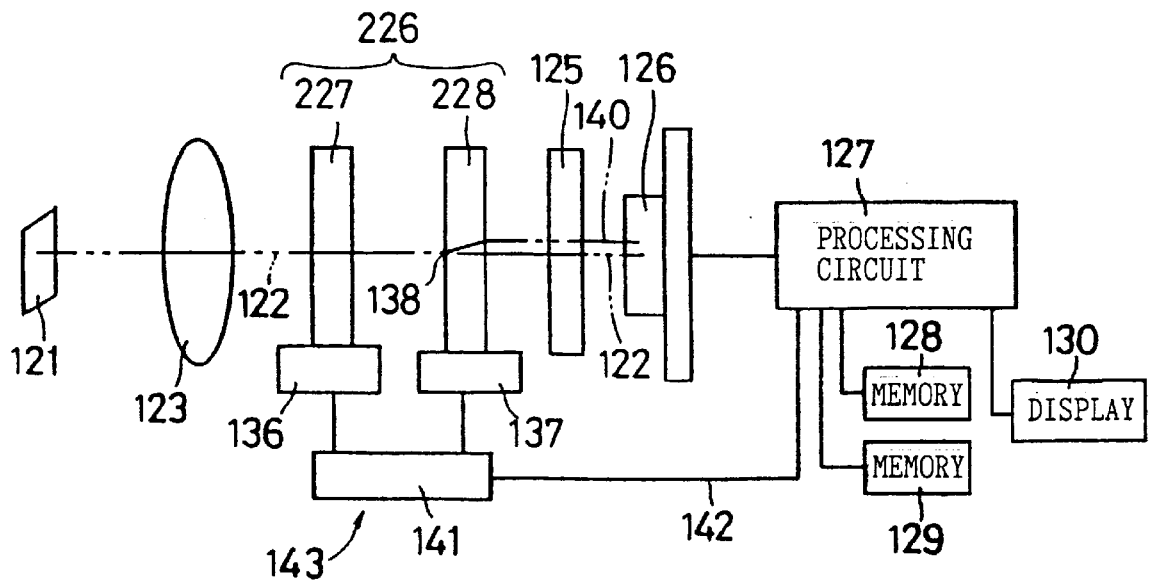

FIG. 65
PRIOR ART

|   | 1 |   | 2 |   | 3 |
|---|---|---|---|---|---|
| 1 |   | 2 |   | 3 |   |
|   | 4 |   | 5 |   | 6 |
| 4 |   | 5 |   | 6 |   |
|   | 7 |   | 8 |   | 9 |
| 7 |   | 8 |   | 9 |   |

FIG. 66
PRIOR ART

|   |   |   |   |   |   |
|---|---|---|---|---|---|
| 1 | 1 | 2 | 2 | 3 | 3 |
|   |   |   |   |   |   |
| 4 | 4 | 5 | 5 | 6 | 6 |
|   |   |   |   |   |   |
| 7 | 7 | 8 | 8 | 9 | 9 |

FIG. 67
PRIOR ART

| 1 | 1 | 2 | 2 | 3 | 3 |
|---|---|---|---|---|---|
| 1 | 1 | 2 | 2 | 3 | 3 |
| 4 | 4 | 5 | 5 | 6 | 6 |
| 4 | 4 | 5 | 5 | 6 | 6 |
| 7 | 7 | 8 | 8 | 9 | 9 |
| 7 | 7 | 8 | 8 | 9 | 9 |

IMAGE INPUT APPARATUS HAVING A SPATIAL FILTER CONTROLLER

BACKGROUND OF THE INVENTION

1. Field of the Invention

The present invention relates to an image input apparatus capable of inputting images having several different resolutions, and is especially equipped with means for shifting images and a spatial filter for eliminating moire.

The invention also relates to a high picture quality image input apparatus that uses image shifting, and is particularly compact and ideal for reducing cost.

2. Description of the Related Art

Solid state imaging devices such as CCDs(Charge Coupled Devices) consisting of imaging surfaces which pixels arranged in a two-dimensional matrix are widely used in video cameras which pick up moving images, and still cameras which are image input apparatuses that pick up still images. Resolution of images is ever improving, and there is now a demand for high resolution image input for imaging devices as well. Higher resolution can be produced by increasing the number of pixels in the imaging surface of solid state imaging devices. This however possesses technical problems for production, resulting in loss of production efficiency and higher cost. We therefore propose a method whereby images are shifted to produce high resolution using an imaging device with a lower pixel capacity.

FIG. 63 shows the basic principle by which image shifting functions. The image shift mechanism 3 is positioned before the imaging surface of a CCD 4, which is a solid state imaging device, along the optical axis 2 of the lens 1 through which light from the object is introduced. Image shift mechanism 3 contains a refraction plate 5. By adjusting the tilting angle of the plate relative to the optic axis 2, the optical path 2a by which light reaches the imaging surface of the CCD 4 can be altered only by Δ.

FIGS. 64 through 67 show the principle by which resolution is enhanced by image shifting. FIG. 64 shows the pixel array, which is the light sensitive portion of the imaging surface of the CCD 4 shown in FIG. 63. The parts indicated by numbers 1 through 9 in FIG. 64 show the arrangement of the light sensitive portion. The distance between rows in the horizontal direction is Δx, and that in the vertical direction is Δy. When an image is formed at the first position of the CCD 4 imaging surface, image signals from positions 1–9 shown in FIG. 64 are received from the CCD 4 as the first image signal. When the refraction plate 5 is inclined to shift the position where each image is formed on the imaging surface of the CCD 4 to Δx/2, Δy/2, the incident light optical path 2a is also shifted. The image signal when the incident light optical path 2a shifts is obtained from the CCD 4 as the second image signal. When combined with the first image signal, an image equivalent to the arrangement of the light sensitive portion is obtained as shown in FIG. 65. This reduces the spatial sampling interval, resulting in high resolution.

FIG. 66 shows the layout of the equivalent light sensitive portion realized when the second image signal is obtained through shifting each image formed on the CCD 4 to Δx/2 by tilting the refraction plate 5, and then combined with the first image signal. FIG. 67 shows the layout of the equivalent light sensitive portion when the second image signal is obtained by shifting each image formed on the CCD 4 to Δx/2, third image signal by shifting to Δx/2, Δy/2, and the fourth by shifting to Δy/2, and then forming a composite image of image signals 1 through 4.

There is another prior art using image shifting to obtain high quality images by means of a solid state imaging device using a limited number of pixels. The prior art is disclosed, for example, in Japanese Unexamined Patent Publication JPA 60-54576 (1985), and its improved art is disclosed in Japanese Unexamined Patent Publication JPA 63-284980 (1988). FIG. 68 provides a perspective view showing a high quality image producing art using a principle of image shifting disclosed in JPA 63-284980 (1988). An image of an object 101 is formed on a solid state imaging device 104 of a CCD via a lens 102 and an image shift mechanism 103. An output of the solid state imaging device 4 is computed in the image forming circuit 105, and a high resolution, high quality image is produced. The image shift mechanism 103 includes a glass plate 106 with perfectly flat surfaces and means of driving 108 the angular displacement of the plate around the image shift axis which intersects the optic axis 107 of the lens 102.

High resolution can also be obtained by image shifting as shown in FIGS. 65–68 with the light sensitive portion layout shown in FIG. 64, but there are however some drawbacks. Because introduced light is sampled and received at a constant interval in the vertical and horizontal directions, the highest spatial frequency which can be dissected by CCD 4, which are the solid state imaging device generally used in video cameras, is ½ the sampling spatial frequency, in other words, the Nyquist frequency. If spatial frequencies include frequencies in excess of Nyquist frequency, spurious signals and/or moire will be produced. To prevent this, spatial frequencies higher than Nyquist frequency must be reduced prior to sampling. A spatial filter is used for this. If a spatial filter, however, is used in an optical system such as the one shown in FIG. 63 to reduce frequencies in excess of the Nyquist frequency, higher resolution cannot be obtained when image shifting is performed and sampling interval is shortened due to the fact that the higher frequencies are being reduced by the spatial filter.

FIG. 69 shows the configuration disclosed in Japanese Unexamined Patent Publication JPA 3-226078 (1991) in which two types of spatial filters are switched. With this configuration, a spatial filter 6 can be inserted on the optical axis between the lenses 1 and CCD 4 by switching the spatial low pass filter 7 for low resolution and spatial low pass filter 8 for high resolution. The spatial low pass filter 7 for low resolution and spatial low pass filter 8 for high resolution are supported by a frame. The position of the filters can be switched so that spatial low pass filter 7 for low resolution is used when image shifting is not performed, and spatial low pass filter 8 for high resolution is used when image shifting is to be performed. Instead of using image shifting only as means of obtaining high resolution, a color imaging device can be used to pick up color images at low resolution or monochrome images at high resolution. Another method would be to use a spatial low pass filter only for low resolution imaging, and retracting the filter from the optic axis for high resolution imaging.

The configuration disclosed in Japanese Unexamined Patent Publication 4-236585 in 1992 proposes an optical system that uses a rotating double refraction plate for the spatial filter to enable alteration of the transmission band, and takes advantage of blur caused by poor focusing produced by inserting a spatial filter within system's depth of focus to prevent resolution from dropping too low.

The prior art of JPA 3-226078 (1991) proposes exchanging spatial filters according to transmission band when changing the image sampling interval by image shifting. This however requires several different spatial filters, and invites higher production cost due to an increase in the number of filters, an increase in the number of parts, and increase in size of the equipment itself. There is furthermore a problem of attaining the required speed with which filters must be switched. Each time the mode is switched from low resolution to high resolution, and visa versa, one of the filters must be withdrawn from the optical axis and replaced by the other.

The example in which a spatial low pass filter is used for low resolution filming, and the filter is withdrawn from the optical axis for high resolution filming, offers improvements as far as the number of filters and speed at which they are exchanged is concerned, but the back focal distance is shorter, and must be compensated for by measures such as inserting dummy glass. Inserting dummy glass however ultimately has the same problems as the configuration where optical filters are exchanged.

The prior art of JPA 4-236585 (1992) copes with reduction in resolution by taking advantage of blur caused by poor focusing, but the mechanism for altering the frequency band by rotating the spatial filter is not elucidated in detail, and would probably be difficult to realize based upon the information given. The concept involved concerns the operation of compensating for reduction in resolution using poor focusing, and differs from the concept of using image shifting to produce resolution which is superior to that of the imaging device itself.

Inputting an image of differing resolutions by image shifting furthermore requires an image shift mechanism in addition to low pass filters for high and low resolution respectively. In the case where image shifting is achieved by altering the optical path by tilting the refraction plate, the length of the optical path subsequent to is altered by insertion of an image shift mechanism, thus necessitating compensation and improvement of the optical system.

SUMMARY OF THE INVENTION

Hence, in view of the previously mentioned problems, an object of the present invention are to provide an image input apparatus capable of switching multiple resolutions quickly and easily, and of obtaining an optimal image responsive to each resolution.

Another objective of the invention is to provide an image input apparatus which is more compact and costs less to assemble, besides the fact that the said apparatus can switch multiple resolutions quickly and easily, and is able to obtain an optical image for each resolution.

The invention provides an image input apparatus provided with image shift means for shifting a positional relation between an optical path of incident light on an imaging device and the imaging device, capable of inputting images having a first resolution and a second resolution higher than the first resolution by the image shift means, the image input apparatus comprising:

a spatial filter disposed between an optical system for inputting incident light from an object and the imaging device for receiving an image of the object, having at least two spatial frequency transmission bands which can be changed over; and control means for controlling so that in case of inputting an image of the first resolution a transmission band of the spatial filter becomes a first transmission band, and in case of inputting an image of the second resolution the transmission band of the spatial filter becomes a second transmission band which can pass spatial frequencies higher than that of the first transmission band, and the image shift means is operated to enable inputting of plural images in synchronization with a shift of the optical path of the incident light on the imaging device.

According to the invention, in the spatial filter the transmission band of spatial frequency of the incident light from the object can be changed over between the first transmission band corresponding to the first resolution and the second transmission band corresponding to the second resolution. Since in the second transmission band can be passed a spatial frequency component higher than the first transmission band, input of image without resolution reduction can be effected in inputting an image having the second resolution higher than the first resolution.

According to the invention, the transmission band of spatial frequencies of the incident light of the spatial filter is changed over among at least two spatial frequency bands, and because the spatial filter can be switched to the second transmission band which is able to pass higher spatial frequencies than the first when inputting an image of the second resolution higher than that of the first, images of different resolutions can be inputted without removing the spatial filter. Because transmission bands can be switched for the same spatial filter, the invention requires less space for movement when switching, thus enabling a more compact imaging device, and produces quality high resolution images by combining image shifting with other mechanisms.

The invention is characterized in that the image shift means is displaced between the optical system for inputting incident light from the object, and the solid-state imaging device for receiving an image from the object, and is provided with a transparent, flat refraction plate, capable of shifting an optical path of incident light on the imaging device by tilting to the optical axis.

According to the invention, the optical path of incident light on the imaging device is shifted by tilting the transparent, flat refraction plate with respect to the optical axis, thereby equivalently yielding a resolution higher than the array pitch of the light sensitive portion of the imaging device.

According to the invention, because image shift can be accomplished by tilting the transparent, flat refraction plate relative to the optical axis, resolution lower than the pixel array pitch of the imaging device can be obtained with a simple configuration.

The invention furthermore provides an image input apparatus provided with image shift means for shifting a positional relation between an optical path of incident light on an imaging device and the imaging device, capable of inputting images having a first resolution and a second resolution higher than the first resolution by the image shift means, the image shift means being capable of serving as a spatial filter disposed between an optical system for inputting incident light from an object and the imaging device for receiving an image of the object, having at least two spatial frequency transmission bands which can be changed over, the image shift means being such constructed that a part of the spatial filter is inclined to an optical axis to shift an optical path of incident light on the imaging device, the image input apparatus comprising:

control means for controlling so that in case of inputting an image of the first resolution a transmission band of the spatial filter becomes a first transmission band, and in case of inputting an image of the second resolution the transmission band of the spatial filter becomes a second transmission band which can pass spatial frequencies higher than that of the first transmission band, and the image shift means is operated to enable inputting of plural images in synchronization with a shift of the optical path of the incident light on the imaging device.

According to the invention, the first and second transmission bands of the spatial filter can be switched to correspond with the first and second resolutions, and the spatial filter can be made to function as image shift means by tilting a portion of the spatial filter relative to the optical axis. The second resolution is switched by image shifting so that it is higher than the first resolution, and because the second transmission band can pass higher spatial frequencies than the first transmission band, a high resolution image can be obtained while preventing an increase in back focal distance which may accompany the insertion of an image shift mechanism. Furthermore, a combination of image shifting and spatial filter can be used to realize a more compact optical system.

Furthermore according to the invention, the image shift means to produce an image of the second resolution, which is higher than the first resolution, by altering the optical path by which light is introduced to the imaging device, and one or more of the spatial filter's double refraction plates can be relatively rotated or inclined to switch to the first or second transmission band corresponding to the first and second resolutions, respectively, thereby enabling a configuration whereby the means of image shifting and spatial filter can be incorporated into a single mechanism. This reduces the number of parts required, and prevents increase in back focal distance by insertion of a image shift mechanism, thus realizing a compact optical system.

The invention is characterized in that images having the first resolution are moving images.

According to the invention, since the images having the first resolution are moving images, it is possible to pick up both moving and still images.

Furthermore according to the invention, since the images having the first resolution are moving images, smooth moving images can be obtained by making use of images continuously formed by the imaging device. This is very convenient for users because it enables moving images and high resolution still images to be picked up by a single imaging apparatus.

The invention is characterized in that the spatial filter is composed of two or more double refraction plates which are supported so as to relatively rotate around an axis parallel to the optical axis, and a transmission band of the spatial filter can be changed over between the first transmission band and the second transmission band by the relative rotation between the first and the second transmission bands.

According to the invention, since the transmission band can be changed over by the relative rotation of the two or more double refraction plates, and there is no need to move the spatial filter itself from the optical axis, transmission bands can bed quickly changed over with a simple mechanism.

According to the invention, since the transmission bands can be changed over by relative rotation of the two or more double refraction plates, the mechanism can be easily formed using conventional double refraction plates of spatial filters. Furthermore, because there is no need to exchange spatial filters in accordance with the resolution, the resolution changeover mechanism is less complicated, less space is required, and increase in production cost of the image input apparatus can be prevented.

The invention is characterized in that a relative rotation angle between the double refraction plates can be altered approximately 45 degrees for the first and second transmission bands.

According to the invention, since changeover of transmission bands can be carried out by the change in rotation angle of approximately 45 degrees, the moving mechanism requires a less change distance for switching, thus enabling fast changeover. The mechanism is also less complicated, thus enabling downsizing and enhanced durability.

According to the invention, since transmission bands can be switched simply by changing the relative rotation angle between the double refraction plates by only approximately 45 degree, the mechanism for switching requires a less transfer distance, thus enabling fast switching of transmission bands, and a more durable mechanism.

The invention provides an image input apparatus comprising:

(a) a lens for condensing light from an object;
(b) an imaging device having an imaging surface consisting of multiple pixels, for imaging the object introduced through the lens;
(c) a variable spatial filter positioned between the lens and the imaging device, which is provided with plural double refraction plates arranged in sequence along an optical axis of the lens, and which alters the spatial frequency characteristic of incident light from the lens;
(d) driving means for an image shift mechanism, for carrying out image shift by shifting an image of the object on the imaging surface by angularly displacing at least one of the double refraction plate forming the variable spatial filter around an image shift axis which intersects the optical axis of the lens;
(e) control means for controlling:
a first operation mode where the image of the imaging device is obtained by operating the variable spatial filter so as to bring an effect of controlling a spatial frequency and by setting the at least one double refraction plate to a predetermined position, and
a second operation mode where the variable spatial filter is operated so that the transmission band of he spatial filter can be extended upto a higher band than that in the first operation mode, and images from the imaging device obtained before and after image shift operation by the driving means for image shift are composited and arithmetically operated to improve the images in resolution.

According to the invention, an optical low pass filter, which produces a spatial frequency limiting effect, functions as means of controlling the variable spatial filter when in the first mode which obtains low resolution images. This enables frequencies sampled from among those of the object formed on the imaging surface of the imaging device which are in excess of Nyquist frequency f/2 to be blocked. When the imaging device comprises, for instance, so-called (a) a monochrome single-plate and (b)a color 3-plate construction, this enables luminance moire to be prevented, and when it is of Bayer array single-plate color construction, it enables luminance moire and color moire to be prevented. Monochrome single-plate construction is a construction whereby each pixel of the imaging device derives a signal of the level corresponding to monochrome luminance. The Color 3-plate construction is a construction whereby the object image is broken down into the three prime colors of red, green and blue by a prism, and a total of three imaging devices are used to receive each color. Bayer array single-plate color construction provides pixels for receiving light of the three primary colors arranged in rows as shown in FIGS. 48 and 57.

According to the invention, the imaging device may be configured otherwise, or furthermore may be realized by semiconductors such as the CCD (Charge Coupled Device).

In the second operation mode, before and after angular displacement of the one or more double refraction plates making up the spatial filter around the image shift axis by the driving means for image shift, images from the imaging device are composite-computed by the means of control to enhance resolution, thus producing a high resolution image. In this operation mode, the spatial frequency limiting effect is diminished in comparison with the first operation mode, or is completely lost, and the variable spatial filter is consequently operated to produce wide band The degree of angular displacement for the one or more double refraction plates for which angular displacement is executed to achieve image shift is extremely slight. It therefore has no negative affect on the variable spatial filter, thus allowing it to function to reduce the spatial frequency limiting effect.

In the second operation mode, because angular displacement is executed for the one or more double refraction plates which make up the spatial filter to achieve image shift, the need for an individually installed image shift mechanism 13 and variable spatial filter 12 described for the proposed art relating to FIGS. 1–19 is eliminated with the present invention. This allows the length of the optical path of the present image input device to be shortened. This in turn makes for a more compact construction, and allows assembly and production costs to be reduced.

According to the invention, the image shift operation can be achieved by changing the tilt angle of at least one of the double refraction plates making up the spatial filter. This makes for a simpler configuration, enables length of the optical path to be shortened, and enables a more compact construction.

The invention is characterized in that:

the variable spatial filter include:

- a first filter including at least one double refraction plate;
- a second filter including at least one double refraction plates; and
- driving means for filter, for driving the first and the second filter by relatively displacing in angle around an axis parallel to an optical axis of the lens the image shift mechanism driving means drives one of the first and the second filter in angular displacement by tilting the one filter around an axis intersecting the optical axis of the lens; and the control means sets:

in the first operation mode, the one filter at the predetermined first image shift angular displacement position by the image shift mechanism driving means, under a condition that the first and the second filter are set to the first filter angular displacement position of each filter by the filter driving means, and in the second operation mode, the one filter at the first image shift angular displacement position and at the second image shift angular displacement position different from the first image shift angular displacement position by the image shift mechanism driving means, under a condition that the first and the second filter are set to the second filter angular displacement position of each filter by the filter driving means.

According to the invention, as shown by the first embodiment in FIGS. 22–40, the second embodiment in FIG. 47, the third embodiment in FIG. 48, the fourth embodiment in FIGS. 43–46, the fifth embodiment in FIGS. 47–57, and the sixth embodiment in FIGS. 58–62, variable spatial filters include the first and second filters which, in the first mode which provides low resolution images, are arranged along an angular displacement axis parallel to the optical axis 122 of the lens, and for instance, might be perpendicular if alternately positioned at the first filter angular displacement position around the angular displacement axis which matches the optical axis 122. This reduces all spatial frequencies of the object image in excess of the imaging element's Nyquist frequency f/2 to almost zero, thus achieving the role of an optical low pass filter to provide a frequency limiting effect.

In the second mode which provides high resolution images, first and second filters alternately positioned at the second filter angular displacement position around an angular displacement axis parallel to the optical axis of the lens. This expands the transmission band of the variable spatial filter reducing or eliminating the spatial frequency limiting effect. In this condition, either of the previously mentioned filters is set to the first and second image shift angular displacement positions by the image shift mechanism driving means. At the set first and second image shift angular displacement positions, each image output received from the imaging device is composite-computed to enhance resolution.

Each variable spatial filter includes double refraction plates divided into plural groups. In other words, the first filter may consist of a single double refraction plate, or can be configured of several double refraction plates sequentially arranged along the optical axis 122. The same applies to the second filter.

According to the invention, the first and second filters which make up the variable spatial filter can alter the spatial frequency by relative angular displacement driving around the angular displacement axis running parallel to optical axis of the lens. This simplifies the configuration of the variable spatial filter and the means of driving it, enabling more compact construction.

The invention is characterized in that:

the pixels of the imaging device are arranged in a matrix form in vertical and horizontal directions at a predetermined pitch P;

the first filter is composed of first and second double refraction plates arranged in a direction of the optical axis of the lens;

in the first operation mode, the first double refraction plate separates ordinary and extraordinary rays by a distance $d1=P/2\sqrt{2}$ in a first diagonal direction of the pixels;

the second double refraction plate separates ordinary and extraordinary rays by a distance $d2=P/2$ in a first horizontal direction of the pixels; and the second filter is composed of a third double refraction plate which separates ordinary and extraordinary rays by a distance $d3=P/2\sqrt{2}$ in the first diagonal direction and a vertical second diagonal direction of the pixels;

in the second operation mode, the filter driving means drives to angularly displace the first filter by 45 degrees around the optical axis of the lens from the first operation mode so that ordinary and extraordinary rays of the first double refraction plate are separated in the first horizontal direction and opposite second horizontal direction, and so that ordinary and extraordinary rays of the second double refraction plate are separated in the first diagonal direction and opposite second diagonal direction; and the image shift mechanism driving means drives to angularly displace the second filter so that the image of the object is shifted by P/2 in the horizontal direction and by P/2 in the vertical direction on the imaging surface.

According to the invention, as shown in FIGS. 25–35, the first filter 131 is composed of the first and second double refraction plates 133 and 134, and the second filter 132 is composed of the single third double refraction plate 135. In the first operation mode where low resolution images are obtained, the spatial frequency limiting effect can be obtained, and in the second operation mode where high resolution images are obtained, the band is expanded to reduce the spatial frequency limiting effect. Thus, when the imaging device is of a monochrome single-plate or color 3-plate construction, optimal spatial frequency characteristics where no luminance moire is produced can be obtained.

According to the invention, with respect to the imaging element, deterioration of picture quality can be reduced, and luminance moire can be prevented with what may be called a monochrome single-plate or color 3-plate configuration.

The invention is characterized in that:

the pixels of the imaging device are arranged in a matrix form in vertical and horizontal directions at a predetermined pitch P;

the pixels for receiving light of a first and a second color of three primary colors are positioned on one of the rows adjacent in the vertical direction and are arranged alternately in the horizontal direction at a predetermined pitch P, and the pixels for receiving light the second and a third color are arranged alternately on the other rows in the horizontal direction at the predetermined pitch P;

the pixels of the second color on the one row and the other row are arranged so as to be displaced by one pitch P in the horizontal direction;

the first filter is composed of the first double refraction plate which in the first operation mode separates ordinary and extraordinary rays by a distance $d4=P/\sqrt{2}$ in the first diagonal direction of the pixels;

the second filter is composed of the second and third double refraction plates positioned along the optical axis of the lens;

the second double refraction plate separates ordinary and extraordinary rays by a distance $d5=P/\sqrt{2}$ in the first diagonal direction and vertical second diagonal direction of the pixels;

the third double refraction plate separates ordinary and extraordinary rays by a distance $d6=P$ in the vertical direction;

in the second operation mode, the filter driving means drives the first filter so that the filter is displaced by an angle of 90 degrees around the optical axis of the lens from the first operation position so that the first double refraction plate separates in a third diagonal direction opposed to the second diagonal direction; and the image shift diving means drives the second filter by angular displacement to shift the image of the object by the pitch P in either the horizontal or the vertical direction on the imaging surface.

According to the invention, as shown in FIGS. 49–56, the first filter 212 is composed of a single first double refraction plate 214, and the second filter 213 is composed of the second and third double refraction plates 215 and 216. In the first operation mode which provides low resolution images, the variable spatial filter obtains a spatial frequency limiting effect, and in the second operation mode which provides high resolution images, the band is expanded to reduce or eliminate the spatial frequency limiting effect.

The imaging device is what is called a "Bayer array single-plate color" imaging device and, as shown in FIGS. 48 and 57, the first of the three primary colors (blue, for example) and the second (green, for example), make up one row 221 and are positioned alternately in the horizontal direction, and the other row 222, which forms a pair with row 221, is composed of the second color (green in the example as described above) and the third color (red) arranged alternately in the horizontal direction x. As shown in FIG. 57A, a total of four pixels 217–220 are arranged as one combination to realize the Bayer array single-plate color configuration.

Luminance data is obtained from these four pixels 217–220, and can therefore be obtained for each pixel. As for color data, signals of the first color blue and the second color green, for example, can only be obtained for each two pixels in the horizontal direction x. The color sampling spatial frequency cycle is therefore rough in comparison to that of luminance. As a result, color moire appears in the image of the object when the variable spatial filter 211 is not used, causing deterioration of picture quality when in the first operation mode. Because imaging devices of Bayer array single-plate color configuration produce better picture quality by eliminating color moire, the present invention uses a variable spatial filter 211 to prevent color moire from being produced.

According to the invention, in order to alter spatial frequency characteristics, the relative angular positions of the first and second filters which make up the variable spatial filter can be changed by driving them around the angular displacement axis which runs parallel to the optical axis of the lens. Compared with the configuration whereby two types of spatial filters have pre-established spatial frequency characteristics are prepared and switched by moving each filter, the invention enables resolution to be switched quickly and easily, while realizing a more compact configuration.

According to the invention, when the imaging device is of Bayer array single-plate color construction, luminance moire and color moire can be prevented, and deterioration of color picture quality can be reduced.

The invention is characterized in that a filter for blocking infrared rays is sandwiched between the double refraction plates which form the first filter.

The invention is characterized in that a filter for blocking infrared rays is sandwiched between the double refraction plates which form the second filter.

According to the invention, as shown in FIGS. 42 and 43, an infrared ray filter 125 is positioned between the double refraction plates 174 and 175 which form the first filter, and the infrared ray filter 125 is prevented from coming in contact with outside air by the double refraction plates 174 and 175 by which it is sandwiched. This eliminates the need for a translucent thin film coating to prevent the infrared filter from coming in contact with outside air when used by itself, thus facilitating production of infrared filters while reducing cost.

According to the invention, the filter for blocking infrared rays is sandwiched between double refraction plates, thus preventing the infrared ray filter from coming in contact with outside air, and eliminating the need for translucent thin film coating to prevent the infrared filter from coming in contact with outside air when used by itself. This reduces production cost while enabling a more compact configuration.

The invention is characterized in that the filter driving means includes:

a housing;

a supporting member for supporting the first filter, arranged in the housing so as to be displaced by 45 or 90 degrees around the optical axis of the lens;

a lever provided on the housing, capable of being displaced around an axis parallel to the optical axis, a projection being provided on one of the supporting member and one end of the lever, a guiding long hole being formed on the other of the supporting member and the one end of the lever, which guiding long hole guides the projection fitted thereto and extends in a radial direction of the optical axis; and a spring provided on one of the housing and the supporting member, and on the other of the housing and the supporting member is formed a mesh concave or projection which meshes with the spring at the respective angular displacement positions in the first and the second operation mode.

According to the invention, as shown in FIGS. 44–46, the variable spatial filter and filter driving means are combined into a unit. This enables more compact construction simplifies installation and adjustment of lenses in the lens system, and reduces production cost.

According to the invention, the variable spatial filter and filter driving means are contained in the housing as a unit, thus enabling more compact construction simplified installation and adjustment of lenses in the lens system, and reduced production cost.

The invention is characterized in that in the housing is provided the image shift mechanism driving means so as to be shifted from the filter driving means in the optical axis direction, and the image shift mechanism driving means drives to angularly shift the second filter by a piezoelectric member.

According to the invention, the image shift mechanism driving means is composed of piezoelectric members 166, 167 which drive angular displacement of the first and second filters which make up the variable spatial filter as shown in FIG. 37, and is provided in the housing 182 as shown in FIGS. 44–46. This enables angular displacement drive of the first and second filters around the filter angular displacement axis running parallel to the optical axis of the lens for the variable spatial filter, and the image shift tilt drive by piezoelectric member of the first and second filters to be carried out within the housing. This enables simpler, more compact construction, simplifies installation and adjustment of lenses in the lens system, and reduces production cost.

According to the invention, the image shift mechanism driving means realized by a piezoelectric member for displacing the angular position of the second filter and shifting images is provided in the housing. This enables unit configuration, makes possible more compact construction, simplifies installation and adjustment of lenses in the lens system, and reduces production cost. Because it uses a piezoelectric member to tilt the second filter for image shifting, construction can be made further compact, and image shifting can be performed faster while consuming less power.

BRIEF DESCRIPTION OF THE DRAWINGS

Other and further objects, features, and advantages of the invention will be more explicit from the following detailed description taken with reference to the drawings wherein:

FIGS. 24A, 24B are drawings for describing the double refraction phenomenon of the first double refraction plate 133;

FIG. 25 is a simplified perspective view showing a status of first through third double refraction plates 133–135 of the spatial filter 124 in a first operation mode;

FIG. 38 is a side view diagram for describing a principle of image shift operation of the third double refraction plate 135;

FIGS. 39A, 39B are views for describing the displacement of the object image before and after image shifting in the imaging device 126;

FIG. 40 is a view for describing the operation for obtaining a high resolution image composed of two object images obtained in FIG. 39A and 39B before and after image shifting in the second mode;

FIGS. 57A, 57B are views for describing an object image obtained when the image shift operation is carried out using the second filter 213 in the second operation mode;

FIG. 58 is a block diagram showing the entire configuration of an image input apparatus of another embodiment of the invention;

FIG. 65 is a simplified front view showing an array of a light sensitive portion of an equivalent imaging device for which resolution has been enhanced by image shifting;

FIG. 66 is a simplified front view showing an array of a light sensitive portion of an equivalent imaging device for which resolution has been enhanced by image shifting;

FIG. 67 is a simplified front view showing an array of a light sensitive portion of an imaging device for which resolution has been enhanced by image shifting;

DETAILED DESCRIPTION OF THE PREFERRED EMBODIMENTS

Figure 1:
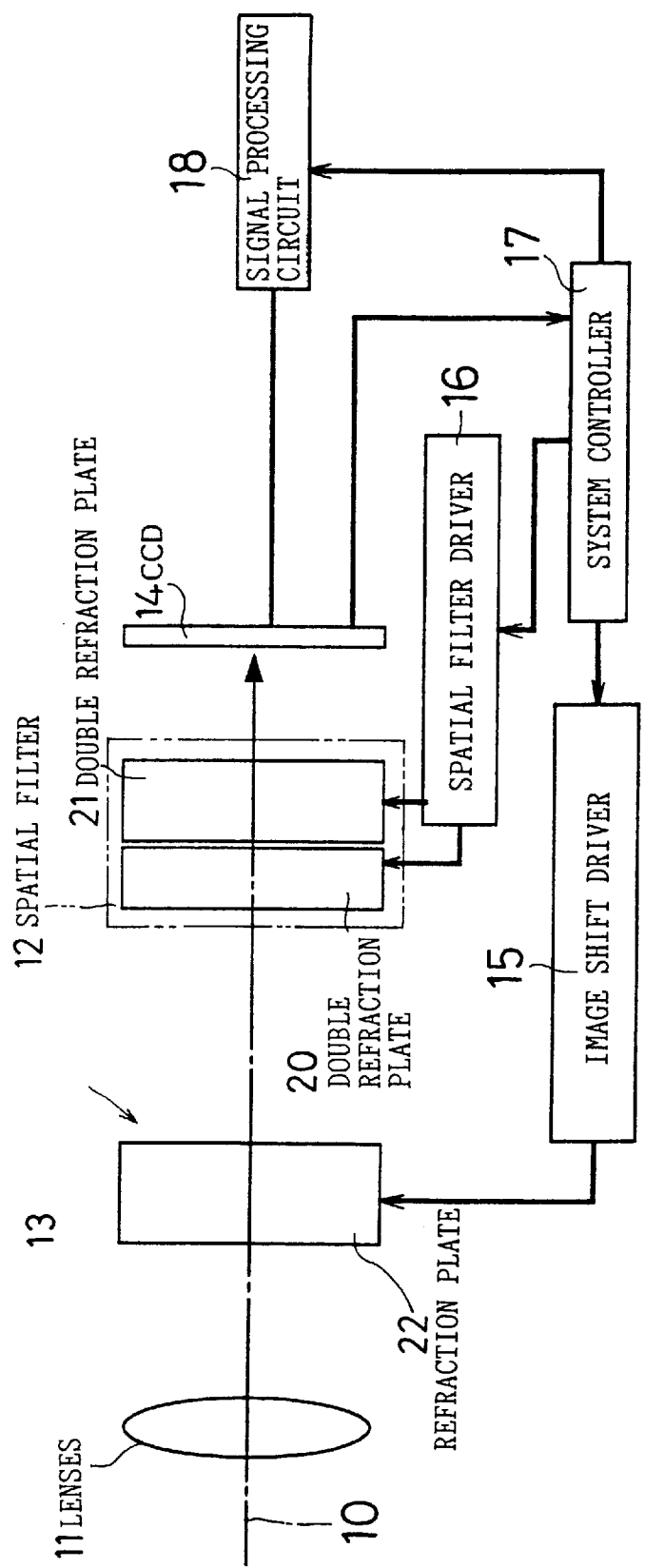
FIG. 1 is a block diagram showing a rough configuration of one embodiment of the invention.

Now referring to the drawings, preferred embodiments of the invention are described below.

FIG. 1 shows a rough configuration of one embodiment of the invention. An image from an object is introduced along an optical axis 10 of a condenser lens group 11, and through the lens group, a spatial filter 12 and an image shift mechanism 13 positioned between the lens group 11 and the spatial filter 12, and is formed on an imaging surface of a CCD 14 which is a solid state imaging device. The image shift mechanism 13 and spatial filter 12 are mechanically operated by an image shift mechanism driving apparatus 15 and a spatial filter drive apparatus 16, respectively. The image shift mechanism driving apparatus 15 and spatial filter drive apparatus 16 are controlled by a system controller 17. An output corresponding to an image formed on the imaging surface of the CCD 14 is converted to a video signal by a signal processing circuit 18.

The spatial filter 12 includes two double refraction plates 20, 21 which can be reciprocally rotated around the optical axis 10 to alter the transmission band in frequencies of which where the spatial filter can be passed. The configuration and operating principle of the spatial filter 12 will be covered later on. The image shift mechanism 13 works fundamentally the same as the prior art shown in FIG. 63, with image shifting being accomplished by tilting a flat refraction plate 22 in relation to an optical axis 10 to alter the optical path by which light is introduced to the imaging surface of the CCD 14.

When inputting images in the first resolution which is the original resolution of the CCD 14, the system controller 17 sends normal resolution control signals to the image shift mechanism driving apparatus 15 and spatial filter drive apparatus 16. Image shift mechanism driving apparatus 15 stops the refraction plate 22 at the position where its front surface is almost perpendicular to the optical axis 10. The light introduced from the object passes through the lenses 11, refraction plate 22, double refraction plates 20, 21 and forms an image on the CCD 14. The spatial filter drive apparatus 16 reciprocally rotates the double refraction plates 20, 21, and stops the transmission band of light introduced at the position which is to serve as the first transmission band where moire is not produced by the first resolution. The CCD 14 outputs a signal corresponding to the image formed on the imaging surface which is converted to a video signal by the signal processing circuit 18. Video signals can be output as still images stored in the image memory, or can be output as moving images which can be displayed on a CRT as conventional video signals.

When forming images in the second resolution by which images of resolution higher than the first resolution can be obtained, the system controller 17 provides high resolution control signals to the spatial filter drive apparatus 16 which reciprocally rotates the double refraction plates 20, 21 of the spatial filter 12 around the optical axis 10. The spatial filter drive apparatus 16 stops the transmission band for light introduced to the double refraction plates 20, 21 of the spatial filter 12 at the position to serve as the second transmission band which can pass a spatial frequency band higher than the first transmission band. The system controller 17 then sends a control signal to the image shift mechanism driving apparatus, and in the same manner as the prior art described in FIG. 63 and FIGS. 23–26, tilts the refraction plate 22 of the image shift mechanism 13 relative to the optical axis 10 each time a frame of the image is taken, and shifts the position where the image is formed on the imaging surface of the CCD 14 to two or four locations. In synchronization with such image shifting, the system controller 17 also sends control signals to the CCD 14 and signal processing circuit 18 to produce image data of resolution higher than the first resolution by creating a composite image. In other words, control is carried out to produce image data of short spatial sampling interval.

Figure 2:
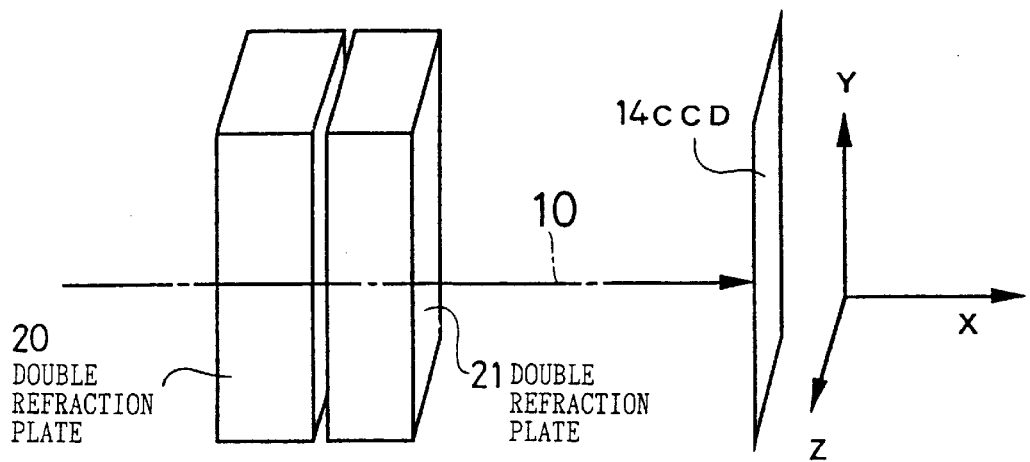
FIG. 2 is a schematic perspective view showing a configuration of a spatial filter 12 used in the embodiment of FIG. 1.
Figure 3A:
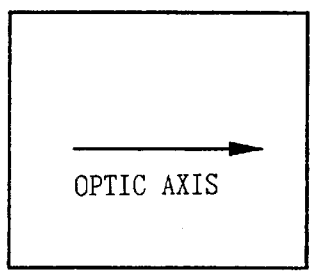
FIGS. 3A and 3B are projection views showing directions of optic axes of double refraction plates 20, 21 of the spatial filter 12 of FIG. 2.
Figure 3B:
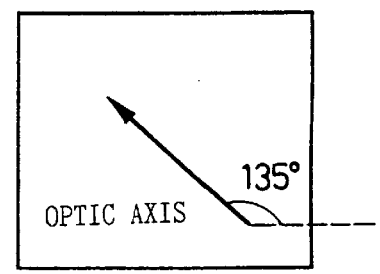
Figure 4:
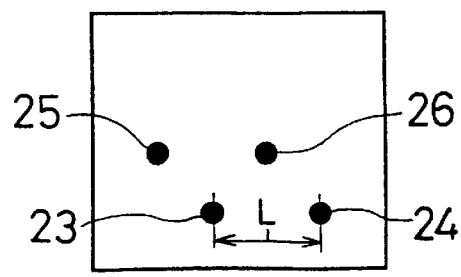
FIG. 4 is a view showing a separation status when an image of incident light is formed on an imaging surface of a CCD 14 by double refraction plates 20, 21 having optic axes of the bearings shown in FIG. 3.

FIGS. 2, 3 and 4 show the principles by which the transmission band can be altered by reciprocal rotation of the spatial filter's 12 double refraction plates 20, 21. For convenience of explanation, the example shows a case where the transmission band is altered by immobilizing one double refraction plate 20 while rotating the other 21. FIG. 2 assumes three orthogonal axis direction whereby the x axis runs in the direction of the optical axis 10, and the z and y axes respectively run the horizontal and vertical directions of the pixel array of the imaging surface of the CCD 14. In FIG. 2 there is clearance between the two double refraction plates 20, 21, but the plates may touch as well. The double refraction plates 20, 21 are rectangular in shape, but if effective luminous flux can pass through the first and second transmission bands, other shapes such as round may used as well. The optic axis direction of the double refraction plates 20, 21 are brought up at an angle of approximately 45 degrees relative to the optic axis by which light is introduced. FIG. 3 shows projection of the optic axis of the double refraction plates 20, 21 to the zy plane. The optic axis of the double refraction plate 20 shown in FIG. 3A is projected in the z axis direction for the zy plane, and the optic axis direction of the double refraction plate 21 shown in FIG. 3B is projected at an approximately 135 degrees angle in the counterclockwise direction from the z axis with the origin of the zy plane as the center. As shown in FIG. 4, light introduced to the double refraction plates 21, 21 is separated into ordinary and extraordinary rays, and the image if formed of the separated light on the CCD 14. The light is first separated by the double refraction plate 20 into an ordinary ray image 23 and an extraordinary ray image 24, at double refraction plate 21 the image is formed of the respective elements of images 23 and 24 which pass through unchanged as ordinary rays and the elements as extraordinary rays, with images 25, 26 being added. With the configuration of the previously mentioned double refraction plates 20, 21, luminance of the four separation point images 23–26 is about equal, and the distance between separation points L in the horizontal direction can be made about the same as the distance between light sensitive portions of the CCD 14.

Figure 5:
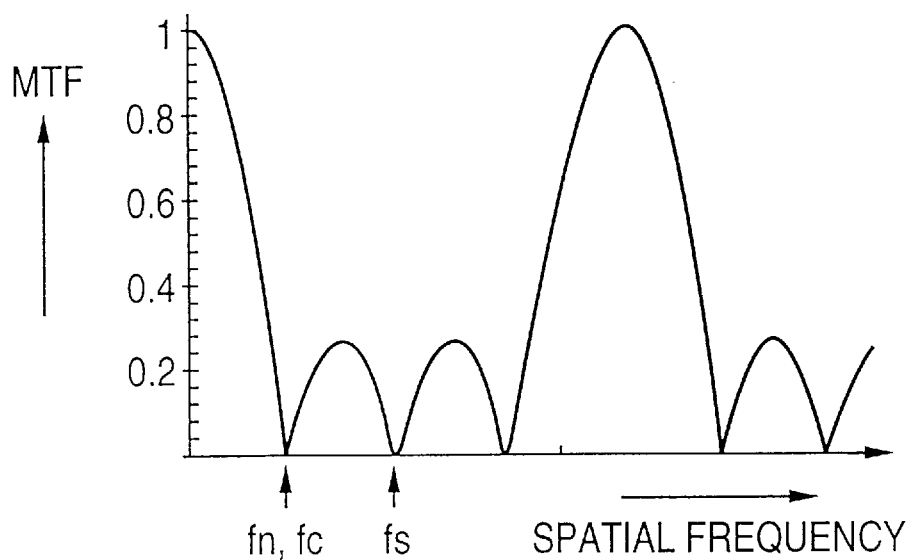
FIG. 5 is a graph showing transmission bands of a spatial filter realized by combination of the optical axes of FIG. 3.

FIG. 5 shows an example of a transmission band whereby the spatial filter is made to correspond to a ⅓-inch CCD 14. The separation amplitude of ordinary and extraordinary rays is 7.5 $\mu$m for double refraction plate 20, and 5.3 $\mu$m for double refraction plate 21. The Nyquist frequency fn which is half the sampling frequency fs agrees with the cut-off frequency fc of the spatial filter 12, and because the transmission band for frequencies in excess of the Nyquist frequency fn is reduced, production of spurious signals and moire is eliminated.

Figure 6A:
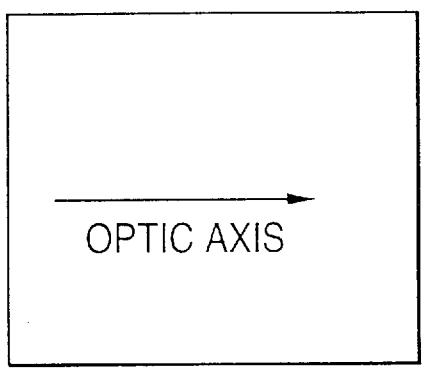
FIGS. 6A and 6B are projection views showing directions of optic axes where a second transmission band capable of passing a higher transmission frequency band than a first transmission frequency band is obtained in the spatial filter of FIG. 2.
Figure 6B:
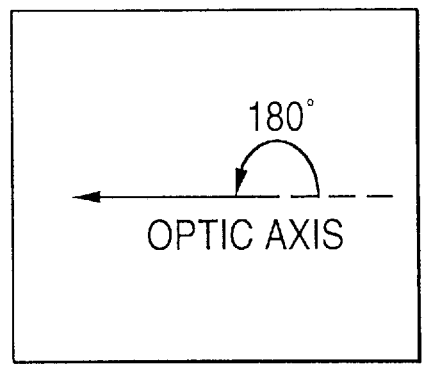
Figure 7:
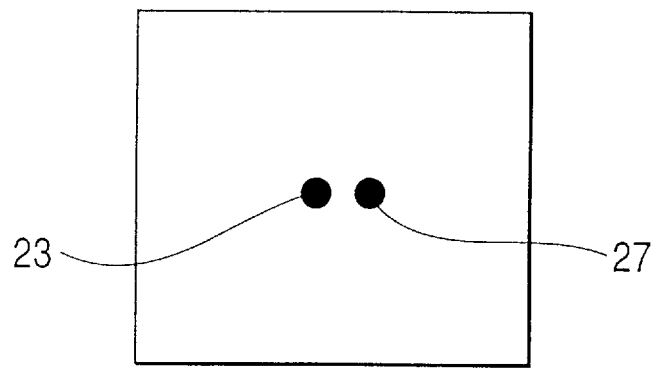
FIG. 7 is a view showing a separation status when an image of incident light is formed on the CCD 14 in correspondence to projection of the optic axes of FIG. 6.

FIGS. 6 and 7 show the configuration for switching the spatial filter 12 to the second transmission band which is a higher frequency band than the first frequency band. FIG. 6 shows the projection in optic axis directions (a) and (b) for the zy planes of the double refraction plates 20, 21. The optic axis of double refraction plate 20 runs in the z axis direction, and that of double refraction plate 21 runs at an approximately 135 degrees angle in the counterclockwise direction from the z axis with the origin of the zy plane as the center. With this sort of spatial filter 12 configuration, as shown in FIG. 7, introduced light is separated into ordinary and extraordinary rays by the double refraction plates 20, 21, forming two separation point images 23 and 27 when it strikes the imaging surface of the CCD 14. The luminance of the two separation point images 23 and 27 is approximately the same, and distance between separation points is 2.2 μm.

Figure 8:
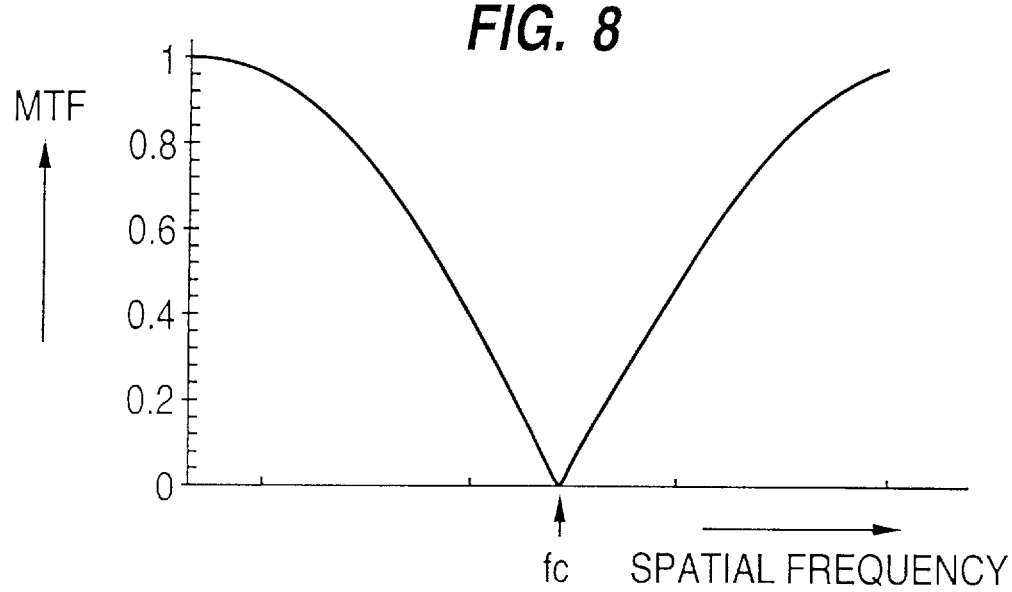
FIG. 8 is a graph showing a transmission band of the spatial filter which can be obtained in correspondence to the positioning of the optic axes of FIG. 6.

FIG. 8 shows the transmission band of the spatial filter 12 configured as shown in FIGS. 6 and 7. If you compare with FIG. 5, you can see that the cut-off frequency fc shifts to a high band, and frequencies can be passed at a higher frequency band. The spatial sampling interval is therefore shortened by image shifting, and because high band frequency elements can be passed, high resolution images can be obtained even if the sampling frequency fs is raised.

In comparison with the configuration of the spatial filter 12 of the first and second transmission bands show in FIGS. 3 and 6, the optic axis of the double refraction plate 21 is altered approximately 45 degrees in the counterclockwise direction on the xy surface. To switch to such a transmission band, therefore, you can change the approximately 45 degrees angle of the double refraction plate 21 in the counterclockwise direction around the optical axis 10 from the first band shown in FIG. 3. To switch from the second to the first transmission band, you can change the approximately 45 degrees angle in the clockwise direction around the optical axis 10. The spatial filter 12 can be switched at a rotation angle comparatively small to the 45 degrees angle, so only a small amount of time is required for switching the transmission band and the distance of transfer is slight, thus enabling a more durable construction. In addition to this, a similar effect can be obtained even if the positions of the two double refraction plates 20, 21 are exchanged relative to the optical axis 10 direction, so positioning of the double refraction plates 20, 21 relative to the optical axis 10 can be exchanged.

Figure 9:
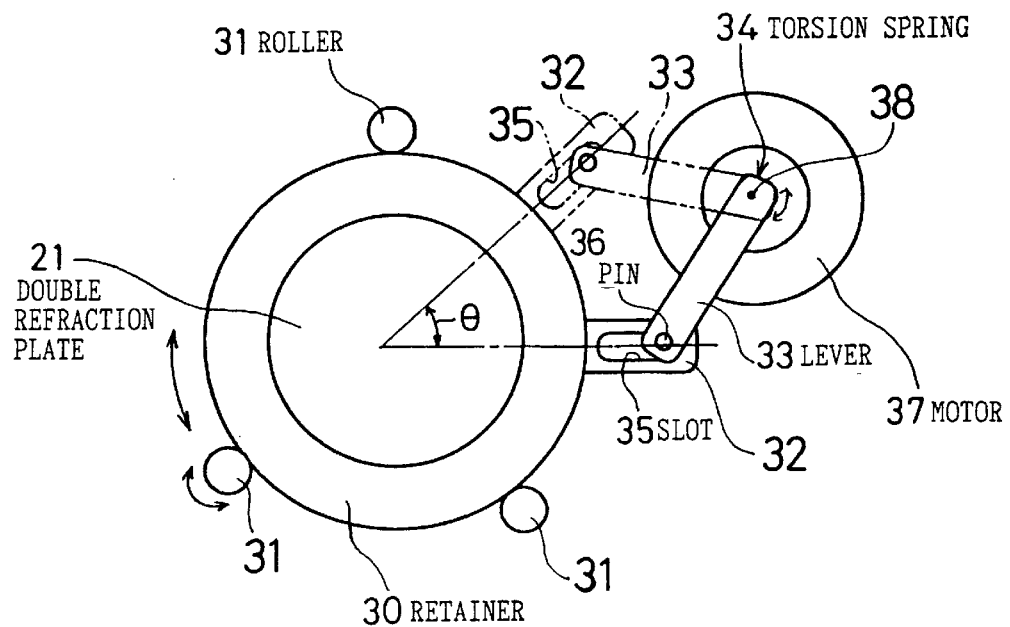
FIG. 9 is a simplified front view showing an example of configuration of a spatial filter drive apparatus 16 for turning a refraction plate 21 of the embodiment of FIG. 1.
Figure 10:
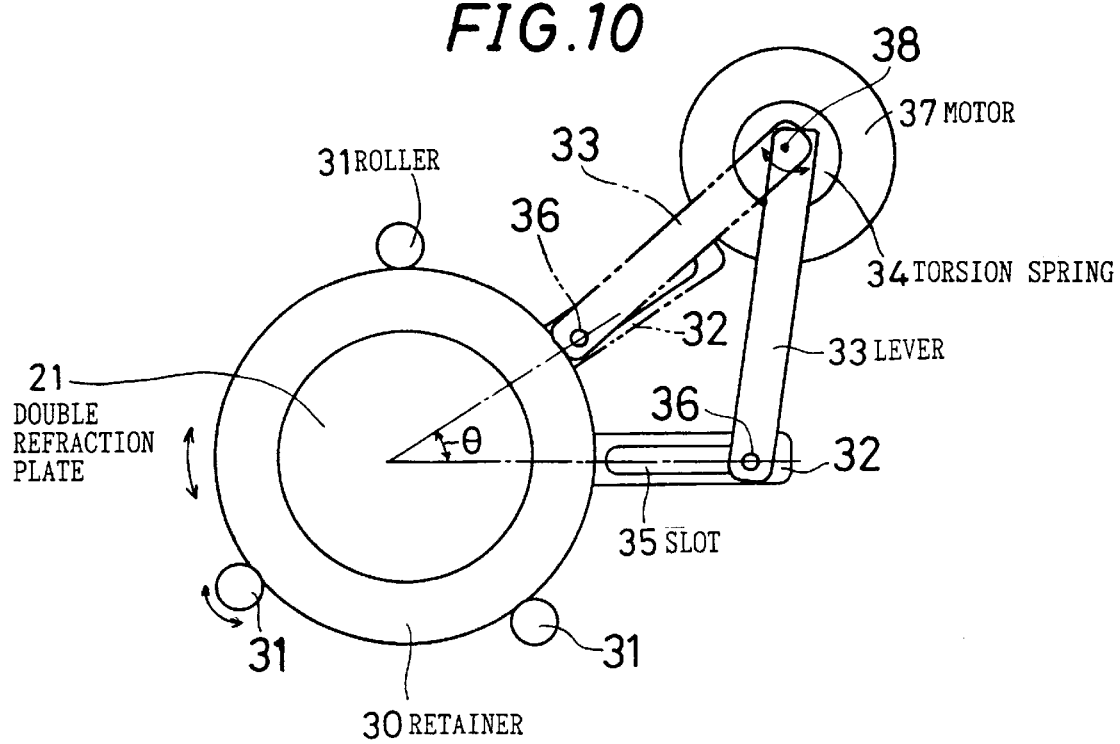
FIG. 10 is a simplified front view showing another example of configuration of the spatial filter drive apparatus 16 for turning the refraction plate 21 which makes up the spatial filter 12 of FIG. 1.

FIGS. 9 and 10 show an example configuration of the spatial filter drive apparatus 16 which reciprocally rotates double refraction plate 21 in relation to double refraction plate 20. The double refraction plate 21 is round, and its outer edge is supported by a circular retainer 30. The retainer 30 is supported by rollers 31 at least three points on its circumference, and is able to rotate around the optical axis or axis running parallel to it. A protrusion 32 is provided on the outer edge of the retainer which is linked with a lever 33. The lever 33 is energized in one direction by the torsion spring 34. The protrusion is provided with a slot extending in the radial direction of double refraction plate 21 and the retainer 30, and is coupled by a pin 36 fastened on one end of the lever 33. The other end of the lever 33 is fastened to the end of the rotary shaft of the motor 37. The axis direction of the rotary shaft 38 is parallel to the rotation axis of double refraction plate 21 and the retainer 30. The torsion spring 34 is pressed around the rotary shaft 38 so that the lever 33 is positioned as indicated by the solid line of FIG. 9. The status indicated by the solid line in FIG. 9 is the position that corresponds to the first transmission band when driving force is not generated by the motor 37.

When power is fed to the motor, and rotation drive force is generated in the clockwise direction of FIG. 9, if rotation drive force exceeds spring energy of the torsion spring 34, the lever 33 oscillates around the rotary shaft 38 in the clockwise direction. Transfer is limited by the end of the slot, with the pin 36 stopping at the position indicated by the dotted line. The stop position at this time is the position of the second transmission band of the spatial filter 12. When the lever oscillates between the position corresponding to the first transmission band indicated by solid lines and the position corresponding to the second transmission band indicated by dotted lines, the pin 36 moves within the slot 35. In FIG. 9, the pin 36 is positioned when located at the outer radial direction of the slot 35, but as shown in FIG. 10, a configuration whereby the position of the end of the slot 35 where the pin 36 corresponding to the first transmission band indicated by solid lines and where the pin 36 corresponding to the second transmission band indicated by dotted lines change is also possible. In other words, in FIG. 10, positioning of the end of the outer radial direction of the slot 35 is carried out for the first transmission band, and positioning of the end of the inner radial direction of the slot 35 is carried out for the second transmission band. The length of the lever 33 and slot 35 differ for the configurations of FIGS. 9 and 10. As shown in FIGS. 9 and 10, the end of the slot 35 serves as the limit position deciding the rotation angle of double refraction plate 21, thus enabling the configuration of the spatial filter drive apparatus to be made simpler and more compact, and enables transmission band to be switched more quickly.

Figure 11:
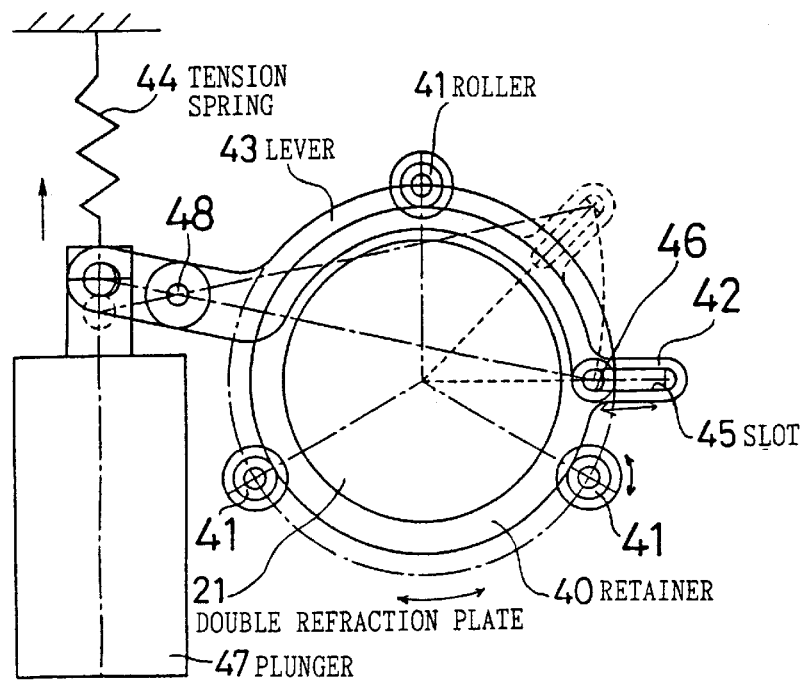
FIG. 11 is a simplified front view showing a status for obtaining one transmission band by another configuration of the spatial filter drive apparatus 16 for turning the refraction plate 21 of the spatial filter 12 of the embodiment of FIG. 1.
Figure 12:
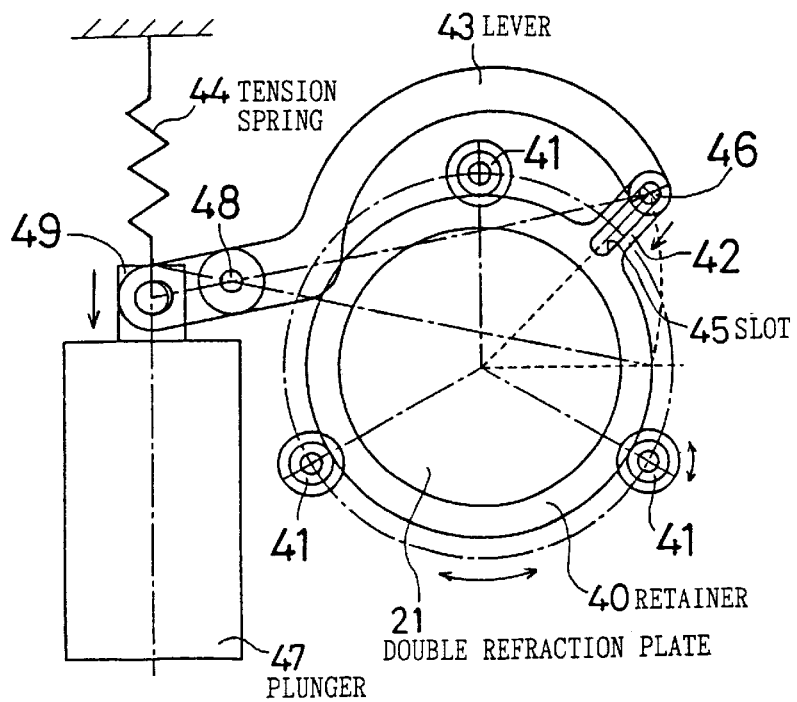
FIG. 12 is a simplified front view showing a status of the spatial filter drive apparatus 16 shown in FIG. 11 for another transmission band.

FIGS. 11 and 12 show other example configurations of double refraction plate 21 of the spatial filter 12 and spatial filter drive apparatus 16. The outer edge of the round double refraction plate 21 is supported by a circular retainer 40. The outer edge of the retainer 40 is supported by rollers 41 at a minimum of three points which enables it to be rotated. The axis of rotation is parallel to the optical axis by which light is introduced. A protrusion 42 is provided on the outer edge of the retainer 40, and is coupled with one end of the lever 43. The lever 43 is equipped with an arc-shaped portion which matches the shape of the retainer 40, and is configured so as not to block out introduced light. The other end of the lever 43 is energized in the upward direction of FIG. 11 by the tension spring 44. The coupling of one end of the lever 43 and the protrusion 42 is carried out by the slot 45 stretching in extending on the protrusion 42 in the outer radial direction of the retainer 40, and the pin 46 provided on one end of the lever 43. The pin 46 can be moved within the slot 45 in the radial direction of the retainer 40. The other end of the lever 43 can be pulled by a plunger 47 in the opposite direction from which it is pulled by the tension spring 44. A shaft 48 is provided in between one end of the lever 43 and the arc-shaped portion to serve as a pivot for displacement. The movable part 49 of the plunger 47 can be moved up and down in the vertical direction of the drawing, with the movable part 49 being coupled with the other end of the lever 43.

FIG. 12 shows the movable part 49 of the plunger 47 when it is sucked in. The suction force of the plunger 47 is greater than the tensile force of the tension spring 44, and as a result, the lever 43 changes the angle of the shaft 48 on the pivot, the pin 46 is changed from the position where it had been coupled with the slot 45 in the inner radial direction, to the position where it is coupled with the slot 45 in the outer radial direction. Transfer of the lever 43 turns the retainer 40, thus enabling the direction of the optic axis of double refraction plate 21 to be altered.

If the status where the end of the lever 43 is pulled by tension spring 44 without generating driving force on the plunger shown in FIG. 11 uses a certain position to be the first transmission band, and the status shown in FIG. 12 where the double refraction plate 21 is rotated by suction force of the plunger 47 uses a certain position as the second transmission band, the rotation angle of the double refraction plate 21 is decided by those two stop positions, making the mechanism both simple and compact, and realizes a spatial filter drive apparatus that can quickly switch transmission band of the spatial filter 12.

Figure 13:
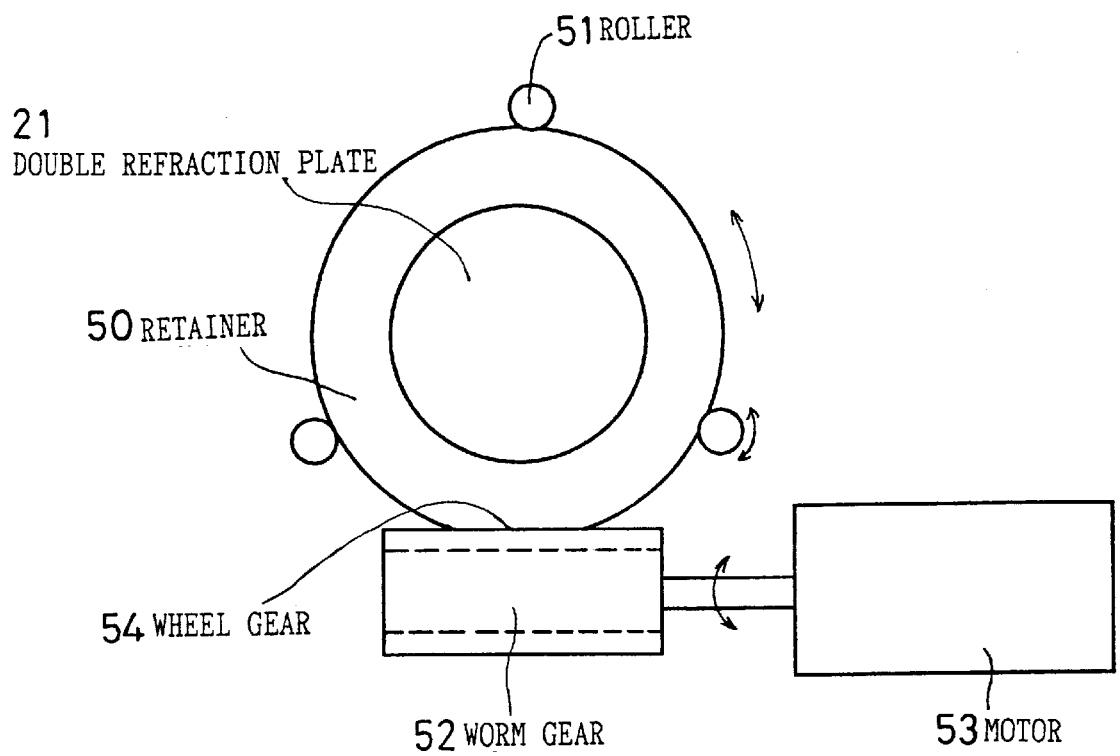
FIG. 13 is a simplified front view showing another configuration of the spatial filter drive apparatus 16 for turning the refraction plate 21 of the spatial filter 12 of the embodiment of FIG. 1.

FIG. 13 shows another example configuration for the spatial filter drive apparatus. The double refraction plate 21 is round, and its outer edge is supported by a circular retainer 50. The retainer 50 is supported by rollers 51 at least three points on its circumference, and is constructed as to be able to rotate around the optical axis and axis running parallel to it. Rotation drive force is transmitted from a worm gear 52 to the outer edge of the retainer 50. The worm gear 52 is turned by a motor 53, and as the worm gear 52 turns, rotation drive force is transmitted to the retainer 50 via a wheel gear formed on the outer edge of the retainer 50. Because motor 53 speed corresponds to the rotation angle of the retainer 50, rotation angle of the double refraction plate 21 can be detected and more precise control executed by using a tachometer, which is not included in the figure. This sort of simplified mechanism enables a more compact configuration, and enables quick switching of transmission bans for the spatial filter 12.

In the description above, one of the double refraction plates 20 is stationary, and the other 21 is turned about 45 degrees around the optical axis and axis running parallel to it. When the angle is to be reciprocally changed, let's say 45 degrees for instance, for both double refraction plates 20, 21, a configuration whereby one is turned 22.5 degrees in the clockwise direction and the other 22.5 in the counterclockwise direction is also possible.

In the past, double refraction plates 20, 21 have been used in video cameras as components of fixed band spatial filters. Using two double refraction plates 20, 21, the transmission band of the spatial filter can be altered by tilting the angle relative to the optical axis. This eliminates the need for preparing multiple spatial filters, and placing, removing or exchanging them to compensate the optical system, and therefore holds down the size of the mechanism and number of parts. Furthermore, the double refraction plates of spatial filters used in conventional video cameras can be used, thus holding down cost increase when manufacturing new spatial filters. The spatial filter mechanism is also simple and compact, so the transmission band of the spatial filter can be altered quickly.

Figures 14A, 14B:
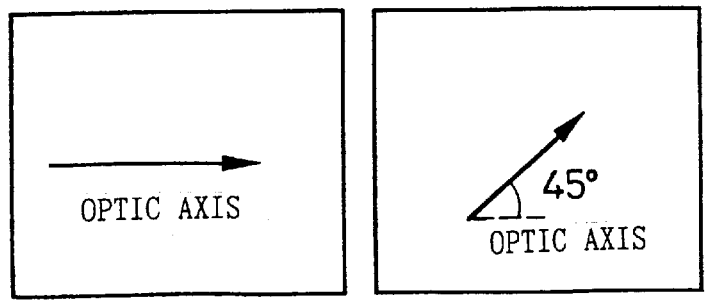
FIGS. 14A and 14B are projection views showing directions of optic axes for the double refraction plates 20, 21 shown in FIG. 2 to the yz plane showing another exam e for realizing the first transmission band.
Figure 15:
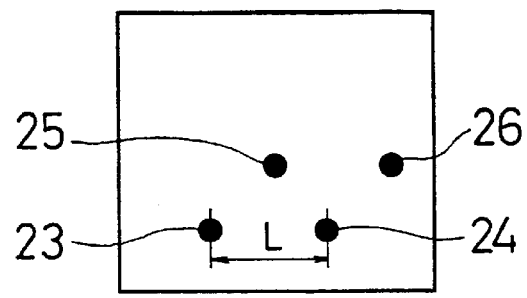
FIG. 15 is a view showing a separation status when an image of incident light is formed on the CCD 14 in correspondence to the optic axis array of FIG. 14.

FIGS. 14 shows another example of the optic axis layout for obtaining the first transmission band, and FIG. 15 shows separation of introduced light respectively with the arrangement of double refraction plates 20, 21 shown in FIG. 2. The optic axis of the double refraction plates 20, 21 is brought out at an angle of 45 degrees relative to the optic axis by which light is introduced, and as shown in FIG. 14A, projection to the yz plane of the optic axis of the double refraction plate 20 is in the z axis direction, just as with the configurations shown in FIGS. 3 and 4. With the present configuration, projection to the zy plane of the optic axis of the double refraction plate 21 is at a 45 degrees angle in the counterclockwise direction from the z axis with the origin of the zy plane as the center. Introduced light is separated into ordinary and extraordinary rays by the double refraction plates 20, 21, with images 23–26 which serve as separation points as shown in FIG. 15 being formed on the imaging surface of the CCD 14 just as in FIGS. 3 and 4. Luminance of the separation points is about equal, and the distance between separation points L in the horizontal direction is about the same as the distance between light sensitive portions of the CCD 14. The transmission band of introduced light at this time is the first transmission band just as with FIGS. 3 and 4. For the second transmission band, the double refraction plate 21 is rotated as shown in the previously described FIGS. 6 and 7. The status from FIG. 14B to FIG. 6 B can be accomplished by rotating the double refraction plate 21 135 degrees in the counterclockwise direction around the optical axis of introduced light. The position of the double refraction plates 20, 21 relative to the optical axis can be exchanged, and because rotational displacement is relative, double refraction plate 20 can be rotated while double refraction plate 21 is immobilized, or both double refraction plates may also be rotated.

Figures 16A, 16B:
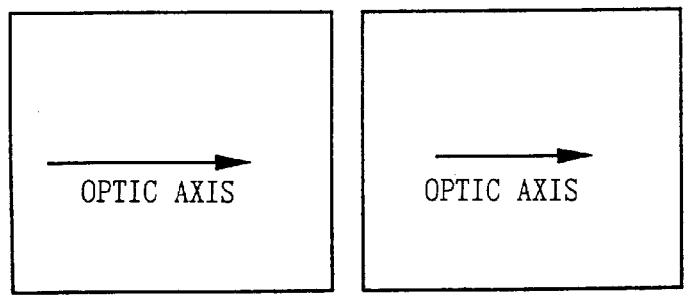
FIGS. 16A and 16B are projection views showing a direction of optic axes for the double refraction plates 20, 21 shown in FIG. 2 to the yz plane showing another example.
Figure 17:
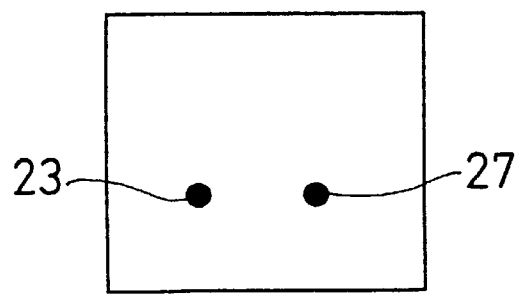
FIG. 17 is a view showing a separation status when an image of incident light is formed on the CCD 14 in correspondence to the optic axis shown in FIG. 16.

FIGS. 16 and 17 show other examples of spatial filters 12 for which transmission band can be switched with the arrangement shown in FIG. 2. The optic axis of the double refraction plates 20, 21 is brought out at an angle of 45 degrees relative to the optical axis by which light is introduced, and both double refraction plates 20, 21 are arranged in the z direction so that projection to the yz plane is as shown in FIGS. 16A and 16B respectively. Light introduced to double refraction plates 20, 21 is separated into ordinary and extraordinary rays, with images 23, 27 which serve as separation points as shown in FIG. 17 being formed on the imaging surface of the CCD 14 just as in FIG. 6. Luminance of both separation points is about equal, and the distance between separation points is about half the distance between light sensitive portions of the CCD 14. The cut-off frequency fc of the spatial filter 12 matches the Nyquist frequency fn. Because the transmission band is reduced for frequencies in excess of the Nyquist frequency fn, generation of spurious signals and moire can be reduced.

Figure 18A:
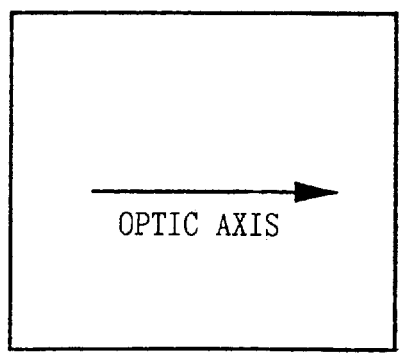
FIGS. 18A and 18B are projection views showing directions of optic axes to the yz plane when the second transmission band is realized by turning the double refraction plates having the optic axis bearings of FIG. 16.
Figure 18B:
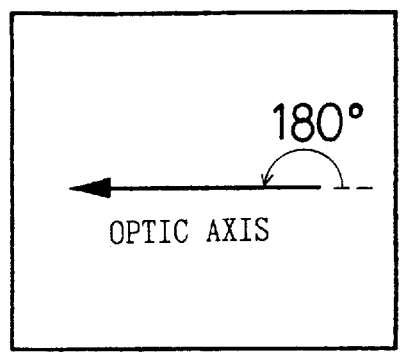
Figure 19:
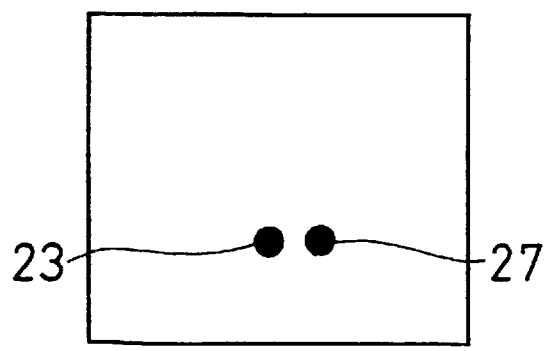
FIG. 19 is a view showing a separation status when an image of incident light is formed in directions of the optic axes shown in FIG. 18.

FIGS. 18 and 19 show an example when capturing images of the second resolution. Projection to the yz plane of the optic axis of double refraction plates 20, 21 is shown by FIG. 18A and 18B respectively. Introduced light is separated into ordinary and extraordinary rays by the double refraction plates 20, 21. Separation status upon the imaging surface of the CCD 14 is shown in FIG. 19. Luminance of the separation points is about equal, and the distance between separation points is shorter than that of FIG. 17. This causes the transmission band to shift to the high frequency side, thus realizing a spatial filter of the second transmission band. Double refraction plate 21 rotates about 180 degrees between the status shown in FIG. 16B and that of FIG. 18B. Thus the first and second resolutions can be switched by rotating the double refraction plate 21 180 degrees around the optical axis by which light is introduced. The positions of the two double refraction plates 20, 21 can obtain the same effect even if the direction of the optical axis by which light is introduced is inverted. Furthermore, because the angle of rotation is relative, the same effect can be obtained regardless of whether double refraction plate 20 is rotated, or both double refraction plates 20, 21 are rotated.

In addition to this, the present embodiment executes image shifting by taking advantage of the tilt of the refraction plate 22, but if configured so that the optical path by which light is introduced to the solid state imaging device CCD 14 is relatively shifted, resolution can be enhanced by image shifting in the same manner.

With the embodiment shown in FIGS. 1 to 19, the variable spatial filter 12 and image shift mechanism 13 are positioned in sequence and with clearance along the optical axis 10 of the lenses 11. Thus there is a problem with the size o f the configuration being enlarged, and it also costs more to assemble. Other embodiments that solve this problem are shown in FIGS. 20–62.

Figure 20:
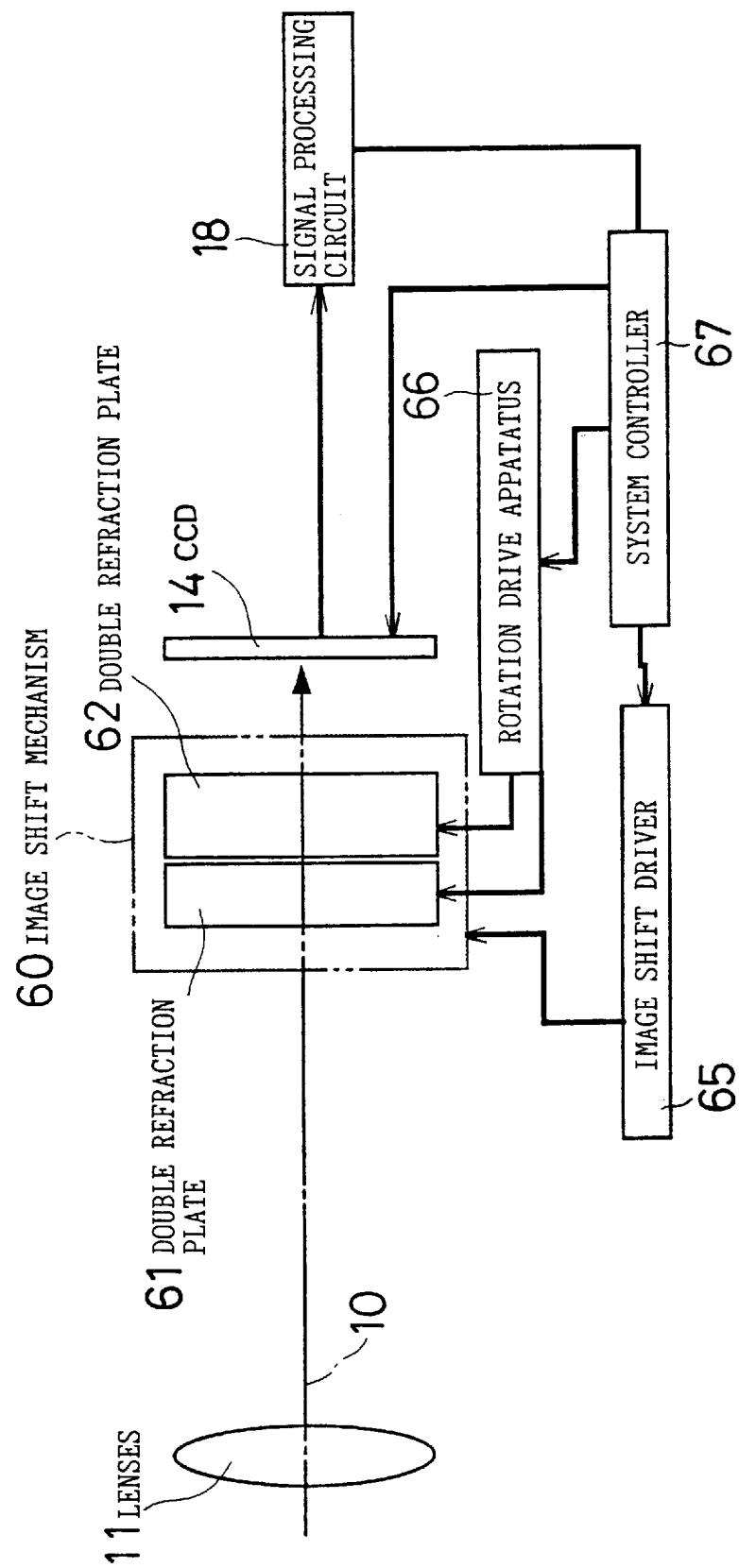
FIG. 20 is a block diagram showing a rough configuration of an image input apparatus of another embodiment of the invention.

FIG. 20 shows the configuration of the image input apparatus by another embodiment of the invention. In the present embodiment, the same reference symbols have been given to the parts corresponding to the embodiment of FIG. 1, and a redundant description has been omitted. The image shift mechanism 60 of the embodiment is driven by an image shift mechanism driving apparatus 65 for which tilts double refraction plates 61, 62 relative to the optical axis 10 by which light is introduced, and by a rotation drive apparatus 66 which reciprocally rotates double refraction plates 61, 62 around the optical axis 10. The image shift mechanism driving apparatus 65 and rotation drive apparatus 66 are controlled by the system controller 67.

Figure 21:
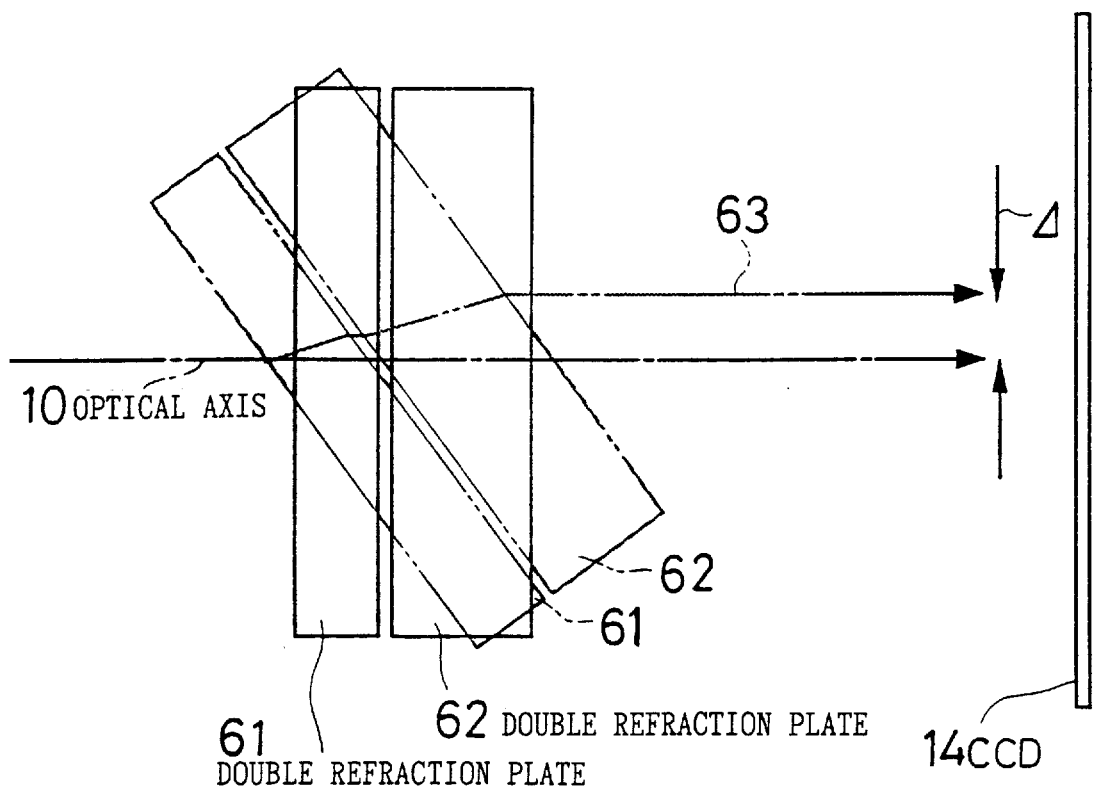
FIG. 21 is a simplified side view showing a principle of image shift by the image shift mechanism 60 of the embodiment of FIG. 20.
Figure 22:
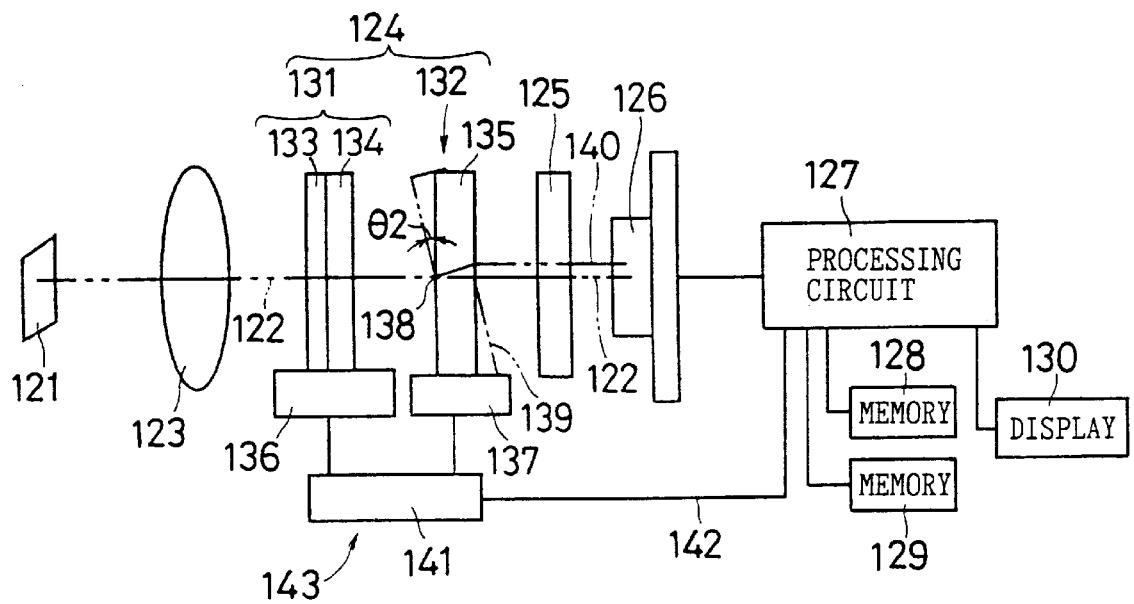
FIG. 22 is a block diagram showing the entire configuration of the image input apparatus of another embodiment of the invention.

FIG. 21 shows the principle of image shifting by the imaging shift mechanism 60. Tilting the double refraction plates 61, 62 alters the optical path 63 of introduced light, thus shifting the position where the image is formed on the CCD 14 only by Δ. Transmission band can also be changed by reciprocally rotating the two double refraction plates 61, 62 around the optical axis 10.

With the embodiment shown in FIG. 20, when capturing images in the first resolution, control signals are sent from the system controller 67 to the rotation drive apparatus 66 and image shift mechanism driving apparatus 65. The rotation drive apparatus 66 reciprocally rotates the double refraction plates 61, 62 around the optical axis 10 in accordance with the control signals, and stops the transmission band of light introduced to double refraction plates 61, 62 of the image shift mechanism 60 at the position where moire is not produced which is to serve as the first transmission band. Furthermore, the image shift mechanism driving apparatus 65 stops the double refraction plates 61, at a position where they are almost perpendicular to the optical axis 10. The light introduced from the object passes through the lenses 11 and the double refraction plates 61, 62 to form an image on the imaging surface of the CCD 14. The formed image is removed as a signal which is processed by the signal processing circuit 18 to generate a video signal. The image picked up at this time is saved in the image memory and output as a still image. Just as with conventional devices, a moving image can also be output as a video signal on a medium such as a CRT screen.

When capturing images in the second resolution which enables you to obtain images of a resolution higher than the first resolution, control signals are sent from the system controller 67 to the rotation drive apparatus 66 which reciprocally rotates the double refraction plates 61, 62 of the image shift mechanism 60 around the optical axis 10. The double refraction plates 61, 62 are stopped at the position to serve as the second transmission band which can pass a spatial frequency band higher than the first transmission band, as the transmission band for light introduced. Next, the system controller 67 sends control signals to the image shift mechanism driving apparatus 65, signal processing circuit 18 and CCD 14, the double refraction plates 61, 62 of the image shift mechanism 60 are inclined relative to the optical axis 10 each time a frame is taken, the position where the image is formed is shifted to two or four locations on the CCD 14, the image data from each position is put together using the signal processing circuit 18, and control is executed so as to generate image data of the second resolution for which sampling interval is shorter and resolution is higher than images of the first resolution.

The principle by which the image shift mechanism 60 is able to switch the first and second transmission bands by reciprocally rotating the double refraction plates 61, 62 is the same as for double refraction plates 20, 21 of the spatial filter 12 of the embodiment shown in FIG. 1, and is therefore not described here. Instead of the configuration whereby both double refraction plates 61, 62 are inclined relative to the optical axis 10, image shifting is accomplished by a configuration whereby either double refraction plate 61 or 62 can be inclined relative to the optical axis 10.

As in the present embodiment, the image shift mechanism 60 is composed of double refraction plates 61, 62, and if image shifting can be executed by tilting the double refraction plates relative to the optical axis so that high-band frequency elements can pass, there is no need to another mechanism in addition to the spatial filter and image shift mechanism, thereby reducing the number of parts required. By simply rotating and tilting the spatial low pass filter of optical systems have been used in video cameras, both spatial filter and image shift mechanism can be realized, increase in back focal distance caused by separately inserting an image shift mechanism can be prevented, and a more compact optical system can be realized. Also, because there is no need to place, remove or exchange spatial filters or compensate the optical system, increase in size of the mechanism and number of parts can be held down. Furthermore, parts from spatial filters used in existing video cameras can be used for the double refraction plates 61, 62, thus preventing production cost rise caused by using new parts.

Figure 63:
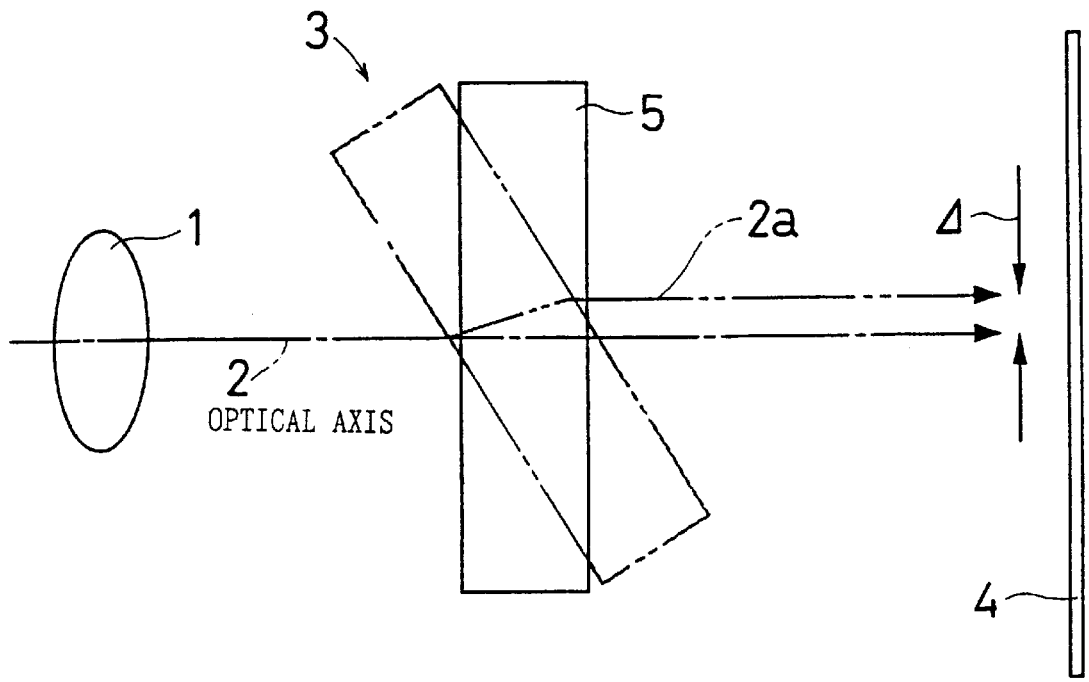
FIG. 63 is a simplified side view showing a principle of conventional image shifting by tilting the refraction plate.
Figure 64:
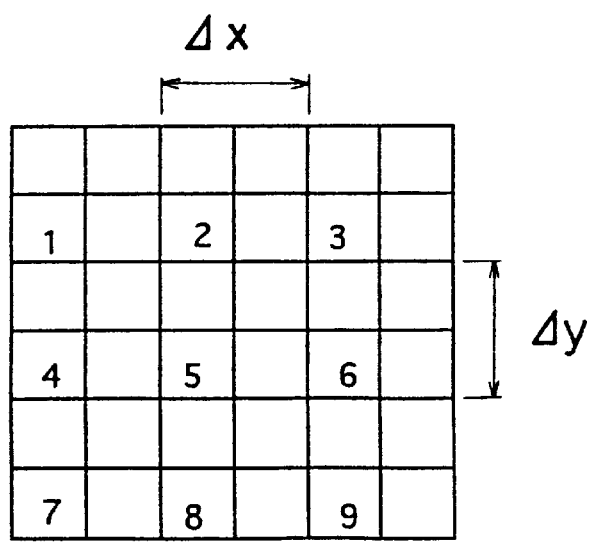
FIG. 64 is a simplified front view showing an array of a light sensitive portion of the imaging device.
Figure 68:
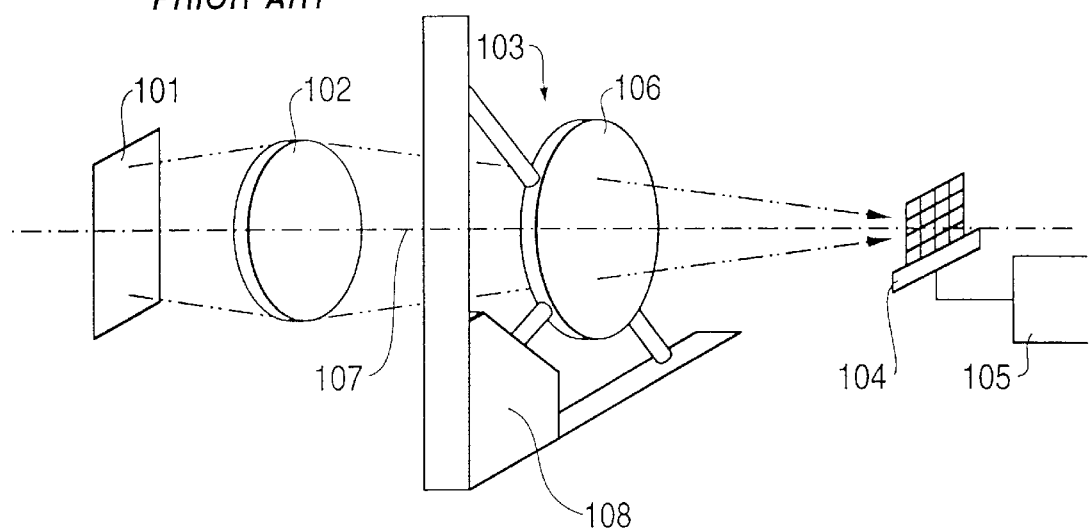
FIG. 68 is a perspective view showing an art of improving picture quality to which the principle of image shifting disclosed in JPA 63-284980 (1988) is applied.
Figure 69:
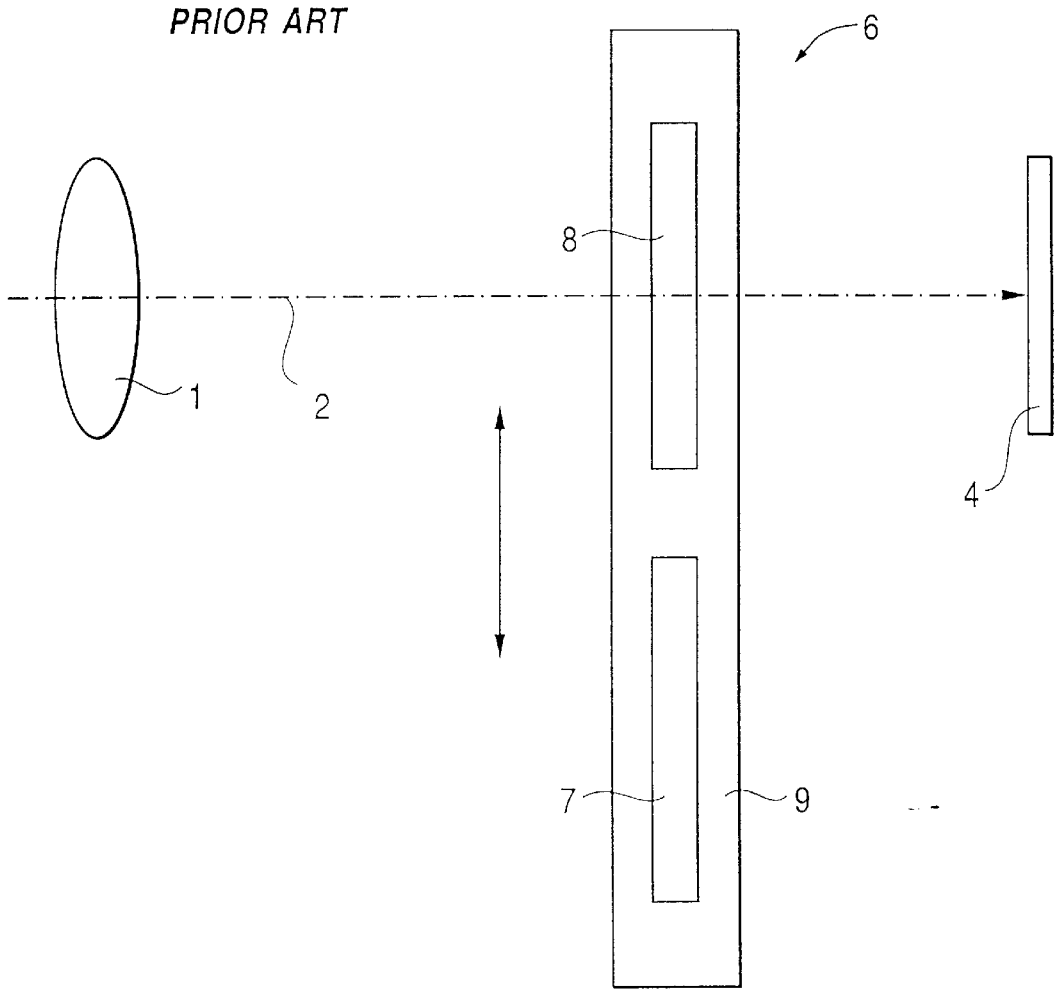
FIG. 69 is a block diagram showing a rough configuration of an image input apparatus including a spatial filter of the prior art.

FIG. 63 is a block diagram showing the entire configuration of the image input apparatus of another embodiment of the invention. The light from the object 121 is condensed by a condenser lens 123 having an optical axis 122, forming an image on the imaging surface of an imaging device 126 of either monochrome single-plate or color 3-plate construction, via a variable spatial filter 124 and infrared filter 125. Image signals from the imaging device 126 are provided to the processing circuit 127 which is realized by a device such as a microcomputer. The processing circuit 127 is connected with memories 128 and 129 which are realized by random access memory, and to means of visual display such as an LCD or CRT screen 130 whereby images of the object can be viewed.

The variable spatial filter 124 includes the first 131 and second filter 132 which are sequentially positioned along the optical axis 122 of the lens 123 from the object 121 side to the imaging device 126. The first filter 131 includes multiple (two in this embodiment) double refraction plates 133, 134 which are sequentially positioned along the optical axis 122. The second filter 132 is equipped with a single double refraction plate 135 only. Each of the first through third double refraction plates 133–135 is a flat plate having two parallel surfaces.

The filter driving means 136 drives and displaces the positions of the first and second double refraction plates 133, 134 which make up the first filter 131, around the optical axis 122. The image shift mechanism driving means 137 drives and displaces the angle of the third double refraction plate 135 which comprises the second filter around the image shift angular displacement axis 138 so that it intersects the optical axis 122 at a right angle, and tilts the angle to the status shown by the solid lines and dotted lines 139 in FIG. 63. The optical axis 122 of the lens 123 is displaced from the optical axis 122 as shown by reference symbol 140 by the tilting of the third double refraction plate 135 by the image shift mechanism driving means 137 as shown by the dotted lines 139. The control circuit 141 controls the filter driving means 136 and the image shift mechanism driving means 137 by control signals via processing circuit 127 and line 142. The means of control 143 is composed of the signal processing circuit 127 and control circuit 141.

Figure 23:
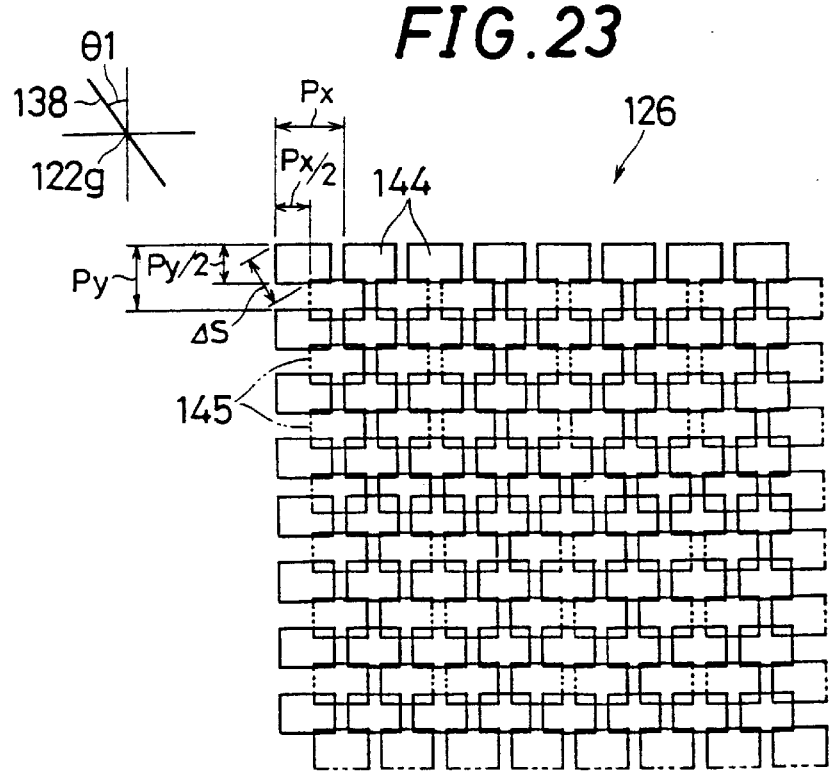
FIG. 23 is a front view diagram of the imaging surface of the imaging device 126.

FIG. 23 is a front view diagram of the imaging surface of the imaging device 126. The imaging device 126 is realized by a CCD (Charge Couple Device), the size of its imaging surface is one-third of an inch, it is equipped with 310×10³ pixels 144, and is of monochrome single-plate construction. The pixels 144 are arranged in rows at a predetermined pitch Px in the horizontal direction (vertical direction on the paper surface of FIG. 63, left-right direction of FIG. 23), and at a predetermined pitch Py in the vertical direction (up/down direction in FIG. 63, up/down direction in FIG. 23). The pixels of this embodiment are P=Px=Py=7.4 $\mu$m.

In the first operation mode which obtains low resolution images at sampling frequency of the pixels 144 of the imaging device 126, image shifting is not carried out by the image shift mechanism driving means 137, the surface of the double refraction plate 135 is perpendicular to the optical axis 122, and the image of the object is formed on the pixels 144 indicated by solid lines in FIG. 23.

In the second operation mode whereby high resolution images are obtained by combining the images before and after image shifting, the image of the object before image shifting by the image shift mechanism driving means 137 is formed on the pixels 144 indicated in the figure by solid lines. Next, by shifting the optical axis 122 to axis 140, the shifted image of the object is then formed at the position indicated by dotted lines 145. The shift distance $\Delta S$ before and after image shifting is Px/2 in the horizontal direction, Py/2 in the vertical direction, and is consequently P/$\sqrt{2}$ in the diagonal direction.

In order to accomplish image shifting, the angle of the image shift angular displacement axis 138 within the imaging surface imaging device 126 perpendicular to the optical axis 122 is $\theta 1$=45 degrees in the horizontal direction x and vertical direction y of the imaging surface. Thus, the distance $\Delta S$ of the optical axis 122 and axis 140 is shifted on the imaging surface is $\Delta S$=P/$\sqrt{2}$=5.2 $\mu$m in the diagonal direction of the pixels.

The imaging device 126 whose pixels are arranged in rows performs spatial sampling of object images, and obtains a signal for each pixel. Thus, based on the sampling theorem, the spatial frequencies of object images that can be dissected are less than the Nyquist frequency f/2 regulated by ½ the pixel frequency f in the horizontal and vertical directions. Object images of spatial frequencies in excess of the Nyquist frequency are returned to the low bands where they become moire shape spurious signals. Because the spurious signals build up within the low bands, they cannot be eliminated by processing the output of the imaging device 126, and because they are generated when spatial sampling is carried out, they must be eliminated before spatial sampling. This means an optical low pass filter must be used to prevent object images of high spatial frequencies in excess of the Nyquist frequency f/2 from appearing on the imaging surface which is the light reception surface of the imaging device 126. For this reason, the spatial filter is positioned before the imaging device 126.

0 Moire is essentially data which is not included in image data, and because it has a large negative impact on picture quality, must be prevented from appearing on the screen. Thus optical processing is carried out by a variable spatial filter 124 to prevent spatial frequencies of object images that generate moire by interfering with the image element 126 and object image. The variable spatial filter 124 functions as a low pass filter to remove contrast of high spatial frequency elements which tend to produce moire, or in other embodiments, may be a band-pass filter that removes only contrast of frequencies where moire is produced.

To remove contrast of striped moire with a variable spatial filter 124, the image may be shifted and added so that the light and dark parts of the stripes cancel each other out. To reduce stripe contrast of wavelength $\lambda 0/2$, for instance, the object image shifted wavelength $\lambda 0/2$ in the direction which orthogonally intersects the stripes may be added to the original object image. When the image 121 is seen through each of the first through third double refraction plates 133–135 which comprise the variable spatial filter, an double image shifted a certain amount is obtained. Along with adjusting the shift distance and direction to the spatial frequency of the moire to be eliminated, by matching the quantity of light of the two images, the target stripe contrast can be reduced. This shall be covered in greater detail.

FIG. 24 is a drawing which describes the double refraction phenomenon of the first double refraction plate 133. This phenomenon is the same for the first and second double refraction plates 134, 135. The double refraction plate 133 shown by the cross-section of FIG. 24A may for example be liquid crystal , in the optical sense may be uniaxial crystal, and have a single optical axis 147. This is assumed to be crystal cut out from the plane 149 with normal axis 148 so that optic axis q1 is intersected at an angle of Ø. With this embodiment, the normal axis 148 matches the optical axis 122. Light is introduced along the normal axis 148 perpendicular to this plane 149.

The angle $\delta$ achieved by the ordinary ray Lo and extraordinary ray Le put out from the double refraction plate 133 are expressed by Equation (1).

$$\tan\delta = \frac{(n_2^2 - n_1^2)\tan\phi}{n_2^2 - n_1^2\tan^2\phi} \quad (1)$$

In Equation (1), n1 is the refractive index of ordinary ray Lo, and n2 is the refractive index of extraordinary ray Le in the direction which orthogonally intersects optic axis vector q1. In the case of an 18° C., sodium D ray, n1=1.5443, and n2=1.5534.

As shown in FIG. 24B, the ordinary ray Lo and extraordinary ray Le are electric displacement vectors Do and De (comprehensively reference symbol D), in other words, linearly polarized light for which vibration directions differ and which orthogonally intersect each other. The direction of electric displacement vector D of light from the double refraction plate 133 and the direction of electric field vector E match. The separation distance d1 with w1 as the thickness of double refraction plate 133 is expressed in Equation (2).

$$d1 = w1 \cdot \tan \delta 1 \quad (2)$$

tan $\delta 1$ in Equation (1) is as follows:

$$\tan \chi = n2/n1 \quad (3)$$

$$\tan \delta_1 = (n_2^2 - n_1^2)/2 n_1 \cdot n_2 \quad (4)$$

The maximum value $\tan \delta_0$ of $\tan \delta_1$ at $\varnothing = 45.2°$ is $\tan \delta_0 = 5.876 \times 10^3$. The present embodiment uses a double refraction plate 133 which is configured so that $\tan \delta_1$ is the maximum. In other words the embodiment is configured so that, with surface 149 of the double refraction plate 133 as the xy plane of the xyz orthogonal coordinates system, when the z axis is made to match the optical axis 122 of the lens 123, the optic axis 147 of the liquid crystal are brought out so that the z axis and previously mentioned $\tan \delta_1$ form the maximum angle $\varnothing = 45.20$.

With the first through third double refraction plates 133–135, introduced light is separated in a total of two polarized light directions of ordinary and extraordinary rays which are mutually intersecting linearly polarized rays. The desired separated light images therefore can be obtained by combining the first through third double refraction plates 133–135.

Figure 27A:
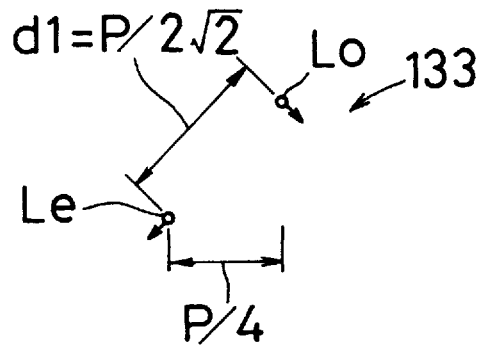
FIGS. 27A, 27B, 27C are views for describing the separation light of the first through third double refraction plates 133–135.

FIG. 25 is a simplified strabismus drawing showing the status of the first through third double refraction plates 133–135 of the variable spatial filter 124 in the first operation mode. The optic axes of each of the double refraction plates 133–135 are indicated by reference symbols q1–q3. The separation distances d1, d2 and d3 (comprehensively reference symbol d), thicknesses $w^1$, w2 and w3 (comprehensively reference symbol w), and direction of optic axes q1–q3 within the xy plane in the first operation mode are given in Table 1.

extraordinary ray Le at separation distance d1 as shown in FIG. 27A. Optical axis q1 corresponds to the direction linking the ordinary ray Lo and extraordinary ray Le.

Figure 27B:
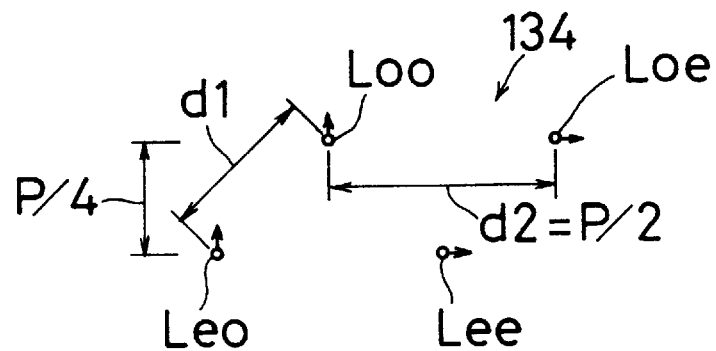
Figure 27C:
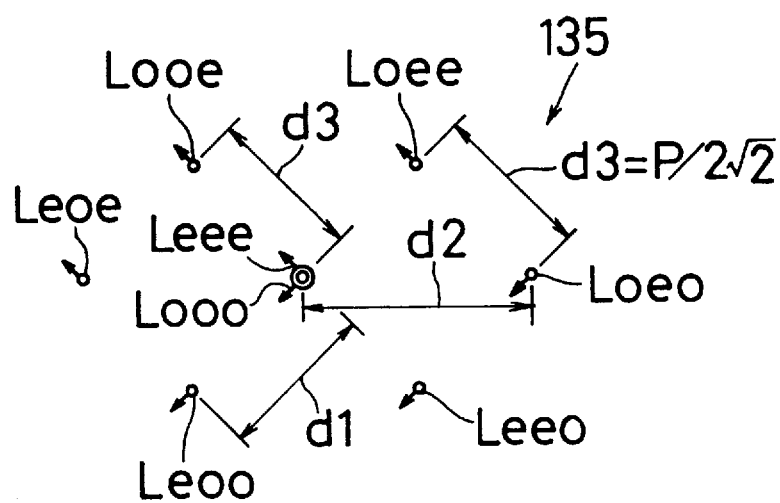

In FIGS. 27A–27C, each position of the ordinary and extraordinary rays is indicated by a small white circle ○, and a wave front is indicated by an arrow extending from the small white circle. Such indication applies also to FIGS. 32, 50 and 54. The wave front of the outgoing ordinary ray is perpendicular to the optic axis, and the wave front of the outgoing extraordinary ray is parallel to the optic axis. In the figures, a position where two rays overlap each other is indicated by a double circle.

When lights Lo and Le are incident on the second double refraction plate 134, the previously mentioned ordinary rays Lo are then put out further separated into an ordinary ray Loo and an extraordinary ray Loe, and the ordinary ray Le is further separated into ordinary ray Leo and extraordinary ray Lee at the separation distance d2 and put out as shown in FIG. 27B.

As shown in FIG. 27C, after passing through the final third double refraction plate 35, light corresponding to the ordinary ray Loo is separated into ordinary ray Looo and extraordinary ray Looe at the separation distance d3, light corresponding to the extraordinary ray Loe is separated into ordinary ray Loeo and extraordinary ray Loee, light corresponding to the ordinary ray Leo is separated into ordinary ray Leoo and extraordinary ray Leoe, and light corresponding to the extraordinary ray Lee is separated into ordinary ray Leeo and extraordinary ray Leee. The separation status

TABLE 1

| Filter | Double Refraction Plate | Separation Distance d (μm) | Thickness w (mm) | Direction of Optical Axes q1–q3 |
|---|---|---|---|---|
| First Filter 131 | First Double Refraction Plate 131 | $d_1 = \dfrac{P}{2\sqrt{2}} = 2.6$ | w1 = 0.45 | q1: 225° in counterclockwise direction from horizontal direction x (first diagonal direction of pixels) |
| | Second Double Refraction 134 | $d_2 = \dfrac{P}{2} = 3.7$ | w2 = $\sqrt{2} \cdot $w1 = 0.64 | q2: Matching horizontal direction x |
| Second Filter 132 | Third Double Refraction Plate 135 | $d_3 = \dfrac{P}{2\sqrt{2}} = 2.6$ | w3 = w1 = 0.45 | q3: 135° in counterclockwise direction from horizontal direction x (second diagonal perpendicular to first diagonal direction) |

Figure 26A:
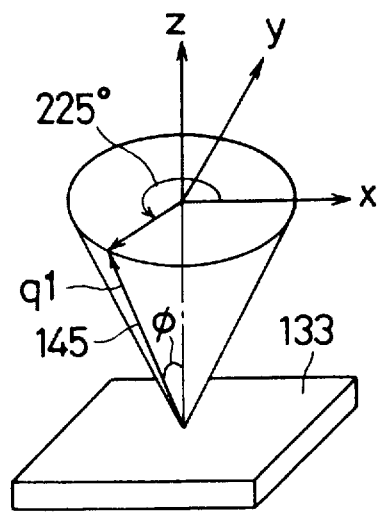
FIGS. 26A, 26B, 26C are simplified perspective views showing the constitutions of the first through third double refraction plates 133–135 forming the variable spatial filter 124.
Figure 26B:
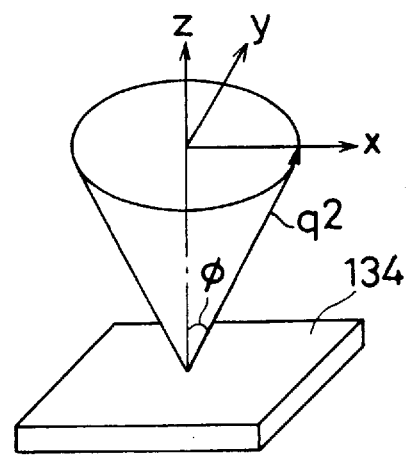
Figure 26C:
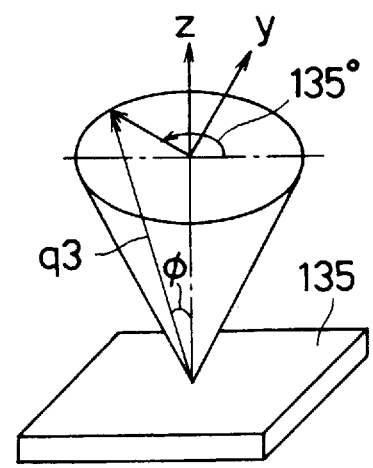

FIG. 26 is a simplified strabismus drawing showing the configuration of the first through third double refraction plates 133–135 which comprise the variable spatial filter 124. FIG. 26A shows the configuration of the first double refraction plate 133, FIG. 26B shows the configuration of the second double refraction plate 134, and FIG. 26C shows the configuration of the third double refraction plate 135. The arrows in the figures indicate optic axes q1–q3 of double refraction plates 133–135, and the arrows in FIG. 25 indicate projection to the surface of optic axes q1–g3 with the same symbol. The angle Ø in FIG. 26 is established as Ø=45.2° as previously stated.

Figure 28:
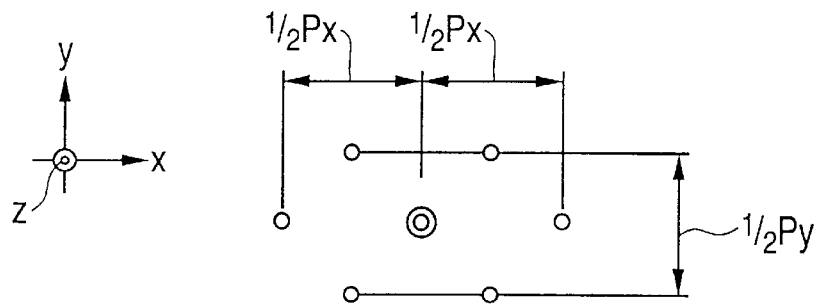
FIG. 28 is a diagram showing a separation status of ordinary and extraordinary rays obtained by the variable spatial filter 124 in the first operation mode.

FIGS. 27A–27C are drawings for describing the separate light images of the first through third double refraction plates 133–135. After first passing through the first double refraction plate 133, the light introduced from the lens 123 is then put out separated into ordinary ray Lo and an of the ordinary and extraordinary rays that will ultimately be obtained by the variable spatial filter 124 is as shown in FIG. 28, which shows the same separation status as FIG. 27C.

Figure 29A:
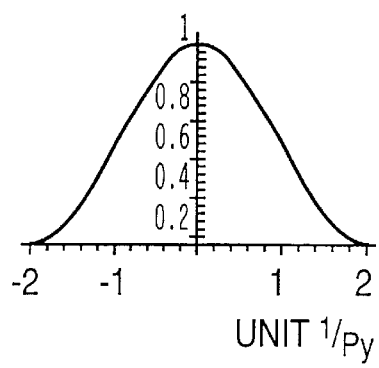
FIGS. 29A, 29B are views showing spatial frequency characteristics obtained by the variable spatial filter 124 in the first operation mode.
Figure 29B:
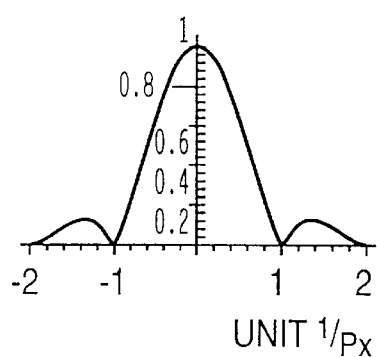

The spatial frequency characteristics which can be obtained by the variable spatial filter 124 in the first operation mode are shown in FIG. 29. The horizontal axis of FIG. 29A shows the spatial frequency characteristics of the vertical direction, with the unit being 1/Py, and the vertical axis shows MTF (Modulation Transfer Function). FIG. 29B shows the spatial frequency characteristics of the horizontal direction, the horizontal axis of shows the spatial frequency characteristics of the horizontal direction, with the unit being 1/Px, and the vertical axis is MTF. FIG. 29 shows that the variable spatial filter 124 produces a spatial frequencies limiting effect in the vertical direction y and horizontal direction x, thereby controlling the generation of luminance moire.

Figure 30:
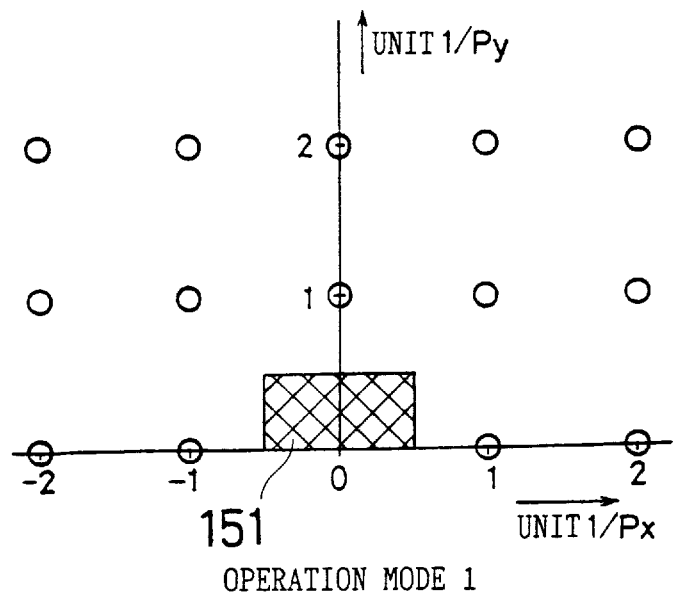
FIG. 30 is a view showing characteristics within a spatial frequency plane obtained by the variable spatial filter 124 shown in FIGS. 25–29 in the first operation mode.

FIG. 30 is a diagram showing characteristics within the spatial frequency plane obtained by the variable spatial filter 124 shown in FIGS. 25–29 in the first operation mode. The horizontal axis of FIG. 30 shows the spatial frequency characteristics of the horizontal direction x, with the unit being 1/Px, the vertical axis shows the spatial frequency characteristics of the vertical direction y, with the unit being 1/Py. The circles in FIG. 30 show the spatial frequency of luminance moire. The band of images on the imaging surface of the imaging device 126 is shown in FIG. 30 by the area 151 filled in with diagonal lines.

If the imaging device 126 is of monochrome single-plate construction, moire is produced at coordinates (1/Px, 1/Py), (1/Px, 0) and (−1/Px, 1/Py) within the spatial frequency plane shown in FIG. 30. There are three types of point distribution of ordinary and extraordinary rays for eliminating moire within the imaging surface of the imaging device 126: (Px/2, Py/2), that is $P/2\sqrt{2}$ for 45° (equal to 225°) in the horizontal axis x, (Px/2, 0) that is P/2 for the horizontal axis x, and (−Px/2, Py/2) that is $P/2 \sqrt{2}$ for 135° in the horizontal direction x.

When double refraction plates 133, 134, 135 are combined, by reciprocally shifting the separation direction only by 45 degrees around the optical axis 122 for the separation direction of the front double refraction plates 133, 134, 135, while maintaining the separation distance of the front double refraction plates 133, 134, 135, a new separation by a total of three double refraction plates 133, 134, 135 is made possible. In this embodiment, the first through third double refraction plates 133–135 are sequentially positioned in order for (separation distance d, optical axis angle relative to horizontal direction x) to be ($P/2\sqrt{2}$, 45°), (P/2, horizontal direction x) and ($P/2 \sqrt{2}$, 135°). FIG. 30 therefore shows that generation of luminance moire is controlled in the band of the image.

Figure 31:
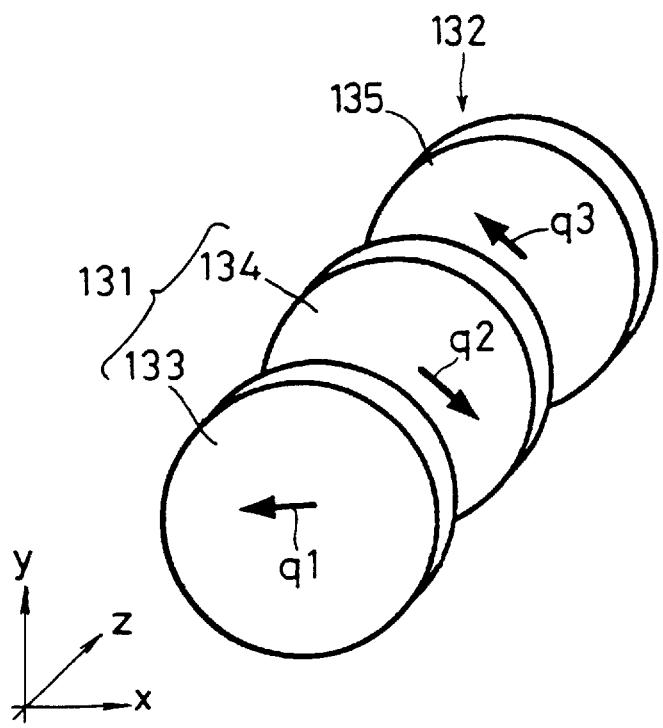
FIG. 31 is a simplified perspective view showing a status of the variable spatial filter 124 in the second operation mode.

FIG. 31 is a simplified strabismus drawing showing the status of the variable spatial filter 124 in the second operation mode. The first filter 131 composed of the first and second double refraction plates 133, 134, in comparison with the status of the first operation mode shown in FIG. 25, is driven around the optical axis 122 of the lens 123 only by 45 degrees in the clockwise direction by the filter driving means 136. This places optic axis q1 of the first double refraction plate 133 180 degrees in the counterclockwise direction from the horizontal direction x, optical axis q2 of the second double refraction plate 134 45 degrees in the clockwise direction from the horizontal direction x, and the directions of q2 and q3 of the second and third double refraction plates 134, 135 opposing each other.

Figure 32A:
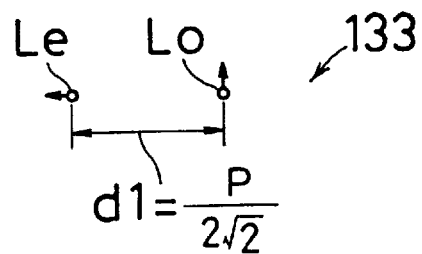
FIGS. 32A, 32B, 32C are views for describing separation of ordinary and extraordinary rays obtained by the variable spatial filter 124 in the second operation mode shown in FIG. 31.

FIG. 32 is a diagram which describes the separation of ordinary and extraordinary rays obtained by the variable spatial filter 124 in the second operation mode shown in FIG. 31. After first passing through the first double refraction plate 133, the light is separated into ordinary ray Lo and extraordinary ray Le along optic axis q1 in the horizontal direction at separation distance d1 as shown in FIG. 32A.

When lights Lo, Le are incident on the second double refraction plate 134, the ordinary ray Lo is then put out further separated into ordinary ray Loos and an extraordinary ray Loe along optic axis q2 by separation distance d2. The extraordinary ray Le is further separated into ordinary ray Leo and extraordinary ray Lee along the optic axis q2 by separation distance d2.

Figure 32B:
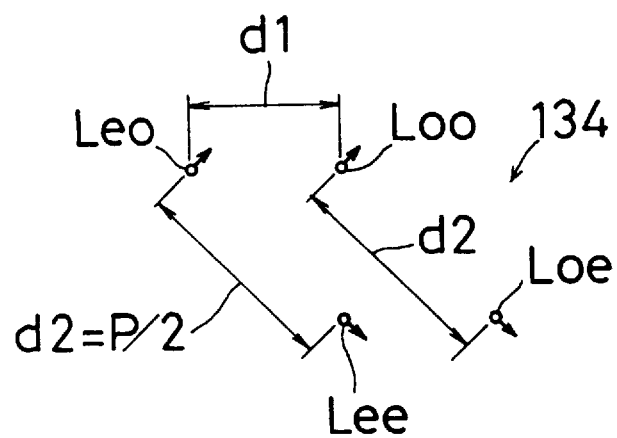

Finally the light from the second double refraction plate 134 shown in FIG. 32B is introduced to the third double refraction plate, and thereby, with respect to the ordinary ray Loo, the ordinary ray Looo outgoes from the third double refraction plate. With respect to the incoming extraordinary ray Loe, the extraordinary ray Loe shifts along the optic axis q3 by a separation width d3. With respect to the extraordinary ray Leo similarly entered, the ordinary ray Leoo is obtained after passing the third double refraction plate 35. Further, with respect to the extraordinary ray Lee, the extraordinary ray Leee shifted by a separation width d3 along the optical axis q3 is obtained. Since each wave front of the ordinary rays Loo, Leo is perpendicular to the optic axis q3, and therefore the extraordinary ray thereof does not outgo and consequently is not found. Since each wave front of the extraordinary rays Loe, Lee is parallel to the optic axis q3, the extraordinary ray thereof does not outgo and consequently is not found.

Figure 32C:
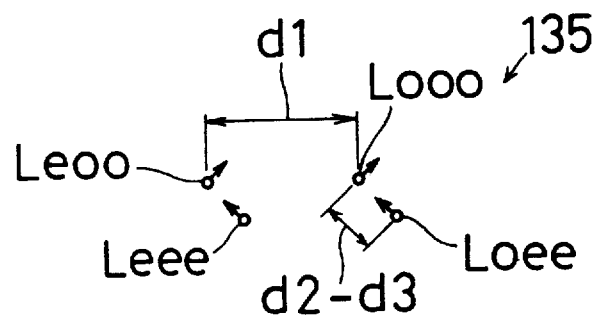
Figure 33:
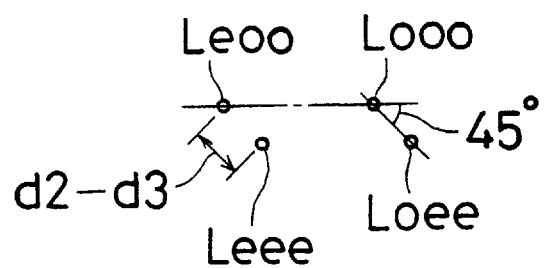
FIG. 33 is a diagram showing separation of ordinary and extraordinary rays obtained by the variable spatial filter 124 in the second operation mode.

The light which can be obtained from the variable spatial filter 124 on the imaging surface of the imaging device 126 in the second operation mode are as shown in FIG. 33, which shows the same separation status as FIG. 32C.

Figure 34A:
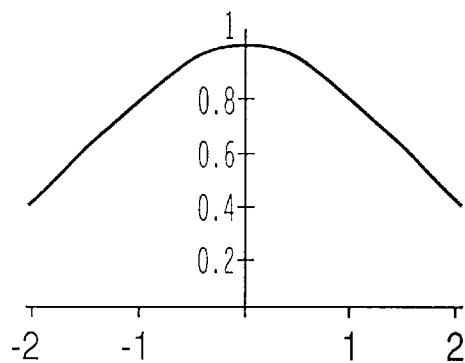
FIGS. 34A, 34B are diagrams showing spatial frequency characteristics obtained by the variable spatial filter 124 in the second operation mode.
Figure 34B:
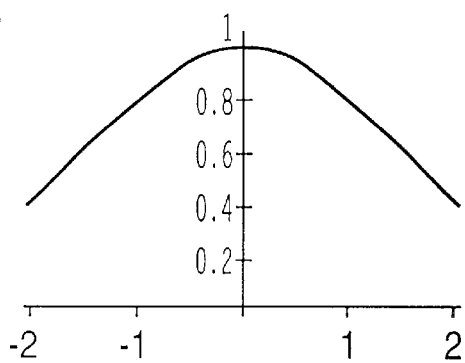

The spatial frequency characteristics which can be obtained by the variable spatial filter 124 in the first operation mode are shown in FIG. 34. The horizontal axis of FIG. 34A shows the spatial frequency characteristics of the vertical direction, with the unit being 1/Py, and the vertical axis shows MTF (Modulation Transfer Function). FIG. 34B shows the spatial frequency characteristics of the horizontal direction, the horizontal axis shows the spatial frequency characteristics of the horizontal direction, with the unit being 1/Px, and the vertical axis is MTF. FIG. 34 shows that the spatial frequencies limiting effect of the variable spatial filter 124 in the vertical direction y and horizontal direction x is reduced, thus expanding the passage band to include higher spatial frequencies, and allowing the proper spatial frequencies for high resolution images to be obtained. In other words, with the spatial frequency characteristics shown in FIG. 34 of the variable spatial filter 124 in the second operation mode shown in FIGS. 31–33, the high frequency elements in both the vertical direction y and horizontal direction x are not blocked out, but rather the band is widened the spatial frequencies limiting effect is reduced, and are therefore suitable for obtaining higher resolution. This also enables generation of luminance moire to be controlled for the second mode for obtaining high resolution.

Figure 35:
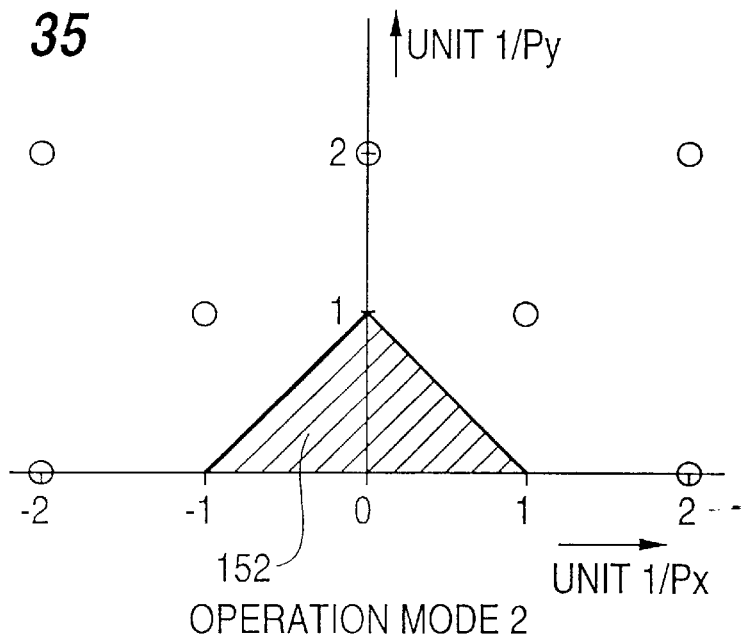
FIG. 35 is a view showing characteristics within the spatial frequency plane obtained by the variable spatial filter 124 shown in FIGS. 31–34 in the second operation mode.

FIG. 35 is a diagram showing characteristics within the spatial frequency plane obtained by the variable spatial filter 124 shown in FIGS. 31–34 in the second operation mode. The horizontal axis of FIG. 35 shows the spatial frequency characteristics of the horizontal direction, with the unit being 1/Px, the vertical axis shows the spatial frequency characteristics of the vertical direction, with the unit being 1/Py. The circles in FIG. 35 show the spatial frequency of luminance moire. The band of images on the imaging surface of the imaging device 126 is shown in FIG. 35 by the area 152 filled in with diagonal lines. This shows that luminance moire is controlled in the image band 152.

Figure 36:
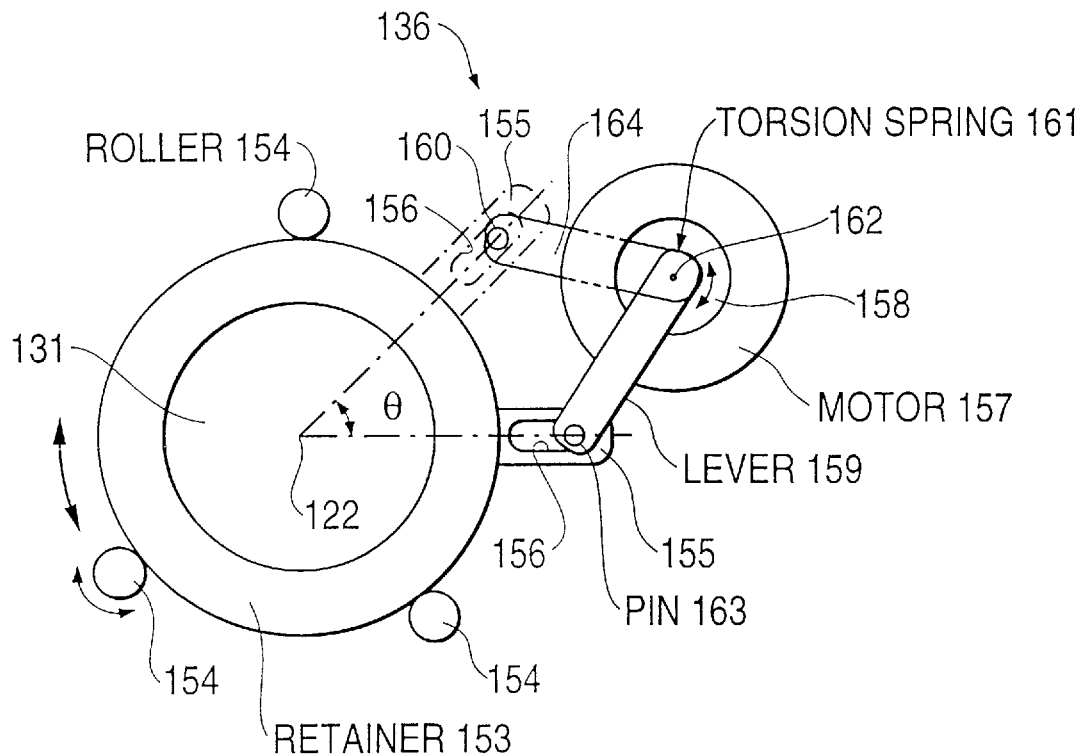
FIG. 36 is a front view showing a configuration of filter driving means 136 for angularly displacing the first filter 131 by 45 degrees.

FIG. 36 is a front view diagram showing the configuration the filter driving means 136 for displacing the angle of the first filter 131 by 45 degrees. The first filter 131 composed of the first and second double refraction plates 133, 134 is for example round and is held and immobilized by a circular retainer 153. The retainer 153 is supported on its outer edge by rollers 154 in at least three locations (three in this embodiment) so that it can be rotated around the optical axis 122 of the lens 123. A protrusion 155 is fastened to the outside of the retainer 153. A slot 156 extending in the radial direction of the retainer 153 is formed in the protrusion 155.

The stationary end of a lever 159 is fastened to the output shaft 158 of a motor 157 established a fixed position, and the moving end is fastened to the protrusion by a pin 160. The pin 160 fits into the slot 156, and the lengthwise direction of the slot 156, in other words the radial direction of the retainer 153, can be displaced.

The mechanism is equipped with a torsion spring 161. The torsion spring 161 provides the lever 161 with spring force in the counterclockwise direction of FIG. 36 around the axis 162 of the output shaft 158. Thus with electric power not being supplied to the motor 157 in the first operation mode, the lever 159 and protrusion 155 are positioned as shown by the solid lines in FIG. 36 due to spring force of the torsion spring 161. At this time, the pin 160 touches the outermost edge 163 of the slot 156 in the radial direction of the retainer 153. In the second mode, the motor 157 is supplied with electric power, the output shaft 158 turns and lever 159 is displaced in the clockwise direction around the axis 162 from the solid lines shown in FIG. 36. When the lever 159 is displaced to the angle shown by the dotted lines 164, the pin 160 once again touches the outermost edge 1633 of the slot 156. With reference to the imaginary plane, the lever 159 can symmetrically change angles including the rotational axis of the retainer 153 which matches the optical axis 122, and the rotational axis of the previously mentioned end of the lever 159.

Figure 37:
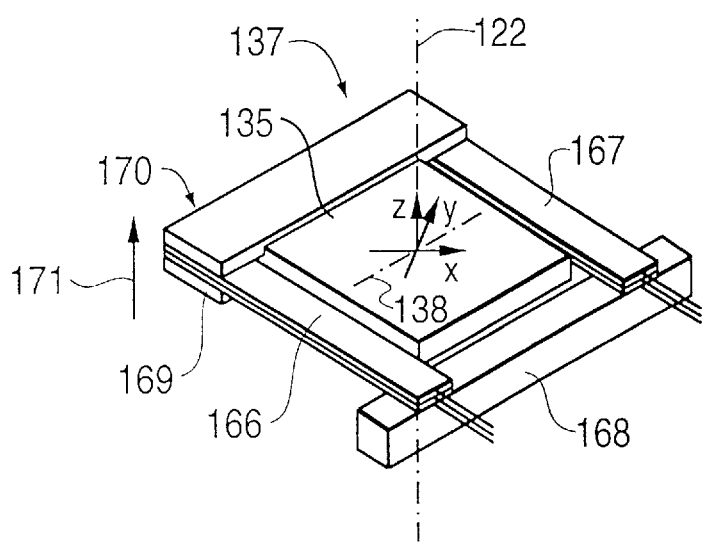
FIG. 37 is a perspective view of image shift driving means 137 for angularly displacing the third double refraction plate 135 forming the second filter 132, around an image shift angular displacement axis 138.

FIG. 37 is a strabismus drawing of the image shift mechanism driving means 137 for displacing the angle of the third double refraction plate 135 comprising the second filter 132 around the image shift angular displacement axis 138. The third double refraction plate 135 is rectangular in shape. A pair of piezoelectric members are positioned on both sides of the third double refraction plate 135. Piezoelectric members 166, 167 are bimorphs, and the construction is such that a pair of piezoelectric ceramics lie between three long and slender strip-shaped electrodes. Voltage is not provided in the longitudinal direction of the piezoelectric members 166, 167. In other words, in the natural undriven state, the members are within the plane perpendicular to the optical axis 122, are parallel to each other, and stretch to intersect the x and y axes at 45 degree angles. In the first operation mode and preceding image shifting of the second operation mode, piezoelectric members 166, 167 are in their natural state without voltage being applied in the longitudinal direction, and are perpendicular to the imaginary plane containing the optical axis 122 and image shift angular displacement axis 138.

One end of the longitudinal direction of piezoelectric members 166, 167 is connected to the stage 168, is fastened. Piezoelectric members 166, 167 are thus supported by a cantilever. The other end of piezoelectric members 166, 167 are fastened by being sandwiched by a pair of installation members 169, 170. The base end of the third double refraction plate 135 is fastened between the installation members 169, 170. By applying driving voltage to piezoelectric members 166, 167, the previously mentioned other end of piezoelectric members 166, 167 is displaced in the direction indicated by the arrow 171 from where the third double refraction plate 135 is perpendicular to the optical axis 122 before image shifting in the second and first operation modes, the angle of third double refraction plate 135 is displaced as indicated by the dotted line 139 in FIG. 63, and the third double refraction plate is substantially inclined around the image shift angular displacement axis 138, thus changing to the post image shift status of the second mode. The angle of tilt θ2 by which the third double refraction plate 135 is displaced for image shifting is very slight. There is therefore no negative influence on the spatial frequency characteristics of the variable spatial filter 124 in the second operation mode, and the spatial frequency characteristics are never lost.

FIG. 38 is a side view diagram which describes the principle of image shifting for the third double refraction plate 135. The third double refraction plate 135 is indicated by solid lines in FIG. 38, and its surface is perpendicular to the optical axis 122, when the normal axis is inclined to drive angular displacement around the image shift angular displacement axis 138 only by tilt angle θ2 relative to the optical axis 122, the axis 122 is shifted and displaced as indicated by the symbol 140. The shift distance ΔS is expressed by Equation 5, with n being the refractive index and w3 the thickness.

$$\Delta S = w3 \cdot \sin\left[\theta 2 \cdot \left\{1 - \frac{\sqrt{(1-\sin^2\theta 2)}}{\sqrt{(n^2-\sin^2\theta 2)}}\right\}\right] \quad (5)$$

Assuming that $\sin^2 \theta 2 \approx 0$, Equation 5 would be:

$$\Delta S = w3 \cdot \sin\{\theta 2 \cdot (1-1/n)\} \quad (6)$$

With this embodiment of the invention, in order to achieve shift distance ΔS, the third double refraction plate 135 is driven by the image shift mechanism driving means by the tilt angle θ2 shown in FIG. 37, as described in connection with FIG. 23.

If the thickness w3 of the third double refraction plate 35 is 0.45 mm and the refraction index n is 1.5, then the shift distance ΔS in the diagonal direction of pixels shifted P/2 in the horizontal x and vertical y directions is P/√2=5.2 μm, and the required tilting angle θ2 is 1.9 degrees. The tilt angle θ2 is extremely slight, so there is hardly no negative influence of separation distance on normal and extraordinary rays caused by the function of the variable spatial filter 124, and spatial frequency characteristics are unaltered by tilting for image shifting in the second operation mode of the third double refraction plate 135.

In the first operation mode for obtaining low resolution images, the processing circuit 127 operates the control circuit 141, and the filter driving means 136 sets the first filter of the variable spatial filter 124 to the status described in connection with FIGS. 25–30. The third double refraction plate 135 which comprises the second filter 132 is set to shift distance ΔS=0 by the image shift mechanism driving means as indicated in FIG. 38. In this status, the image of the object is formed by the imaging device 126.

In the second operation mode for obtaining high resolution images, the processing circuit 127 operates the control circuit 141, and the filter driving means 136 drives and displaces the angle of the first filter 131 of the variable spatial filter 124 45 degrees around the optical axis 122 from the status indicated in FIGS. 25–30 to the status indicted in FIGS. 31–35. In the second mode, the image shift mechanism driving means first sets the third double refraction plate 135 to the status with its surface perpendicular to the optical axis 122 indicted as indicated by solid lines in FIG. 38, just as with the first operation mode before image shifting, with the shift distance ΔS being 0. An image of the object is formed by the imaging device 126 without performing image shifting, and the image is stored in a memory 128.

In the second operation mode, the image shift mechanism driving means 137 next drives and displaces the angle of the third double refraction plate 135 only by tilt angle θ2 as indicated by dotted lines in FIG. 38, obtains the shift distance ΔS 32 P/√2, and an image of the object is formed by the imaging device 126. The second image from the imaging device 126 obtained after image shifting is then stored in another memory 129.

FIG. 39A shows the position of the pixels of the first image before image shifting stored in memory 128. Each individual pixel is indicted by the reference symbol "a" and numbers 1, 1; 1, 22: 1, 3 etc., which indicate the coordinate positions of the rows.

The pixels of the image obtained after image shifting shown in FIG. 39A are shifted only by shift distance ΔS in the diagonal direction of the pixels 144 as shown in FIG. 39B. The coordinate positions of the rows of the pixels 144 are indicated by the reference symbol "b" and numbers which indicate the coordinate positions of the rows.

The processing circuit 127 combines the two object images obtained from the memories 128, 129 in FIGS. 39A and 39B before and after shifting, and then creates a composite from the image signals of each pixels shown in FIG. 40. The objects shown in FIGS. 39A and 39B are shifted by P/2 in the horizontal x and vertical y directions. A composite image have twice the mount of pixels in the horizontal x and vertical y directions is formed by combining the objects obtained shown in FIG. 40. Luminance data of pixels 194 at positions indicated by circles in FIG. 40 can be obtained by interpolating. For example, luminance data of pixels 194 at positions indicated by circles can be set by interpolating a mean value of luminance of four adjoining pixels in the horizontal x and vertical y directions. Interpolation may also be accomplished by other methods of calculation. Hence the composite image thus obtained in FIG. 40 has double the resolution of images formed by the imaging device 126 in the first operation mode.

The means of display 130 provides a visual display of the objects obtained in the first and second modes. A printer for printing on recording paper can be used along with or instead of the means of display 130.

In this embodiment, the second filter 132 is configured in such a way that the image shift mechanism driving means causes the object to be shifted less than one pitch P on the imaging surface of the imaging device 126, but in other embodiments of the invention, objects of enhanced resolution can be obtained by performing image shifting whereby the images of three or more objects are sequentially shifted on the imaging surface, obtaining pixel data expressing the object from the imaging device 126 at each stage of the image shifting process, and combining the pixel data.

Figure 41:
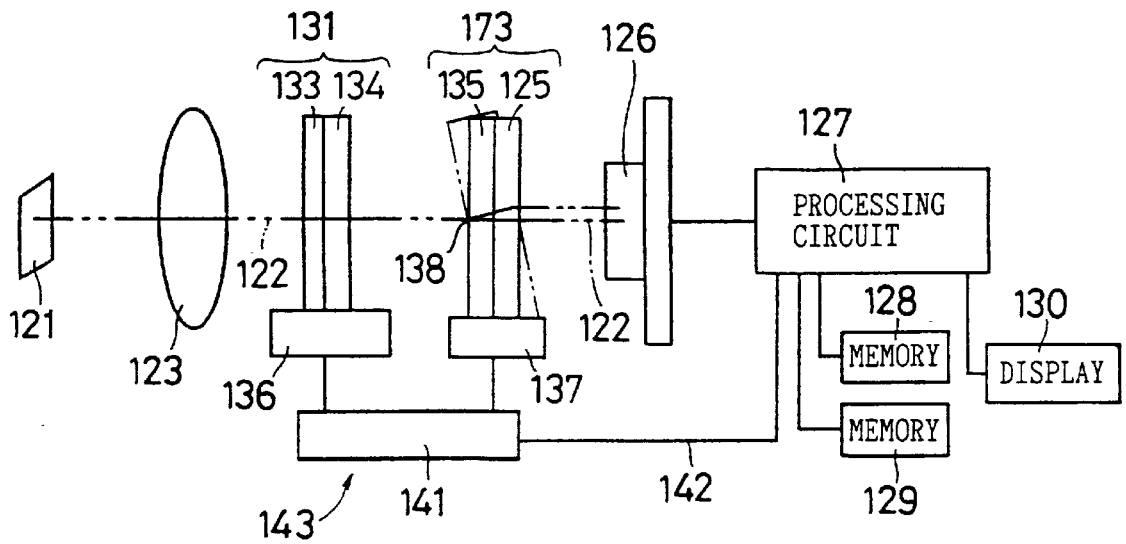
FIG. 41 is a block diagram showing the entire configuration of another embodiment of the invention.

FIG. 41 is a block diagram showing the entire configuration of another embodiment of the invention. This embodiment resembles the embodiment described in connection with FIGS. 63–40, and is provided with the same reference symbols for corresponding parts. What should be noted here is the third double refraction plate 135 and infrared filter 125 overlap each other in the direction of the optical axis 122, and are configured as a single plate. The angles of optical unit 173 contained the unified third double refraction plate 135 and infrared filter 125 are displace around the image shift angular displacement axis 138 by the image shift mechanism driving means 137 in the second mode just as with the previously mentioned embodiment.

As for the shift distance ΔS achieved by imaging shifting in connection with Equations 5 and 6, because the thickness w3 of Equation 5 and 6 can be replaced by the total thickness of the third double refraction plate 135 and infrared filter 125, the tilt angle θ2 for obtaining the same shift distance as previously described may by smaller than that of the previously mentioned embodiment. This enables quicker image shifting by the image shift mechanism driving means 137, while reducing demand.

Because the embodiment shown in FIG. 41 is configured with the infrared filter 125 fastened to the third double refraction plate 135, the row passage length is shorter than that of the embodiment described in connection with FIGS. 63–40, thus enabling a more compact configuration.

Figure 42:
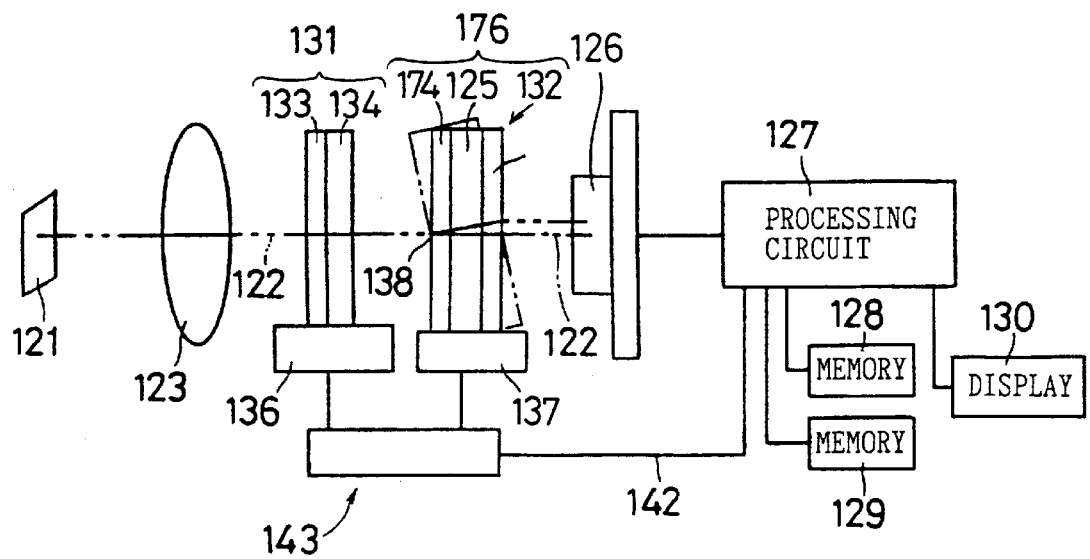
FIG. 42 is a block diagram showing the entire configuration of the image input apparatus of another embodiment of the invention.

FIG. 42 is a block diagram showing the entire configuration of the image input apparatus of another embodiment of the invention. This embodiment resembles the other previously mentioned embodiments, and is provided with the same reference symbols for corresponding parts. What should be noted here is the second filter 132 comprising the variable spatial filter 124 is composed of the two double refraction plates 174, 175 positioned along the optical axis 122. The infrared filter 125 is fastened sandwiched between this pair of double refraction plates 174, 175. The angle of the optical unit consisting of the unified second filter 132 and infrared filter 125 is displaced by he means of driving the image shift mechanism 137 in the second operation mode.

The double refraction plates 174, 175 in FIG. 42 are configured the same as the previously mentioned third double refraction plate 135, only the double refraction plates 174, 175 are configured so that the sum of the thicknesses equals the thickness w3 of second refraction plate 135 in the previously described embodiment, and are positioned to match along the optical axis 122. The combined spatial frequency characteristics of the double refraction plates 174, 175 can be made the same as those of the third double refraction plate 135.

With the embodiment shown in FIG. 42, the thickness of the optical unit 176 increases. In accordance with Equations 5 and 6, therefore, the tilt angle θ2 required to obtain the shift distance ΔS can be smaller. This enables quicker image shifting by the image shift mechanism driving means 137, while reducing demand.

The infrared filter 125 is made of synthetic resin and inorganic materials. It includes a thin metal film, and its characteristics generally tend to break down due to absorption of moisture in the atmosphere. With the embodiments of FIGS. 63–42, in order to prevent the infrared filter 125 from coming in contact with outside air, the surface of the infrared filter 125 is provided with a translucent film coating. With the embodiment of FIG. 42, both surfaces of the infrared filter 125 are covered by double refraction plates 174, 175, thus preventing it from being directly exposed to outdoor air. This prevents the infrared filter's 125 characteristics from being broken down due to absorption of moisture in the atmosphere, and eliminates the need for the previously mentioned film coating to prevent exposure to outside air. In this way, break down of characteristics can be prevented by an economical configuration.

An optical unit 176 with the infrared filter 125 sandwiched between the first and second double refraction plates 133, 134 which comprise the first filter 131 shown in FIGS. 63–40 may be used for other embodiments of the invention as well. This configuration also enables break down of the infrared filter's 125 characteristics to be prevented economically, as shown in FIG. 42.

Figure 43:
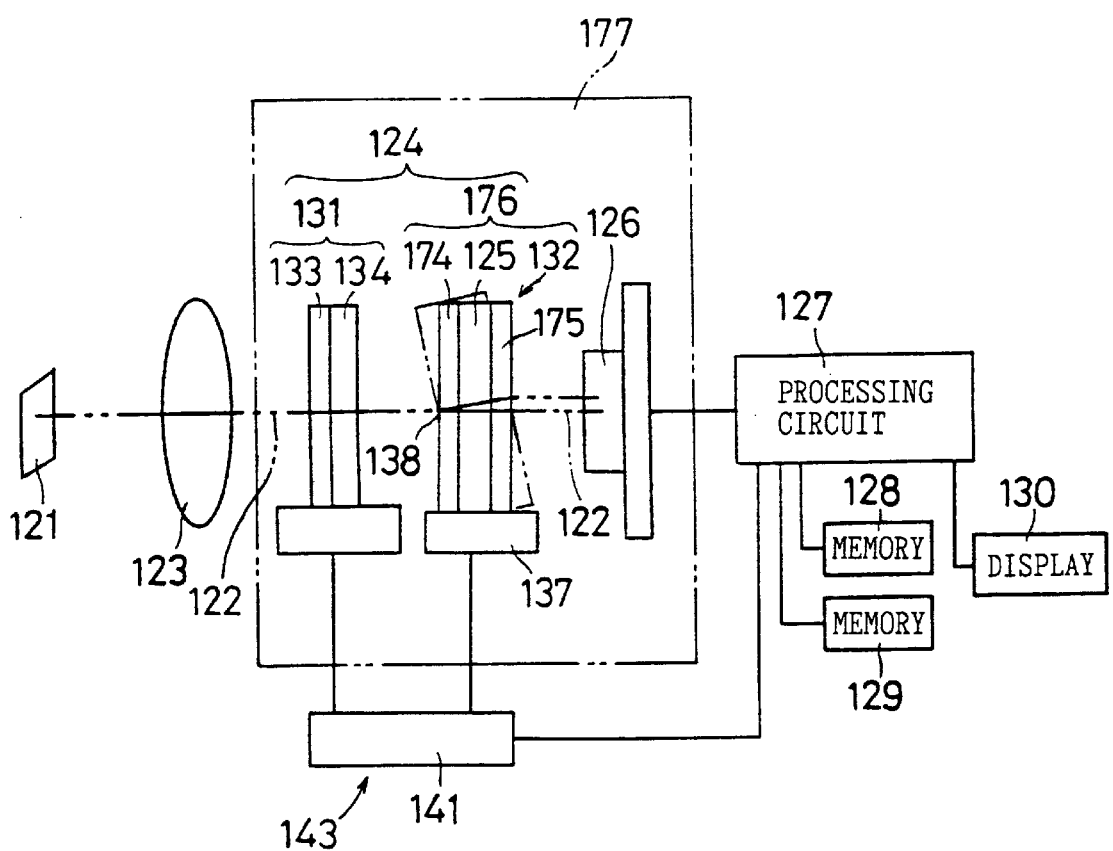
FIG. 43 is a block diagram showing the entire configuration of another embodiment of the invention.

FIG. 43 is a block diagram showing the entire configuration of another embodiment of the invention. This embodiment resembles the other previously mentioned embodiments, particularly the one shown in FIG. 42, and is provided with the same reference symbols for corresponding parts. With the embodiment shown in FIG. 43, the variable spatial filter 124, the filter driving means 136, the image shift mechanism driving means 137, and the imaging device 126 are all incorporated into a single unit 177. The unit 177 can be easily mounted on the lens system included the lenses 123 and assembled, thus improving productivity. The optical unit 173 shown in FIG. 41 may be used in place of an optical unit 176 incorporating the double refraction plates 174, 175 and infrared filter 125, and the philosophy of the invention shown in FIG. 43 is also applied to the embodiments wherein the infrared filter 125 is sandwiched between the first and second double refraction plates 133, 134 shown in FIGS. 63–40.

With this embodiment, the unit 177 can be positioned and mounted on the lens system with greater precision than with the configuration where the variable filter 124, infrared filter 125, filter driving means 136, and means of driving the image shift mechanism are individually positioned and mounted on the lenses 123. The enhances reliability of the apparatus while lowering manufacturing cost.

Figure 44:
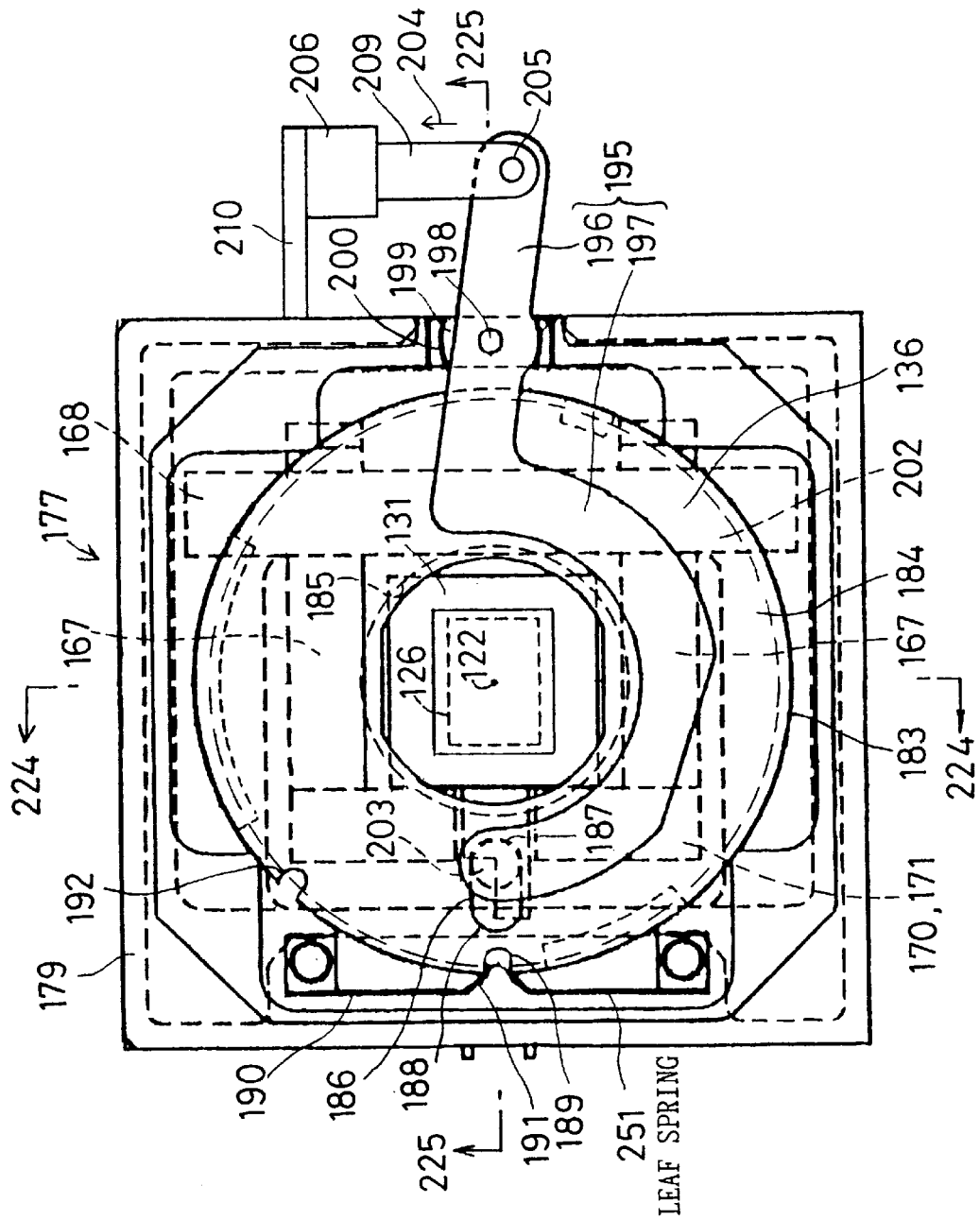
FIG. 44 is a front view of the unit 177.
Figure 45:
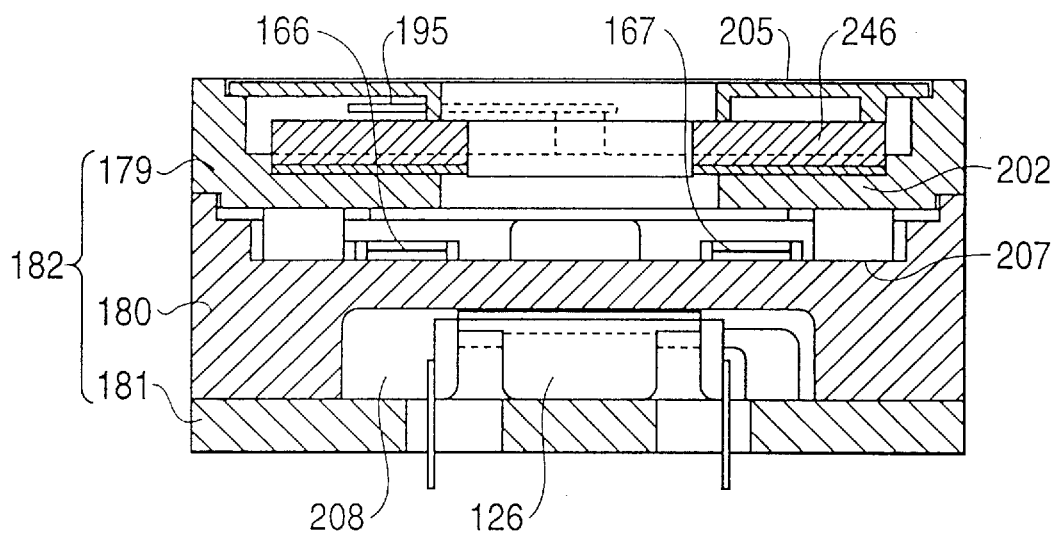
FIG. 45 is a sectional view taken on line 224—224 of FIG. 44.
Figure 46:
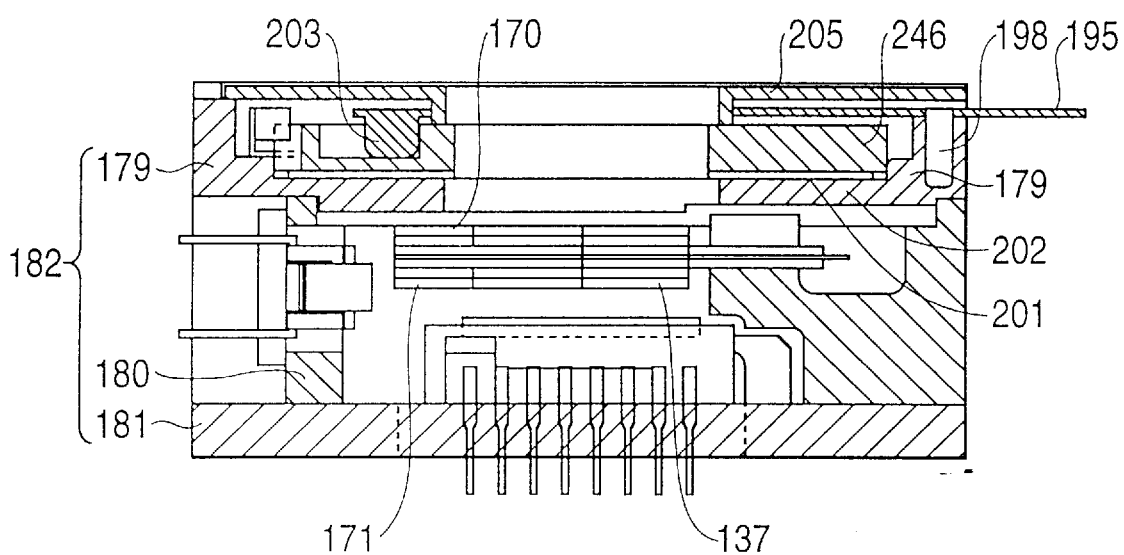
FIG. 46 is a sectional view taken on line 225—225 of FIG. 44.

FIG. 44 is a front view diagram of the unit 177, FIG. 45 is a sectional drawing showing a cross section 224–224 of FIG. 44, and FIG. 46 is a sectional drawing showing a cross section 225–225 of FIG. 44. The drawing show that the housing 181 is composed of generally rectangular parallelopiped unit bases 179, 180, 181, which can be fastened and removed. The first filter 131 and filter driving means 136 are mounted on the unit base 179. A round retainer 184 is placed in the right circular recessed cylinder formed within the unit base 179. The angle of the retainer 184 can be displaced around the optical axis 122. The first filter 131 is fastened facing the center hole 185 of the retainer 184. A guide slot 186 extending in the radial direction around the optical axis 122 is formed in the retainer 184. The guide slot 186 has a radial direction inner edge 187 and outer edge 188.

Positioning notches 189, 192 are formed on the outer edge of the retainer 184. The V-shaped stop 191 of the flat spring 190 of which one end is fastened to the unit base 179 snaps into the positioning notch 189, positioning the retainer 184 and accurately positioning by entering the other notch 192 which is located 45 degrees away in the circumferential direction. The status where the retainer is positioned by the stop protrusion 191 snapping into the notch 189 is the previously mentioned first operation mode. The status where the retainer is positioned by the stop protrusion 191 snapping into the notch 192 is the second operation mode.

As is clearly shown by FIGS. 45 and 46, a support 202 lie between the edge of the retainer 184 on the side where the third double refraction plate 135 is located, and the bottom 201 of unit base 179. The support 202, is circular as is the retainer 184, has a low coefficient of friction, and is made of a material that produces minimal dust such as a non-woven synthetic resin material.

A lever 195 for which angle can be displaced is mounted on the unit base 179. The lever 195 is composed of an operation section 196 and an arc shaped curved section 197. The axis 198 which is parallel to the optical axis 122 is supported so that the angle can be displaced by operation section 196 of the lever 195. Both sides of the operation section 196 have arc-shaped protrusions 199 centered around the axis of the pin 198. A support recess is formed in the side of the unit base 197 which accommodates the protrusions 199. This prevents outside dust from getting inside the unit base 179, thus preventing the first through third double refraction plates 133–135 from being soiled. The cover 205 is mounted on the unit base so that it can be removed, and functions to prevent the retainer 184 and lever 195 from coming out in the optical axis 122 direction, while preventing outside dust from entering.

A curved pin 203 is attached to the end of the curved section 197. The pin 203 fits into the guide slot 186. In the first mode shown in FIG. 44, the pin 203 makes contact with inner end 187 of the guide slot 186 in the radial direction. At this time, the stop 191 of the flat spring 190 snaps into the previously described positioning notch 189.

In the second mode, the angle of the operation section 196 of the lever 195 is displaced in the direction of the arrow symbol 204, thus displacing the angle of the angle of the lever 195 around the axis 198 in the counterclockwise direction. This causes the pin 203 to touch outer end 188 of the guide slot 186 in the radial direction. At this time, the stop 191 of the flat spring 190 snaps into the positioning notch 192.

The image shift mechanism driving means 137 described in connection with FIG. 37 is mounted on the unit base 180. The stage 168 of the image shift mechanism driving means 137 is held and fastened in a recess 207 in the unit base 180. The piezoelectric members 166, 167, supports 170, 171, and third double refraction plate 135 are contained within the recess 207, enabling the angle of the third double refraction plate 135 to be displaced around the image shift angular displacement axis 138 by the piezoelectric members 166, 167.

The imaging device is fastened on another unit base 181. The imaging device 126 is contained in a recess 208 formed in the unit base 180, and forms images of objects obtained through the first through third double refraction plates 133–135.

The operation section 196 of the lever 195 is outside the unit base 179, and is connected by a pin 205 to the drive rod of the electromagnetic plunger 206. The electromagnetic plunger 206 is attached to the unit base 179 by a stay 210. The electromagnetic plunger 206 is demagnetized by the control circuit 141 in the first operation mode, thus maintaining the status shown in FIG. 44 by force of the spring contained inside the electromagnetic plunger 206. In the second operation mode, the electromagnetic plunger 206 is magnetized, causing the drive rod 209 to oppose the force of the spring contained inside the electromagnetic plunger 206, thus driving the operation section 196 of the lever 195 to displace the angle around the axis 198 in the counterclockwise direction of FIG. 44.

Figure 47:
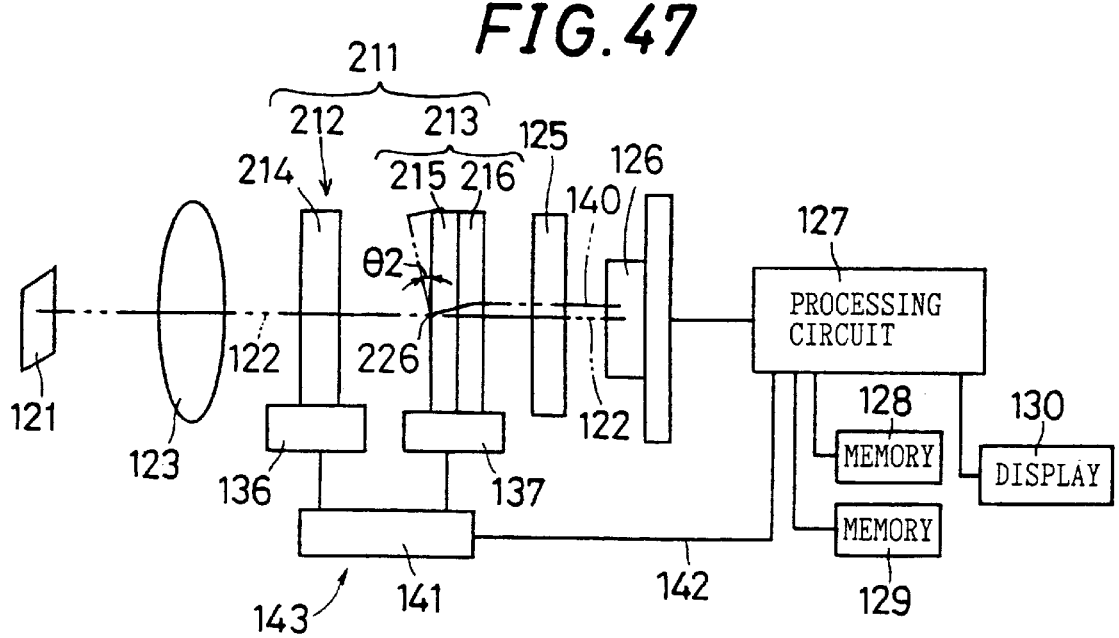
FIG. 47 is a block diagram showing the entire configuration of an image input apparatus of another embodiment of the invention.
Figure 48:
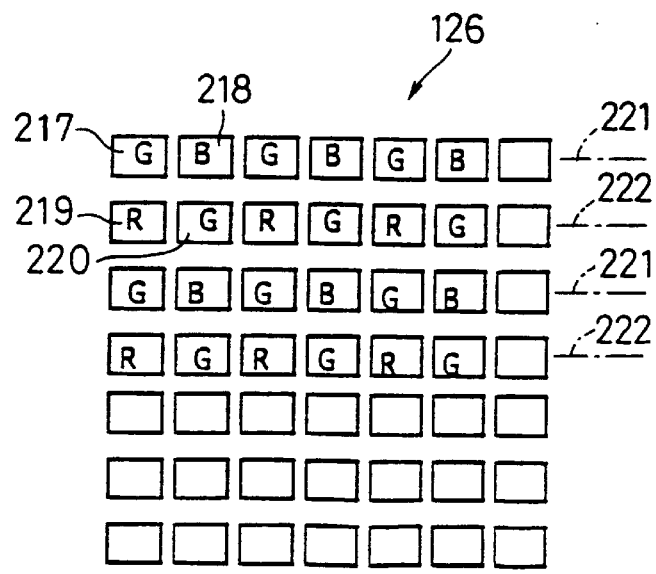
FIG. 48 is a front view of the imaging device 126 used in FIG. 47.

FIG. 47 is a block diagram showing the entire configuration of the image input apparatus of another embodiment of the invention. This embodiment resembles the previously mentioned embodiments is provided with the same reference symbols for corresponding parts. The imaging device 126 is of Bayer array single-plate color construction, and its imaging surface is shown in FIG. 48. The variable spatial filter 211 is positioned between the lenses 123 and the front of the imaging device 126. The first filter 212 and second filter 213 of variable spatial filter 211 are sequentially positioned along the optical axis 122 of the lenses 123 from the object 121 to the imaging device 126. The first filter 212 is composed of the first double refraction plate 214. The second filter 213 is composed of the second and third double refraction plates 215, 216 sequentially positioned and fastened along the optical axis 122. In comparison with the first operation mode, the angle of the first double refraction plate 214 is displaced 90 degrees around the optical axis 122 by the filter driving means 136 in the second operation mode. Image shifting is executed by the image shift mechanism driving means by displacing the angle of the second filter 213 which is composed of the second and third double refraction plates 215, 216, by the tilt angle θ2 in the second operation mode. This operation resembles that of the previously described embodiments.

FIG. 48 is a front view diagram of the imaging device 126 used in FIG. 47. A large amount of pixels 217, 218, 219, 220, etc., are arranged in rows at the predetermined pitch Px in the horizontal x direction, and Py in the vertical direction y. With this embodiment, Px=Py=P, just as with the previously described embodiments. The pixels which detect luminance of the color green G among the primary colors, and pixels 218 which detect the luminance of blue B are alternately positioned in one row 221 of the pair of rows 221, 222 adjoining in the vertical direction y. The pixels 229 which detect the luminance of red and the pixels 220 which detect the luminance of green G are alternately positioned in the other row 222 in the horizontal direction. Each of the green G pixels 217, 220 existing in rows 221, 222 are shifted by P in the horizontal direction x. The combination forms an imaging surface of Bayer array single-plate color construction.

Figure 49:
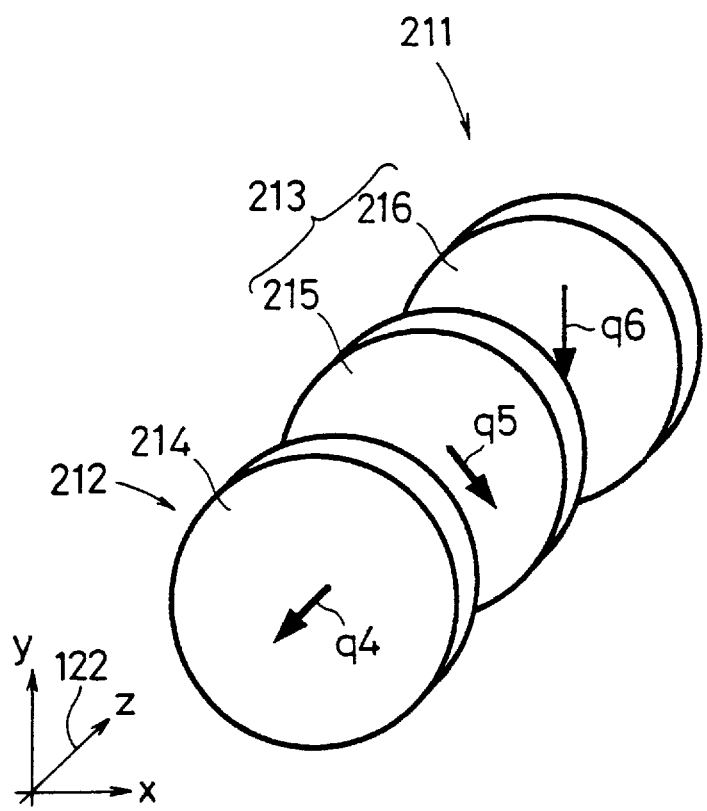
FIG. 49 is a simplified perspective drawing showing first through third double refraction plates 214–216 in the first mode of the spatial filter 211 which obtains low resolution picture quality.

FIG. 49 is a simplified strabismus drawing showing the first through third double refraction plates 214–216 in the first mode of the spatial filter 211 which obtains low resolution picture quality. The first through third double refraction plates 214–216 resemble double refraction plates 133–135, except for the separation distance d, thickness w and optic axis q4–q6 directions in the first operation mode are as given in Table 2.

elements of the objects spatial frequency are blocked out, thus suppressing the occurrence of color moire.

Figure 50A:
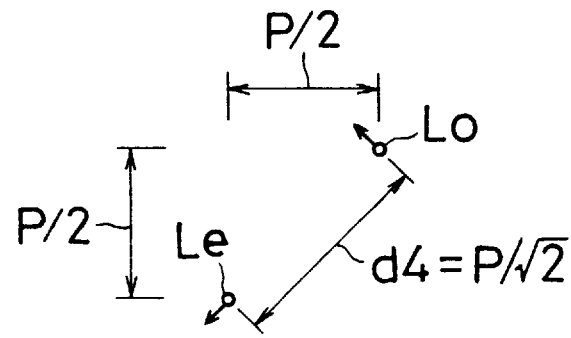
FIGS. 50A, 50B, 50C are views for describing the separate light images of the first through third double refraction plates 214–216.
Figure 50B:
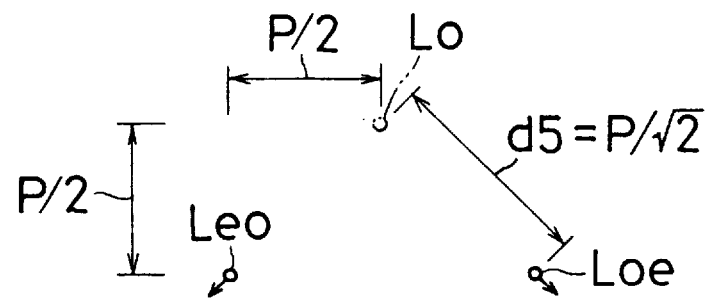
Figure 50C:
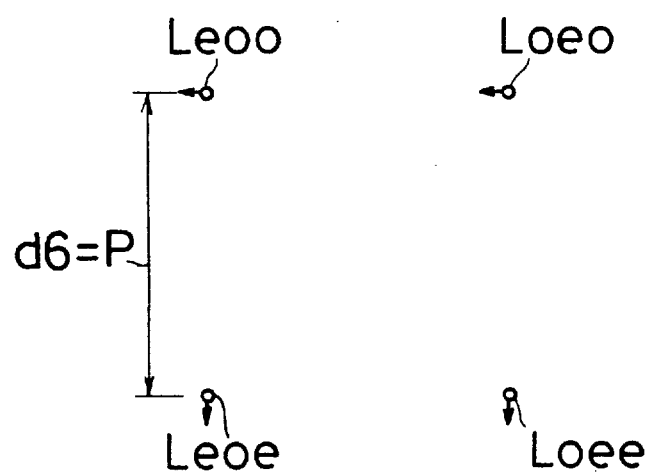
Figure 51:
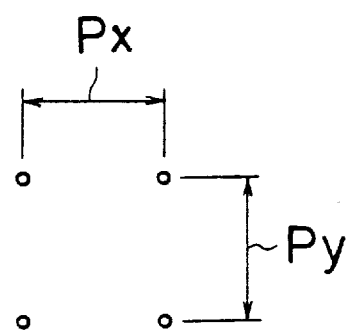
FIG. 51 is a diagram showing the separation of ordinary and extraordinary rays obtained by the variable spatial filter 211 in the first operation mode.
Figure 52:
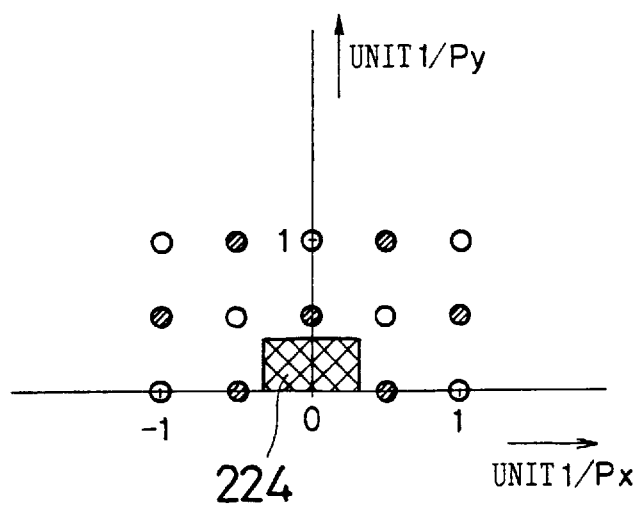
FIG. 52 is a diagram showing characteristics within the spatial frequency plane obtained by the variable spatial filter 211 shown in FIGS. 32–36 in the first operation mode.

FIG. 52 is a diagram showing characteristics within the spatial frequency plane obtained by the variable spatial filter 211 shown in FIGS. 49–51 in the first operation mode. The horizontal axis of FIG. 52 shows the spatial frequency characteristics of the horizontal direction x, with the unit being 1/Px, and the vertical axis shows the spatial frequency characteristics of the vertical direction y, with the unit being 1/Py. The white circles in FIG. 52 show the spatial frequency of luminance moire, and the black circles show the spatial frequency of color moire. The band of images on the imaging surface of the imaging device 126 is shown by the area 224 filled in with diagonal lines. Thus in the low resolution first operation mode, unnecessary high frequency elements of the objects spatial frequency are blocked out, thus suppressing the occurrence of color moire.

Figure 53:
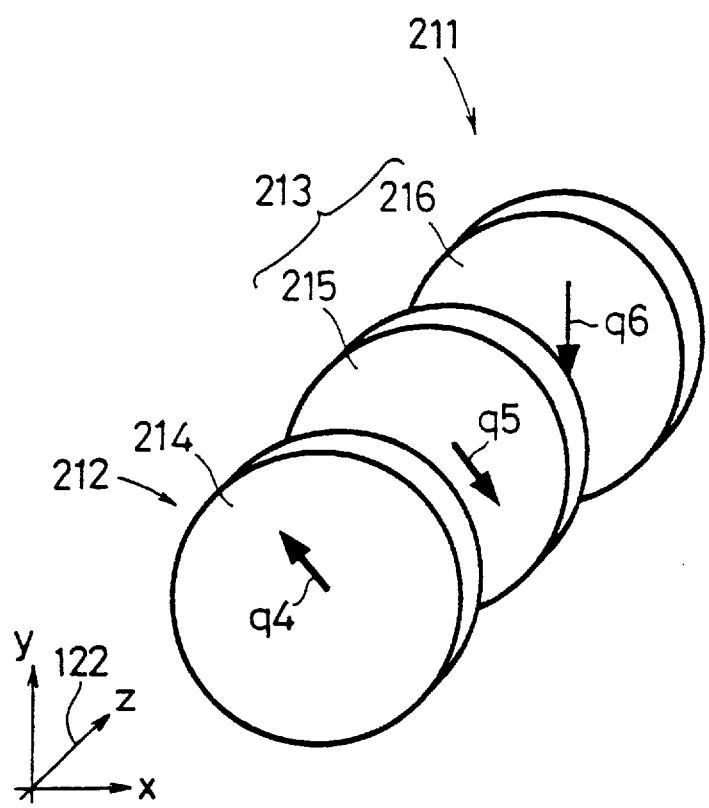
FIG. 53 is a simplified perspective view showing the status of the variable spatial filter 211 in the second operation mode.

FIG. 53 is a simplified strabismus drawing showing the status of the variable spatial filter 211 in the second opera-

TABLE 2

| Filter | Double Refraction Plate | Separation Distance d ($\mu$m) | Thickness w (mm) | Direction of Optical Axes q4–q6 |
|---|---|---|---|---|
| First Filter 212 | First Double Refraction Plate 214 | $d4 = \dfrac{P}{\sqrt{2}} = 5.2$ | w4 = 0.9 | q4:225° in counterclockwise direction from horizontal direction x (first diagonal direction of pixels) |
| Second Filter 213 | Second Double Refraction 215 | $d5 = \dfrac{P}{\sqrt{2}} = 5.2$ | w5 = 0.9 | q5:45° in clockwise direction from horizontal direction x (first diagonal direction perpendicular to second diagonal direction) |
|  | Third Double Refraction 216 | d6 = P = 7.4 | w6 = 1.3 | q6:90° in counterclockwise direction from horizontal direction x |

FIG. 50 is a drawing which describes the separate light images of the first through third double refraction plates 214–216. After first passing through the first double refraction plate 214, the light introduced from the lens 123 is then put out separated into ordinary ray Lo and extraordinary ray Le at separation distance d4 as shown in FIG. 50A. Optic axis q4 corresponds to the direction linking the ordinary ray Lo and extraordinary ray Le.

When lights Lo, Le are introduced to the second double refraction plate 215, the ordinary ray Lo is then put out further separated into ordinary ray Loo and extraordinary ray Loe, and the extraordinary ray Le is further separated into ordinary ray Leo and an extraordinary ray Lee at the separation distance d5 and put out as shown in FIG. 50B.

As shown in FIG. 50C, after passing through the final third double refraction plate 216, light corresponding to the ordinary ray Loo is separated into ordinary ray Looo and extraordinary ray Looe at the separation distance d6, light corresponding to the extraordinary ray Loe is separated into ordinary ray Loeo and extraordinary ray Loee, light corresponding to the ordinary ray Leo is separated into ordinary ray Leoo and extraordinary ray Leoe, and light corresponding to the extraordinary ray Lee is separated into ordinary ray Leeo and extraordinary ray Leee.

The separation status of the ordinary and extraordinary rays that will ultimately be obtained by the variable spatial filter 211 is as shown in FIG. 51, which shows the same separation status as FIG. 50C. In the first operation mode, frequencies in excess of the object image's Nyquist frequency 1/P are blocked out, unnecessary high frequency tion mode. In comparison with the previously described first operation mode of FIG. 49, the first filter 212 of this embodiment which is composed of a single-plate first double refraction plate 214 drive and turned by 90 degrees around the optical axis 122 of the lenses 123 by the filter driving means 136. Thus the optic axis q4 of the first double refraction plate 214 is 135 degrees in the counterclockwise direction from the horizontal axis x, and is in the opposite direction from the optic axis q5 of the second double refraction plate 215.

FIG. 54 is a diagram which describes the separation of ordinary and extraordinary rays obtained by the variable spatial filter 211 in the second operation mode shown in FIG. 53.

Figure 54A:
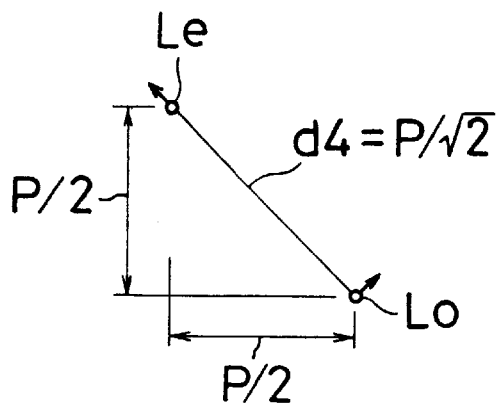
FIGS. 54A, 54B, 54C are diagrams for describing the separation of ordinary and extraordinary rays obtained by the variable spatial filter 211 in the second operation mode shown in FIG. 53.
Figure 54B:
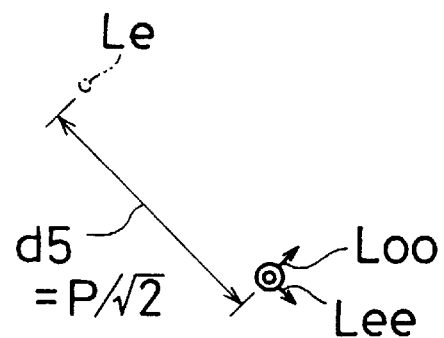

After first passing through the first double refraction plate 214, the light is separated into ordinary ray Lo and extraordinary ray Le along optic axis q4 in the horizontal direction by separation distance d4 as shown in FIG. 54A. Then the lights Lo, Le are incident on the second double refraction plate 215, and with respect to incident ordinary ray Lo, ordinary ray Loo outgoes. With respect to incident extraordinary light Le, extraordinary light Lee shifted by separation width d5 along optic axis q5 is put out. Since the wave front of ordinary ray Lo is perpendicular to optic axis q5, the extraordinary ray thereof is not put out. And since the wave front of the extraordinary ray Le is parallel to optic axis q5, the ordinary ray thereof is not put out. Finally light from the second double refraction plate 216 shown in FIG. 54B is incident on the third double refraction plate. The ordinary ray Loo from the third double refraction plate 216 are separated into ordinary ray Looo and extraordinary ray Looe along optic axis q6 by separation distance d6 and put out. Additionally, with respect to extraordinary ray Lee, ordinary ray Leeo and extraordinary ray Leee are obtained separated by separation distance d6 along optic axis q6.

Figure 54C:
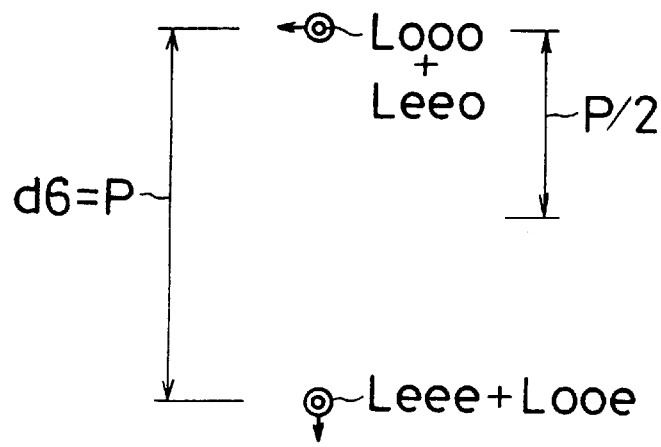
Figure 55:
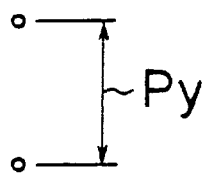
FIG. 55 is a diagram showing the separation of ordinary and extraordinary rays obtained by the variable spatial filter 211 in the second operation mode.

The light which can be obtained from the variable spatial filter 211 on the imaging surface of the imaging device 126 in the second operation mode are as shown in FIG. 55, which shows the same separation status as FIG. 54C.

Figure 56:
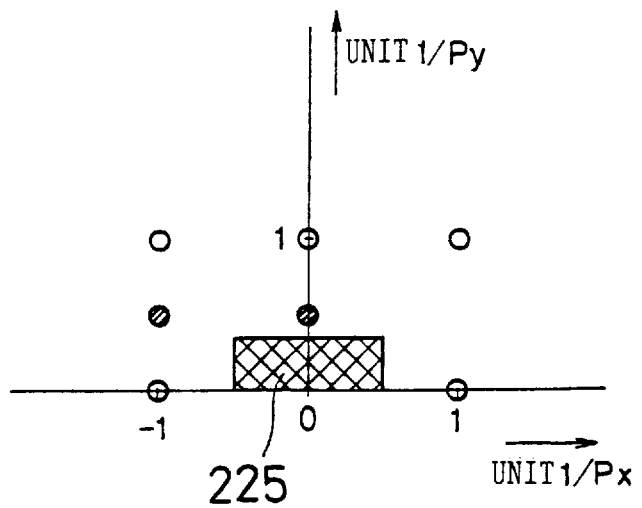
FIG. 56 is a view showing characteristics within the spatial frequency plane obtained by the variable spatial filter 211 shown in FIGS. 53 and 54 in the second operation mode.

FIG. 56 is a diagram showing characteristics within the spatial frequency plane obtained by the variable spatial filter 211 shown in FIGS. 53 and 54 in the second operation mode. The horizontal axis of FIG. 56 shows the spatial frequency characteristics of the horizontal direction x, with the unit being 1/Px, the vertical axis shows the spatial frequency characteristics of the vertical direction, with the unit being 1/Py. The white circles in FIG. 52 show the spatial frequency of luminance moire, and the black circles show the spatial frequency of color moire. The band of images on the imaging surface of the imaging device 126 is shown by the area 225 filled in with diagonal lines. In the second operation mode, therefore, optical paths are separated by double refraction of the variable spatial filter 211, and high frequency elements in the vertical direction y blocked out resulting in spatial frequency characteristics suitable for obtaining high resolution picture quality, thus suppressing the occurrence of color moire in the vertical direction y.

If the imaging device 126 described in connection with FIG. 48 is of Bayer array single-plate color construction, concerning color data, because pixels are arranged with every other pixel being a pixel of the same color in the horizontal and vertical directions, the cycle of sampling exchange frequency for each color is rough toward the sampling exchange frequency cycle for luminance, thus resulting in color moire being produced at coordinates such as (½Px, 0), (½Px, ½Py) and (0, ½Py) within the spatial frequency plane. Because a lot of color moire produced in this case, in order to effectively eliminate color moire, a trap for blocking spatial frequency elements in the horizontal x and vertical y directions is included. The dot image distribution having these spatial frequency characteristics is a 4-dot separation separated by Px in the horizontal direction, and Py in the vertical direction. In order to realize this dot image, (separation distance d and angle of optical axis relative to the horizontal direction x) is (P/√2, 225 degrees), (P, 270 degrees) and (P/√2, 315 degrees) for this embodiment of the invention, as was mentioned in connection with FIGS. 47–56.

In the second mode prior to image shifting, an image is formed by the imaging device 126 and the object image is stored in the memory 128, just as with the previously described embodiments.

Next, in the second mode, the angle of the second filter 213 is displaced exactly the tilt angle θ2 by the image shift mechanism driving means 137, the image is formed by the imaging device 126, and the object image is stored in the memory 129. The image shift angular displacement axis 226 (see FIG. 47) for the second filter 213 driven by the image shift mechanism driving means 137 is parallel to horizontal direction x of the imaging device 126 in a plane perpendicular to the optic axis 122 of the lens 123. The horizontal direction x is indicated by reference symbols 221, 222 in FIG. 48. Therefore prior to image shifting in the second mode, imaging is accomplished by a combination of four pixels 217–220 as shown in FIG. 57A, and after image shifting, the object image is shifted by Px in the horizontal direction x as shown in FIG. 57B, thus enabling an image of the pixels of the adjacent color to be obtained for each of the pixels 217–220. The contents of the object images obtained before and after image shifting are read from the memories 128, 129 and combined to produce an object image of high resolution picture quality.

When the sum of the thicknesses w5, w6 of the second and third double refraction plates (=w5+w6) is 2.2 mm, and the refraction index n of the double refraction plates is 1.5, the image shift distance ΔS=Px=7.4 μm. In accordance with the philosophy of Equation 6, the tilt angle θ2 would therefore be 0.55 degrees. Because the tilt angle θ2 is extremely slight, there is almost no negative influence on the double refraction separation distance d by tilting the second filter 213 for image shifting, and there is no danger of altering the frequency characteristics during that time. Thus resolution of color signals is increased in the horizontal direction x by image shifting, and an object image of high picture quality with minimal color moire can be obtained in the vertical direction y by the variable spatial filter 211.

With this embodiment of the invention, the positioning of the first filter 212 and second filter 213 along the optical axis 122 of the lens 123 may be reversed, and the positioning of the second and third double refraction plates 215, 216 of the second filter 213 may be reversed as well.

With other embodiments of the invention, the infrared filter 125 may be sandwiched between the second and third double refraction plates 215, 216 just as with the previously described embodiment. This prevents the infrared filter's 125 characteristics from being broken down due to absorption of moisture in the atmosphere, and eliminates the need for the previously mentioned film coating to prevent exposure to outside air.

FIG. 58 is a block diagram showing the entire configuration of the image input apparatus of another embodiment of the invention. This embodiment resembles the embodiments described in connection with FIGS. 63–40, and has been provided with the same reference symbols for corresponding parts. With this embodiment it should be noted that the variable spatial filter 226 is composed of a first filter 227 and a second filter 228, each of are composed of a single double refraction plate, which is sometimes indicated by the same reference symbol.

Figure 59:
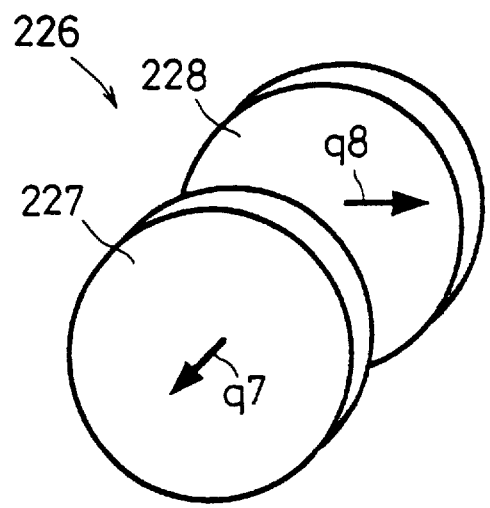
FIG. 59 is a perspective view showing a configuration of the double refraction plates 227, 228 of the variable spatial filter 226 of the image input apparatus shown in FIG. 58 in the first mode.

FIG. 59 is a strabismus drawing showing the configuration of the double refraction plates 227, 228 of the variable spatial filter 226 of the image input apparatus shown in FIG. 58 in the first mode. The optical axis q7 of the first double refraction plate 227 is 135 degrees around the optical axis 122 in the counterclockwise direction relative to the horizontal axis x, and the optical axis q8 of the other double refraction plate 228 runs in the horizontal direction x.

Figure 60:
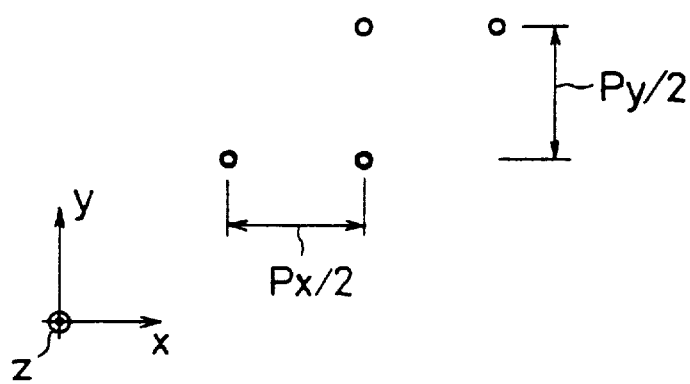
FIG. 60 is a view showing separate light images of the variable spatial filter 226 in the first mode shown in FIG. 39.

FIG. 60 is a drawing showing separate light images of the variable spatial filter 226 in the first mode shown in FIGS. 58 and 59. A spatial frequency limiting effect is produced in the horizontal x and vertical y directions, and imaging in the original low resolution first mode of the imaging device can be obtained without allowing luminance moire to be produced.

Figure 61:
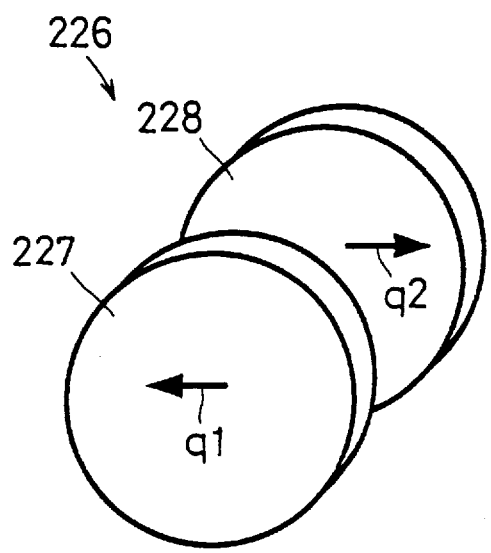
FIG. 61 is a simplified view showing a status of the variable spatial filter 226 in the second mode of the embodiments shown in FIGS. 58 and 59.

FIG. 61 is a simplified drawing showing the status of the variable spatial filter 226 in the second mode of the embodiments shown in FIGS. 58 and 59. In comparison with the first operation mode shown in FIG. 59, the angle of the first double refraction plate 227 is displaced 45 degrees around the optical axis 122 by the filter driving means 136 in the second operation mode. Thus the direction of the optic axes q7, q8 of the double refraction plates 227, 228 becomes opposite.

Figure 62:
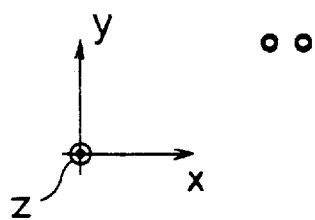
FIG. 62 is a view showing separate light images of the variable spatial filter 226 in the second mode shown in FIG. 61.

FIG. 62 is a drawing showing separate light images of the variable spatial filter 226 in the second mode shown in FIG.

61. The drawing shows that in the second mode, spatial frequencies with high spatial frequency characteristics are passed by the variable spatial filter 226. In the second operation mode, the angle of the second double refraction plate 228 is displaced by the image shift mechanism driving means 137, and the object images obtained by the imaging device 126 before and after image shifting are combined, thus enabling an image having high resolution picture quality to be obtained.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image input apparatus provided with image shift means for shifting a positional relation between an optical path of incident light on an imaging device and the imaging device, capable of inputting images having a first resolution and a second resolution higher than the first resolution by the image shift means, the image input apparatus comprising:

a spatial filter disposed between an optical system for inputting incident light from an object and the imaging device for receiving an image of the object, having at least two spatial frequency transmission bands which can be changed over; and control means for controlling so that in case of inputting an image of the first resolution a transmission band of the spatial filter becomes a first transmission band, and in case of inputting an image of the second resolution the transmission band of the spatial filter becomes a second transmission band which can pass spatial frequencies higher than that of the first transmission band, and the image shift means is operated to enable inputting of plural images in synchronization with a shift of the optical path of the incident light on the imaging device.

2. The image input apparatus of claim 1, wherein the image shift means is displaced between the optical system for inputting incident light from the object, and the solid-state imaging device for receiving an image from the object, and is provided with a transparent, flat refraction plate, capable of shifting an optical path of incident light on the imaging device by tilting to the optical axis.

3. An image input apparatus provided with image shift means for shifting a positional relation between an optical path of incident light on an imaging device and the imaging device, capable of inputting images having a first resolution and a second resolution higher than the first resolution by the image shift means, the image shift means being capable of serving as a spatial filter disposed between an optical system for inputting incident light from an object and the imaging device for receiving an image of the object, having at least two spatial frequency transmission bands which can be changed over, the image shift means being such constructed that a part of the spatial filter is tilted to an optical axis to shift an optical path of incident light on the imaging device, the image input apparatus comprising:

control means for controlling so that in case of inputting an image of the first resolution a transmission band of the spatial filter becomes a first transmission band, and in case of inputting an image of the second resolution the transmission band of the spatial filter becomes a second transmission band which can pass spatial frequencies higher than that of the first transmission band, and the image shift means is operated to enable inputting of plural images in synchronization with a shift of the optical path of the incident light on the imaging device.

4. The image input apparatus of any one of claims 1 to 3, wherein images having the first resolution are moving images.

5. The image input apparatus of claim 1, wherein the spatial filter is composed of two or more double refraction plates which are supported so as to relatively rotate around an axis parallel to the optical axis, and a transmission band of the spatial filter can be changed over between the first transmission band and the second transmission band by the relative rotation between the first and the second transmission band.

6. The image input apparatus of claim 5, wherein a relative rotation angle between the double refraction plates is altered by approximately 45 degrees for the first and second transmission bands.

7. An image input apparatus comprising:

(a) a lens for condensing light from an object;

(b) an imaging device having an imaging surface consisting of multiple pixels, for imaging the object introduced through the lens;

(c) a variable spatial filter positioned between the lens and the imaging device, which is provided with plural double refraction plates arranged in sequence along an optical axis of the lens, and which alters the spatial frequency characteristic of incident light from the lens;

(d) driving means for an image shift mechanism, for carrying out image shift by shifting an image of the object on the imaging surface by angularly displacing at least one of the double refraction plates forming the variable spatial filter around an image shift axis which intersects the optical axis of the lens;

(e) control means for controlling:

a first operation mode where the image of the imaging device is obtained by operating the variable spatial filter so as to bring an effect of controlling a spatial frequency and by setting the at least one double refraction plate to a predetermined position, and a second operation mode where the variable spatial filter is operated so that the transmission band of the spatial filter can be extended upto a higher band than that in the first operation mode, and images from the imaging device obtained before and after image shift operation by the image shift mechanism driving means are composited and arithmetically operated to improve the images in resolution.

8. The image input apparatus of claim 7, wherein the variable spatial filter include:

a first filter including at least one double refraction plate;

a second filter including at least one double refraction plate; and driving means for filter, for driving the first and the second filter by relatively displacing angularly around an axis parallel to an optical axis of the lens;

the image shift mechanism driving means drives one of the first and the second filter in angular displacement by tilting the one filter around an axis intersecting the optical axis of the lens; and the control means sets:
  in the first operation mode, the one filter to the predetermined first image shift angular displacement position by the image shift mechanism driving means, under a condition that the first and the second filter are set to the first filter angular displacement position of each filter by the filter driving means, and
  in the second operation mode, the one filter to the first image shift angular displacement position and to the second image shift angular displacement position different from the first image shift angular displacement position by the image shift mechanism driving means, under a condition that the first and the second filter are set to the second filter angular displacement position of each filter by the filter driving means.

9. The image input apparatus of claim 8, wherein
the pixels of the imaging device are arranged in a matrix form in vertical and horizontal directions at a predetermined pitch P;
the first filter is composed of first and second double refraction plates arranged in a direction of the optical axis of the lens;
in the first operation mode,
  the first double refraction plate separates ordinary and extraordinary rays by a distance $d1=P/\sqrt{2}$ in a first diagonal direction of the pixels;
  the second double refraction plate separates ordinary and extraordinary rays by a distance $d2=P/2$ in a first horizontal direction of the pixels; and
  the second filter is composed of a third double refraction plate which separates ordinary and extraordinary rays by a distance $d3=P/\sqrt{2}$ in the first diagonal direction and a second diagonal direction vertical to the first diagonal direction of the pixels;
in the second operation mode,
  the filter driving means drives to angularly displace the first filter by 45 degrees around the optical axis of the lens from the first operation mode so that ordinary and extraordinary rays of the first double refraction plate are separated in the first horizontal direction and opposite second horizontal direction, and so that ordinary and extraordinary rays of the second double refraction plate are separated in the first diagonal direction and opposite second diagonal direction; and
  the image shift mechanism driving means drives to angularly displace the second filter so that the image of the object is shifted by P/2 in the horizontal direction and by P/2 in the vertical direction on the imaging surface.

10. The image input apparatus of claim 8, wherein the pixels of the imaging device are arranged in a matrix form in vertical and horizontal directions at a predetermined pitch P;
  the pixels for receiving light of a first and a second color of three primary colors are positioned on one of the rows adjacent in the vertical direction and are arranged alternately in the horizontal direction at a predetermined pitch P, and the pixels for receiving light the second and a third color are arranged alternately on the other rows in the horizontal direction at the predetermined pitch P;
  the pixels of the second color on the one row and the other row are arranged so as to be displaced by one pitch P in the horizontal direction;
  the first filter is composed of the first double refraction plate which in the first operation mode separates ordinary and extraordinary rays by a distance $d4=P/\sqrt{2}$ in the first diagonal direction of the pixels;
  the second filter is composed of the second and third double refraction plates positioned along the optical axis of the lens;
  the second double refraction plate separates ordinary and extraordinary rays by a distance $d5=P/\sqrt{2}$ in the first diagonal direction and a second diagonal direction vertical to the first diagonal direction of the pixels;
  the third double refraction plate separates ordinary and extraordinary rays by a distance $d6=P$ in the vertical direction;
  in the second operation mode, the filter driving means drives the first filter so that the filter is displaced by an angle of 90 degrees around the optical axis of the lens from the first operation position so that the first double refraction plate separates in a third diagonal direction opposed to the second diagonal direction; and
  the image shift driving means drives the second filter by angular displacement to shift the image of the object by the pitch P in either the horizontal or the vertical direction on the imaging surface.

11. The image input apparatus of claim 9, wherein a filter for blocking infrared rays is sandwiched between the plural double refraction plates which form the first filter.

12. The image input apparatus of claim 10, wherein a filter for blocking infrared rays is sandwiched between the plural double refraction plates which form the second filter.

13. The image input apparatus of claim 9, wherein the filter driving means includes:
  a housing;
  a supporting member for supporting the first filter, arranged in the housing so as to be displaced by 45 or 90 degrees around the optical axis of the lens;
  a lever provided on the housing, capable of being displaced around an axis parallel to the optical axis,
  a projection being provided on one of the supporting member and one end of the lever,
  a guiding long hole formed on the other of the supporting member and the one end of the lever, which guiding long hole guides the projection fitted thereto and extends in a radial direction of the optical axis; and
  a spring provided on one of the housing and the supporting member, and
  on the other of the housing and the supporting member is formed a mesh concave or projection which meshes with the spring at the respective angular displacement positions in the first and the second operation mode.

14. The image input apparatus of claim 13, wherein the image shift mechanism driving means is provided in the housing so as to be shifted from the filter driving means in the optical axis direction, and the image shift mechanism driving means drives to angularly shift the second filter by a piezoelectric member.

15. The image input apparatus of claim 2, wherein the spatial filter is composed of two or more double refraction plates which are supported so as to relatively rotate around an axis parallel to the optical axis, and a transmission band of the spatial filter can be changed over between the first transmission band and the second transmission band by the relative rotation between the first and the second transmission band.

16. The image input apparatus of claim 3, wherein the spatial filter is composed of two or more double refraction plates which are supported so as to relatively rotate around an axis parallel to the optical axis, and a transmission band of the spatial filter can be changed over between the first transmission band and the second transmission band by the relative rotation between the first and the second transmission band.

17. The image input apparatus of claim 4, wherein the spatial filter is composed of two or more double refraction plates which are supported so as to relatively rotate around an axis parallel to the optical axis, and a transmission band of the spatial filter can be changed over between the first transmission band and the second transmission band by the relative rotation between the first and the second transmission band.

* * * * *